(12) United States Patent
Lee et al.

(10) Patent No.: US 9,946,454 B2
(45) Date of Patent: Apr. 17, 2018

(54) WATCH TYPE MOBILE TERMINAL

(71) Applicant: LG ELECTRONICS INC., Seoul (KR)

(72) Inventors: Kiyong Lee, Seoul (KR); Pilgoo Kang, Seoul (KR); Kangchul Lim, Seoul (KR); Jeongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/323,714

(22) PCT Filed: Apr. 24, 2015

(86) PCT No.: PCT/KR2015/004127
§ 371 (c)(1),
(2) Date: Jan. 3, 2017

(87) PCT Pub. No.: WO2016/003062
PCT Pub. Date: Jan. 7, 2016

(65) Prior Publication Data
US 2017/0160898 A1 Jun. 8, 2017

(30) Foreign Application Priority Data
Jul. 4, 2014 (KR) .................. 10-2014-0083721

(51) Int. Cl.
*G06F 3/0488* (2013.01)
*H04W 52/02* (2009.01)
(Continued)

(52) U.S. Cl.
CPC .......... *G06F 3/0488* (2013.01); *G04B 47/00* (2013.01); *G06F 3/0482* (2013.01);
(Continued)

(58) Field of Classification Search
CPC ........................ G06F 3/0488; G06F 3/0482
See application file for complete search history.

(56) References Cited

U.S. PATENT DOCUMENTS 6,477,117 B1 * 11/2002 Narayanaswami .. G04G 13/026
368/224
2009/0195497 A1 8/2009 Fitzgerald et al.
(Continued)

FOREIGN PATENT DOCUMENTS

JP 2009002111 1/2009
KR 1020140064694 5/2014

OTHER PUBLICATIONS

PCT International Application No. PCT/KR2015/004127, International Search Report dated Jul. 29, 2015, 2 pages.

*Primary Examiner* — Tuan H Nguyen
(74) *Attorney, Agent, or Firm* — Lee, Hong, Degerman, Kang & Waimey

(57) ABSTRACT

A watch-type mobile terminal is provided. The watch-type mobile terminal includes a control unit for operating in a first mode and a second mode. The control unit may display, in the first mode, a first screen at least having a watch shape and a second screen in the second mode. The luminance of the second screen may be lower than the luminance of the first screen. The second screen may include a plurality of ambient screens that represents different kinds of pieces of notification information.

14 Claims, 120 Drawing Sheets

(51) Int. Cl.
*H04M 1/725* (2006.01)
*H04W 4/12* (2009.01)
*G06Q 10/10* (2012.01)
*G06F 3/0482* (2013.01)
*G04B 47/00* (2006.01)

(52) U.S. Cl.
CPC ...... *G06Q 10/1095* (2013.01); *H04M 1/7253* (2013.01); *H04M 1/72583* (2013.01); *H04W 4/12* (2013.01); *H04W 52/027* (2013.01)

(56) References Cited

U.S. PATENT DOCUMENTS

| | | |
|---|---|---|
| 2011/0012796 A1 | 1/2011 | Kim et al. |
| 2013/0040610 A1* | 2/2013 | Migicovsky .......... H04L 1/1867 455/412.2 |
| 2014/0273984 A1* | 9/2014 | Aerrabotu ......... H04M 1/27455 455/414.1 |

* cited by examiner (a)

(b)

WATCH TYPE MOBILE TERMINAL

CROSS-REFERENCE TO RELATED APPLICATIONS

This application is the National Stage filing under 35 U.S.C. 371 of International Application No. PCT/KR2015/004127, filed on Apr. 24, 2015, which claims the benefit of earlier filing date and right of priority to Korean Application No. 10-2014-0083721, filed on Jul. 4, 2014, the contents of which are all hereby incorporated by reference herein in their entirety.

BACKGROUND

The present disclosure relates to a watch-type mobile terminal that may minimize power consumption.

Terminals may be classified into mobile/portable terminals and stationary terminals depending on the mobility. The mobile terminals may be classified into handheld terminals and vehicle mount terminals depending on direct portability by a user.

Functions of the mobile terminals become diversified. For example, the functions include data and voice communication, picture capturing and video recording through a camera, voice recording, music file playback through a speaker system, and image or video output to a display unit. Some terminals further include an electronic game play function or perform a multimedia player function. Especially, recent mobile terminals may receive multicast signals providing visual content such as broadcasts and video or television programs.

Users mostly hold and use the mobile terminals by their hands and furthermore, the mobile terminals may be expanded to wearable devices which may be worn on their bodies. The wearable devices include a watch-type mobile terminal, a glass-type mobile terminal, a head mounted display (HMD), and so on.

Among others, the watch-type mobile terminal is formed by the adding of electronic, communication and multimedia functions to a watch which a human being always wear, and it seems that a big market is formed in the future because the watch-type mobile terminal does not provide antipathy to the human being.

Thus, research, development and commercialization of the watch-type mobile terminal are being actively conducted.

However, the watch-type mobile terminal needs to reinforce the UX aspect because it is still the initial step of commercialization. Also, since the watch-type mobile terminal has a size smaller than or equal to a typical watch, it needs to decrease power consumption due to a limitation in the battery capacity of the terminal having such a small size.

SUMMARY

The object of the inventive concept is to solve the above-described limitations and other limitations.

Embodiments provide a watch-type mobile terminal that may decrease power consumption.

Embodiments also provide a watch-type mobile terminal that may increase user convenience.

In one embodiment, a watch-type mobile terminal includes a touch screen for enabling input and output of information; and a control unit for controlling the information input and output.

The control unit may operate in a first mode and a second mode.

The control unit may display, in the first mode, a first screen at least having a watch shape and a second screen in the second mode.

The luminance of the second screen may be lower than the luminance of the first screen.

The second screen may include a plurality of ambient screens that represents different kinds of pieces of notification information.

The details of one or more embodiments are set forth in the accompanying drawings and the description below. Other features will be apparent from the description and drawings, and from the claims.

DETAILED DESCRIPTION OF THE EMBODIMENTS

Figure 1:
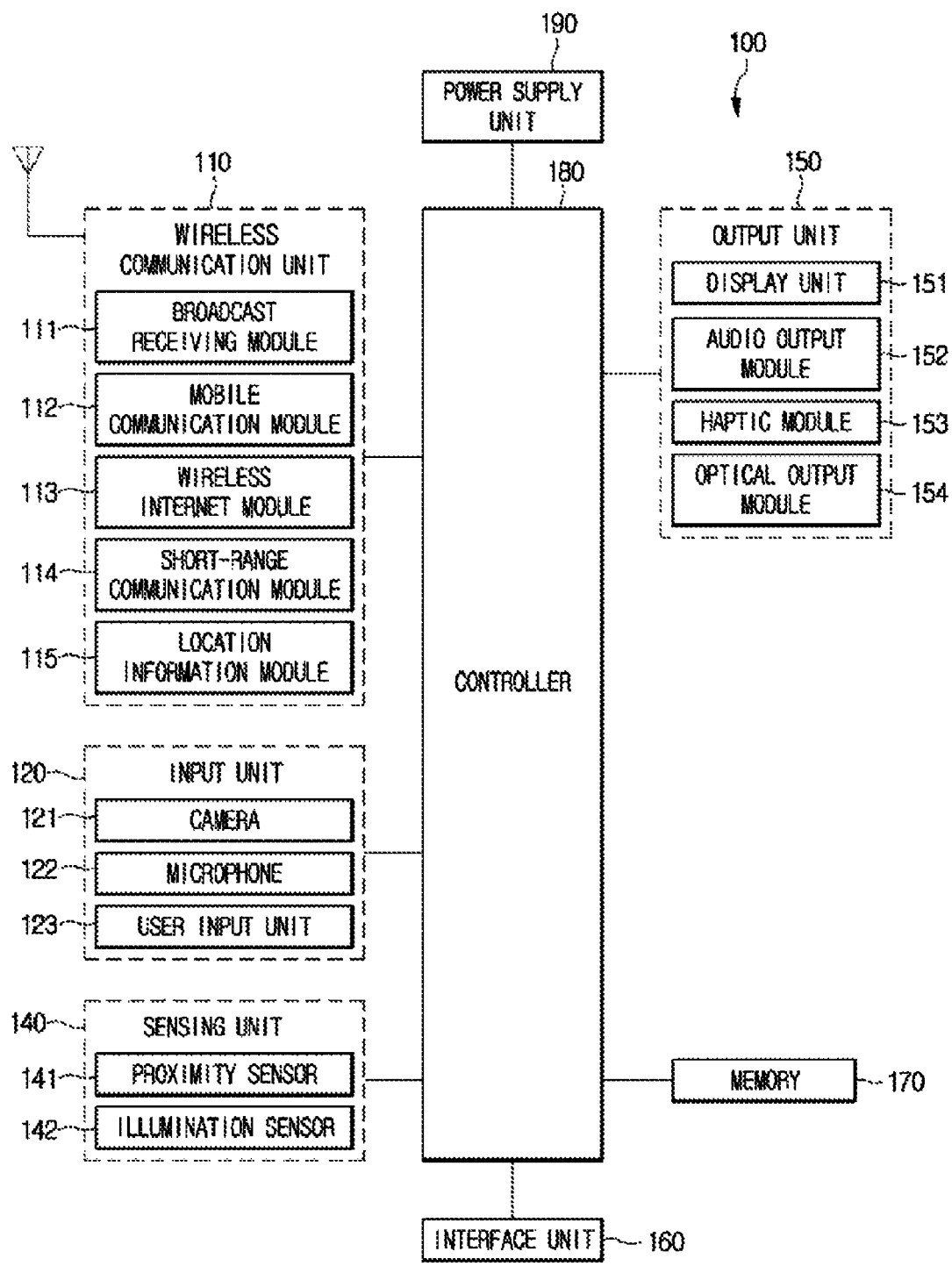
FIG. 1 is a block diagram for explaining a watch-type mobile terminal related to an embodiment.

Hereinafter, embodiments are described in more detail with reference to accompanying drawings and regardless of the drawings symbols, same or similar components are assigned with the same reference numerals and thus repetitive for those are omitted. Since the suffixes "module" and "unit" for components used in the following description are given and interchanged for easiness in making the present disclosure, they do not have distinct meanings or functions. In the following description, detailed descriptions of well-known functions or constructions will be omitted because they would obscure the inventive concept in unnecessary detail. Also, the accompanying drawings are used to help easily understanding embodiments disclosed herein but the technical idea of the inventive concept is not limited thereto. It should be understood that all of variations, equivalents or substitutes contained in the concept and technical scope of the present invention are also included.

Although the terms 'first' and 'second' may be used to describe various components, these components should not be limited to these terms. The terms are used only in order to distinguish a component from another component.

When it is mentioned that any component is "connected" or "accessed" to another component, it should be understood that the former can be directly connected to the latter, or there may be another component in between. On the contrary, when any component is referred to as being 'directly connected' to another component, it should be understood that there may be no other component in between.

The terms in singular form include the plural form unless otherwise specified.

It should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

FIG. 1 is a block diagram for explaining a mobile terminal related to an embodiment.

A watch-type mobile terminal 100 may include a wireless communication unit 110, an input unit 120, a sensing unit 140, an output unit 150, an interface unit 160, a memory 170, a control unit 180, and a power supply unit 190. In implementing the watch-type mobile terminal, components shown in FIG. 1 are not necessary, so the watch-type mobile terminal described in this specification may include more or less components than those listed above.

More particularly, the wireless communication unit 110 in the components may include at least one module allowing wireless communication between the watch-type mobile terminal 100 and a wireless communication system, between the watch-type mobile terminal 100 and another watch-type mobile terminal 100, or between the watch-type mobile terminal 100 and an external server. Also, the wireless communication unit 110 may include at least one module connecting the watch-type mobile terminal 100 to at least one network.

The wireless communication unit 110 may include at leastone of a broadcast receiving module 111, a mobile communication module 112, a wireless internet module 113, a short-range communication module 114, and a location information module 115.

The input unit 120 may include a camera 121 or an image input unit for image signal input, a microphone 122 or an audio input unit for audio signal input, and a user input unit 123 (for example, a touch key and a mechanical key)) for receiving information from a user. Voice data or image data collected by the input unit 120 are be analyzed and processed as a user's control command.

The sensing unit 140 may include one or more sensors for sensing at least one of information in a watch-type mobile terminal, environmental information around a watch-type mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone 122, a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a watch-type mobile terminal disclosed in this specification may combine and utilize information sensed by at least two of these sensors.

The output unit 150 is used for generating a visual, auditory or haptic output and may include a display unit 151, a sound output unit 152, a haptic module 153, and an optical output unit 154. The display unit 151 may be formed in a mutual layer structure with a touch sensor or formed integrally, so a touch screen may be implemented. Such a touch screen may serve as the user input unit 123 providing an input interface between the watch-type mobile terminal 100 and a user and an output interface between the watch-type mobile terminal 100 and a user at the same time.

The interface unit 160 serves as a path to various kinds of external devices connected to the watch-type mobile terminal 100. The interface unit 170 may include at least one of a wired/wireless headset port, an external charger port, a wired/wireless data port, a memory card port, a port connecting a device that includes an identification module, an audio input and output (I/O) port, a video IO port, and an earphone port. In correspondence to that an external device is connected to the interface unit 160, the watch-type mobile terminal 100 may perform appropriate control over the connected external device.

Also, the memory 170 stores data supporting various functions of the watch-type mobile terminal 100. The memory 170 may store a plurality of application programs (for example, application programs or applications) running on the watch-type mobile terminal 100 and also data and commands for operations of the watch-type mobile terminal 100. At least some of such application programs may be downloaded from an external server through wireless communication. Also, at least some of these application programs may be included in the watch-type mobile terminal 100 from the time of release in order to perform a basic function (for example, functions of receiving and transmitting a call and functions of receiving and transmitting a message) of the watch-type mobile terminal 100. Moreover, an application program may be stored in the memory 170 and installed on the watch-type mobile terminal 100, so it may run to perform an operation (or a function) of the watch-type mobile terminal 100 by the control unit 180.

The control unit 180 generally controls overall operations of the watch-type mobile terminal 100 besides an operation relating to the application program. By processing signals, data, and information input/output through the above components or executing application programs stored in the memory 170, the control unit 180 may provide appropriate information or functions to a user or process them.

Also, in order to execute an application program stored in the memory 170, the control unit 180 may control at least some of the components shown in FIG. 1. Furthermore, in order to execute the application program, the control unit 180 may combine at least two of the components in the watch-type mobile terminal 100 and may then operate it.

The power supply unit 190 may receive external power or internal power under a control of the control unit 180 and may then supply power to each component in the watch type mobile terminal 100. The power supply unit 190 includes a battery and the battery may be a built-in battery or a replaceable battery.

At least some of the components may operate cooperatively in order to implement operations, controls, or control methods of the watch-type mobile terminal according to various embodiments to be described below. Also, the operations, controls, or control methods of the watch-type mobile terminal may be implemented on the watch-type mobile terminal by executing at least one application program stored in the memory 170.

Hereinafter, prior to examining various embodiments implemented through the watch-type mobile terminal 100, the above-listed components are described in more detail with reference to FIG. 1.

First, in describing the wireless communication unit 110, the broadcast receiving module 111 of the wireless communication unit 110 receives a broadcast signal and/or broadcast related information from an external broadcast management server through a broadcast channel. The broadcasting channel may include a satellite channel or a terrestrial channel. Two or more broadcast receiving modules for simultaneous broadcast reception or broadcast channel switching for at least two broadcast channels may be provided to the watch-type mobile terminal 100.

The sensing unit 140 senses at least one of information in the watch-type mobile terminal, environmental information around the watch-type mobile terminal, and user information and then generates a sensing signal corresponding thereto. On the basis of such a sensing signal, the control unit 180 may control the driving or operation of the watch-type mobile terminal 100 or may perform data processing, functions, or operations relating to an application program installed in the watch-type mobile terminal 100. Representative ones of various sensors that may be included in the sensing unit 140 are described in more detail.

Firstly, the proximity sensor 141 indicates a sensor that detects the absence and presence of an object approaching or near a certain subject surface without mechanical contact by using the force of an electromagnetic field or infrared ray. The proximity sensor 141 may be disposed in an inner region of the watch-type mobile terminal surrounded by the touch screen or be disposed around the touch screen.

Examples of the proximity sensor 141 include a transmissive photoelectric sensor, a direct reflective photoelectric sensor, a mirror reflective photoelectric sensor, a high-frequency oscillating proximity sensor, a capacitive proximity sensor, a magnetic proximity sensor, and an infrared proximity sensor. If the touch screen is a capacitive type, the proximity sensor 141 may be configured to detect the proximity of an object by changes in an electric field according to the proximity of the object having conductivity. In this case, the touch screen (touch sensor) itself may be classified as a proximity sensor.

For the convenience of description, an action recognizing that an object approaches the touch screen and is located on the touch screen without a contact is referred to as a "proximity touch" and an action made when the object is in actual contact with the touch screen is referred to as a "contact touch". A location that the object is proximity-touched on the touch screen is a location that the object is perpendicular to the touch screen when the object is proximity-touched. The proximity sensor 141 may sense the proximity touch and proximity touch patterns (e.g., a proximity touch distance, a proximity touch direction, a proximity touch speed, a proximity touch time, a proximity touch location, and a proximity touch change state). Moreover, the control unit 180 may process data (for information) corresponding to a proximity touch operation and a proximity touch pattern, sensed through the proximity sensor 141, and furthermore output visual information corresponding to the processed data to the touch screen. Furthermore, according to whether a touch for the same point on the touch screen is the proximity touch or the contact touch, the control unit 180 may control the watch-type mobile terminal 100 to process different operations or data (or information).

The touch sensor senses a touch (or a touch input) applied to the touch screen (or the display unit 151) by using at least one of various touch methods, for example, a resistive film method, a capacitive method, an infrared method, an ultrasonic method, and a magnetic field method.

For example, the touch sensor may be configured to convert a pressure applied to a specific portion of the touch screen or changes in capacitance occurring at a specific portion into electrical input signals. The touch sensor may be configured to detect a location and area that a touch target applying a touch to the touch screen touches the touch sensor, a pressured when touched, and a capacitance when touched. In this example, the touch target, as an object applying a touch to the touch sensor, may be e.g., a finger, a touch pen, a stylus pen, or a pointer.

As such, when there is a touch input to the touch sensor, a corresponding signal(s) is transmitted to a touch controller. The touch controller processes the signal(s) and then transmits corresponding data to the control unit 180. Accordingly, the control unit 180 may be aware of which region of the display unit 151 is touched. In this example, the touch controller may be a component different from the control unit 180 or may be the control unit 180 itself.

Moreover, the control unit 180 may perform different controls or the same control according to types of a touch target touching the touch screen (or a touch key implemented outside the touch screen). Whether to perform different controls or the same control according to types of a touch target may be determined according to a current operation state of the watch-type mobile terminal 100 or an application program in execution.

Moreover, the above-mentioned touch sensor and proximity sensor are provided separately or combined and may thus sense various types of touches, for example, short (or tap) touch, long touch, multi touch, drag touch, flick touch, pinch-in touch, pinch-out touch, swipe touch, and hovering touch for the touch screen.

The display unit 151 displays (outputs) information processed by the watch-type mobile terminal 100. For example, the display unit 151 may display execution screen information on an application program running on the watch-type mobile terminal 100 or user interface (UI) and graphic user interface (GUI) information according to such execution screen information.

The sound output unit 152 may output audio data received from the wireless communication unit 110 or stored in the memory 170 in a call signal receiving mode, a call mode, a recording mode, a voice recognition mode, and a broadcasting receiving mode. The sound output module 152 also outputs a sound signal related to a function that is performed by the watch-type mobile terminal 100 (e.g., call signal receiving sound or message receiving sound). The sound output module 152 may include a receiver, a speaker and a buzzer.

The optical output unit 154 outputs a signal for notifying event occurrence by using light of a light source of the watch-type mobile terminal 100. An example of an event occurring in the watch-type mobile terminal 100 includes message reception, call signal reception, missed calls, alarm, plan notification, e-mail reception, and information reception through an application.

A signal output from the optical output unit 154 is implemented as the watch-type mobile terminal emits single color or multi-color to the front or the back thereof. The signal output may be terminated when the watch-type mobile terminal senses user's event confirmation.

The memory 170 may store programs for the operation of the control unit 180 and temporarily store data (e.g., a phone book, a message, a still image, and a video) that is input and output. The memory 170 may store data on sound and vibrations having various patterns that are output when there is a touch input to the touch screen.

Moreover, as mentioned above, the control unit 180 controls operations relating to an application program and overall operations of the mobile terminal 100 in general. For example, if a state of the watch-type mobile terminal 100 satisfies set conditions, the control unit 180 may execute or release a lock state disabling a user's control command input to applications.

Also, the control unit 180 may perform a control or processing relating to a voice call, data communication, and a video call or may perform pattern recognition processing for recognizing handwriting input or drawing input to the touch screen as a text and an image, respectively. Furthermore, the control unit 180 may control at least one of the above components or a combination thereof in order to implement various embodiments to be described below on the watch-type mobile terminal 100.

Various embodiments described herein may be implemented in a recording medium that may be read with a computer or a similar device by using software, hardware or a combination thereof.

Figure 2A:
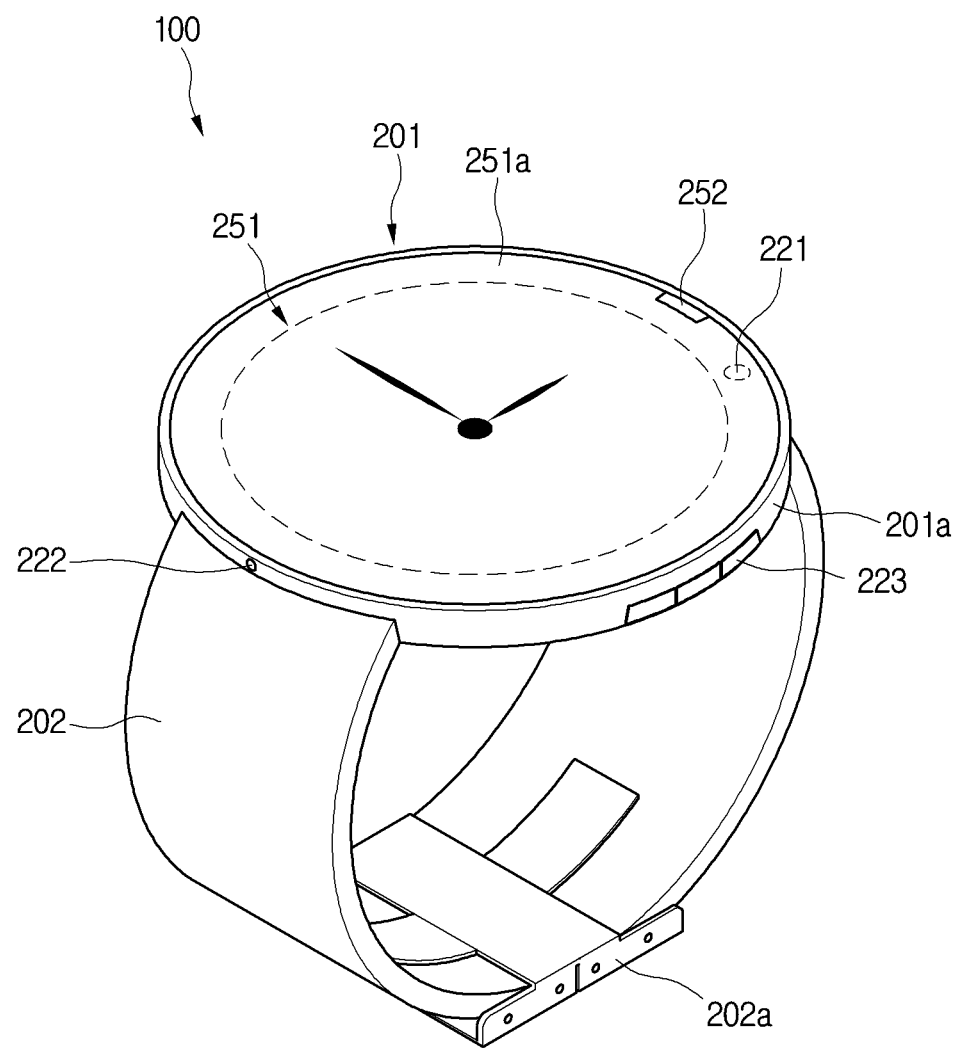
FIG. 2a is a perspective view of an example of a watch-type mobile terminal related to an embodiment.
Figure 2B:
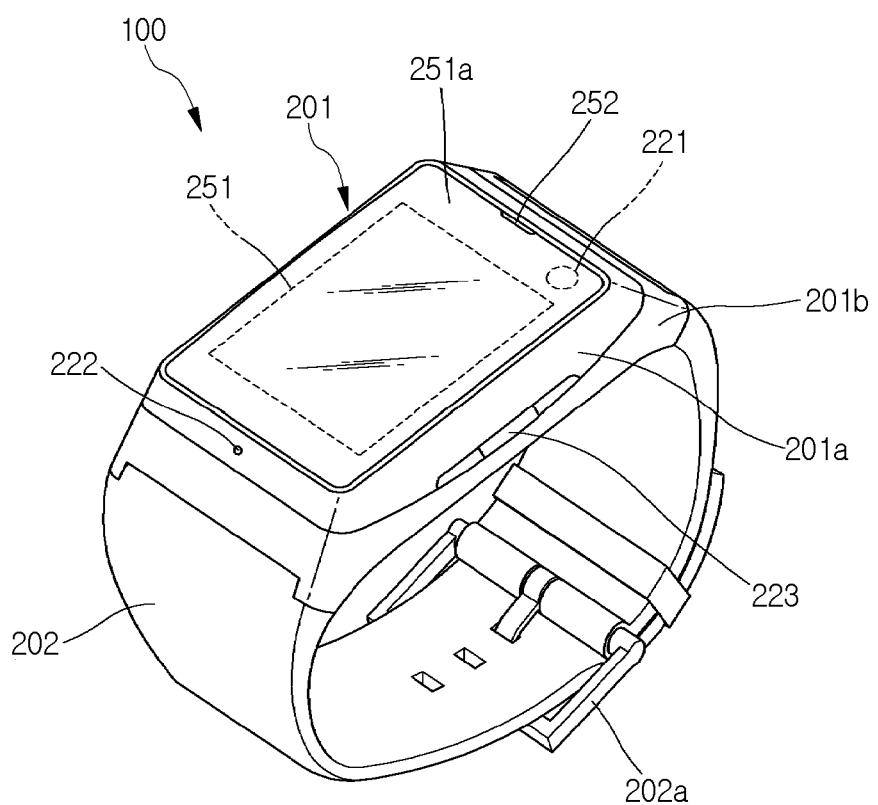
FIG. 2b is a perspective view of another example of a watch-type mobile terminal related to an embodiment.

FIG. 2a is a perspective view of an example of a watch-type mobile terminal related to an embodiment, and FIG. 2b is a perspective view of another example of a watch-type mobile terminal related to an embodiment.

In FIGS. 2a and 2b, the touch screen 151 of the touch screen 151 of the watch-type mobile terminal 100 is different in shape and the functions of other components mare the same. That is, the touch screen 151 of the watch-type mobile terminal 100 in FIG. 2a has a circular shape but the touch screen 151 of the watch-type mobile terminal 100 may have a quadrilateral shape. The touch screen 151 in FIG. 2a may have an oval shape instead of the circular shape but is not limited thereto. The touch screen 151 in FIG. 2b may have a pentagonal or hexagonal shape instead of the quadrilateral shape but is not limited thereto.

The shape of the touch screen 151 of an embodiment may include any shape that may provide a visually good expression to a user and assist a user in manipulating the touch screen 151.

Referring to FIGS. 2a and 2b, the watch-type mobile terminal 100 includes a body 201 including a display unit 251, and a band 202 configured to be connected to the body 201 and to be capable of being worn on a wrist. In general, the watch-type mobile terminal 100 may include the same or similar characteristics as the watch-type mobile terminal 100 in FIG. 1.

The display unit 251 may be the touch screen in FIG. 1.

The body 201 includes a casing forming the exterior. As shown, the casing may include a first casing 201a and a second casing 201b that provide an internal space receiving various electronic parts. However, the inventive concept is not limited thereto and a casing may be configured to provide the internal space so that the watch-type mobile terminal 100 having a uni-body may also be implemented.

The watch-type mobile terminal 100 may be configured to perform wireless communication and an antenna for the wireless communication may be installed in the body 201. The antenna may expand its performance by using a casing. For example, a casing including a conductive material may be electrically connected to the antenna to expand a ground region or radiation region.

The display unit 251 is disposed on the front of the body 201 to be capable of outputting information, and the display unit 251 includes a touch sensor to be implemented as a touch screen. As shown, a window 251a of the display unit 251 may be disposed on the first casing 201a to be capable of forming the front of the body of a terminal along with the first casing 201a.

The body 201 may include a sound output unit 252, a camera 221, a microphone 222, a user input unit 223, and so on. When the display unit 251 is implemented as a touch screen, it may function as the user input unit 223 and thus the body 201 may not include a key separately.

The band 202 is configured to be worn on the wrist and cover it and may be formed of a flexible material to enable easy wearing. For example, the band 202 may be formed of leather, rubber, silicon, synthetic resin materials or the like. Also, the band 202 may be configured to be wearable on the body 201 so that a user may use bands of various shapes through replacement.

The band 202 may also be used for enhancing the performance of an antenna. For example, a ground expansion unit (not shown) connected electrically to the antenna to expand a ground region may be built in the band.

The band 202 may have a fastener 202a. The fastener 202a may be implemented by a buckle, a hook structure enabling snap-fit, a Velcro (brand name) tape or the like and include a section or material having elasticity. FIGS. 2a and 2b present an example where the fastener 202a is implemented in the form of a buckle.

In the following, embodiments related to a control method that may be implemented in the watch-type mobile terminal 100 as described above are discussed with reference to the accompanying drawings. It is obvious to a person skilled in the art that the inventive concept may be embodied in other particular forms without departing the spirit and essential characteristic of the inventive concept.

The control unit 180 of the inventive concept may operate in a normal mode or in a low-power mode. The low-power mode may be referred to as an ambient mode but is not limited thereto.

The control unit 180 may enable a standby screen to be displayed in the normal mode. In addition, the control unit 180 may enable the standby screen to be displayed in the low-power mode.

Figure 7A:
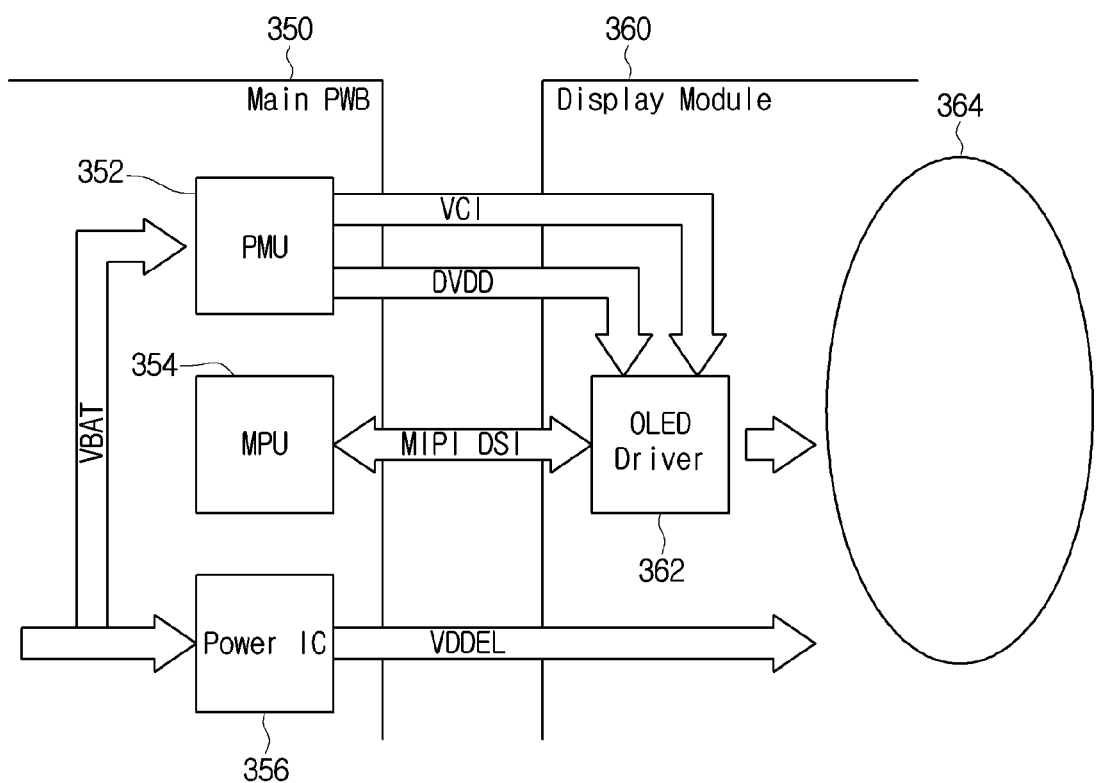
FIG. 7a shows power flow in a normal mode according to an embodiment.

In the present disclosure, functions normally using power, such as data transmission/reception, making calls, video streaming and so on in addition to a watch function may be performed in the normal mode. In particular, since the power VDDEL of a power supply unit 356 in FIG. 7a is supplied to display the standby screen, information having high luminance may be displayed on the standby screen.

Figure 7B:
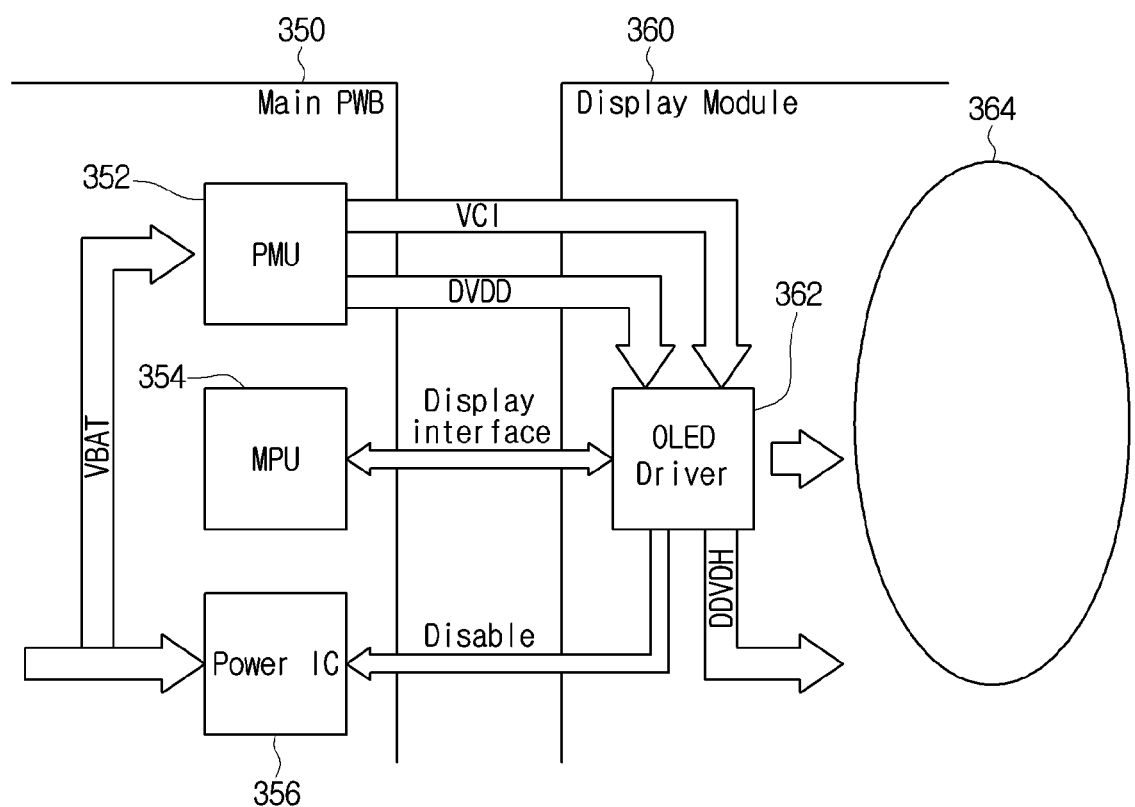
FIG. 7b shows power flow in a low-power mode according to an embodiment.

On the contrary, functions that do not cause inconvenience in transmitting information to a user even when power consumption decreases may be performed in the low-power mode. An example of these functions may include, but may not be limited to, transmitting voice messages for missed calls, schedules, plans, battery states, weather and so. In particular, as shown in FIG. 7b, the power VDDEL of the power supply unit 356 is not supplied to the touch screen 151, i.e., OLED driver 362 and instead, power DDVDH generated at the OLED driver 362 and lower than the power VDDEL of the power supply unit 356 is supplied to the touch screen 151 so that a corresponding ambient screen may be displayed. Thus, information having lower luminance than the standby screen may be displayed on the corresponding ambient screen.

Figure 3A:
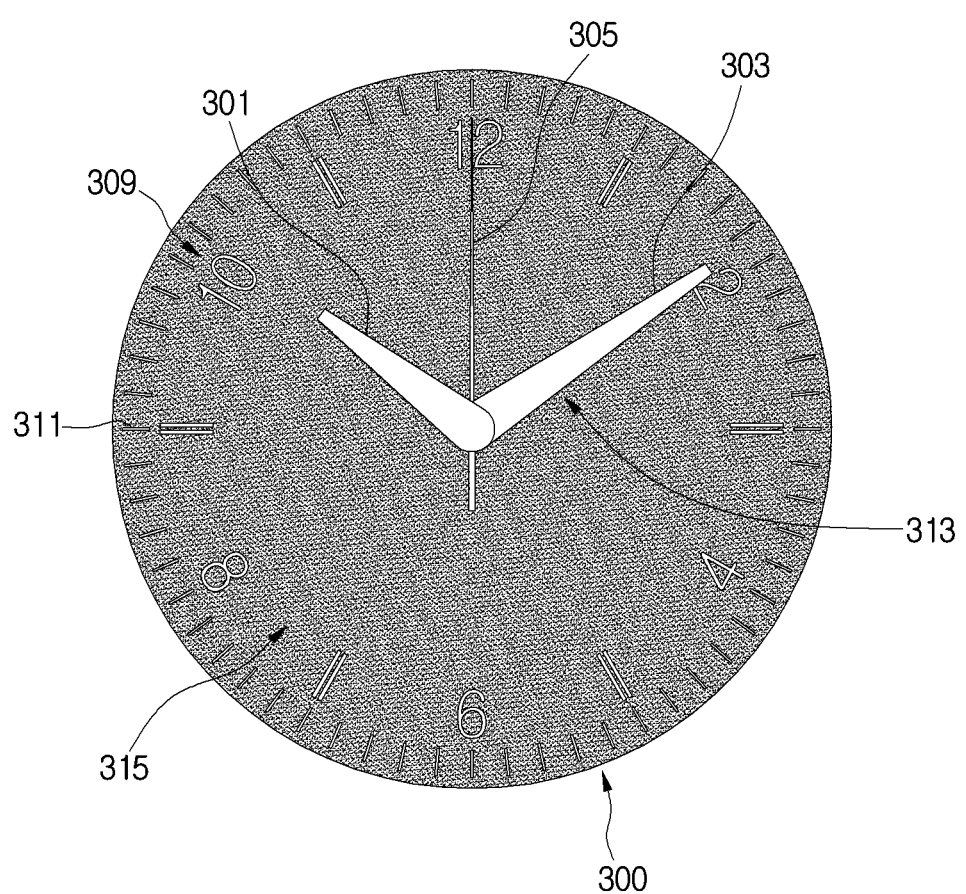
FIGS. 3a to 3c are screen shots showing a standby screen displayed in a normal mode.
Figure 3B:
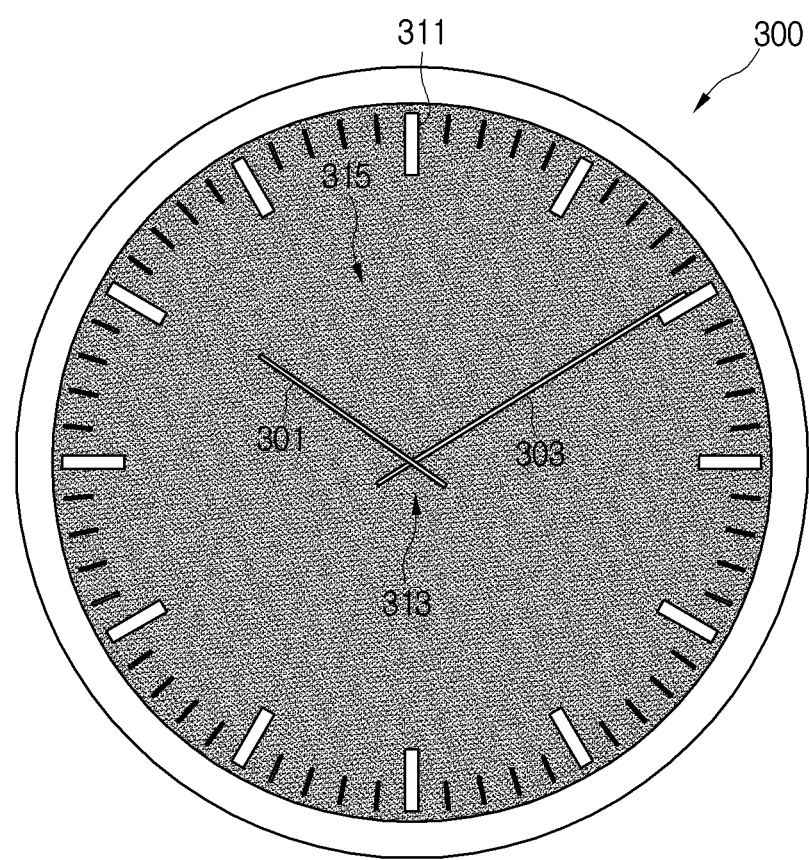

As shown in FIGS. 3a and 3b, an analog watch shape may be displayed on the standby screen 300.

As shown in FIG. 3a, an object region 313 such as an hour hand 301 or minute hand 303 on the standby screen 300 having the analog watch shape has luminance having high graylevel or white graylevel (255th graylevel) higher than the high graylevel and on the contrary, a background region 315 may have luminance lower than luminance of the object region 313 or having black graylevel (0th graylevel). The white graylevel has highest luminance and the black graylevel has lowest luminance.

As shown in FIG. 3b, the object region 313 on the standby screen 300 having the analog watch shape may has luminance having the black graylevel or having low graylevel higher than the black graylevel and on the contrary, the background region 315 may have luminance higher than the object region 313 or having white graylevel.

Figure 3C:
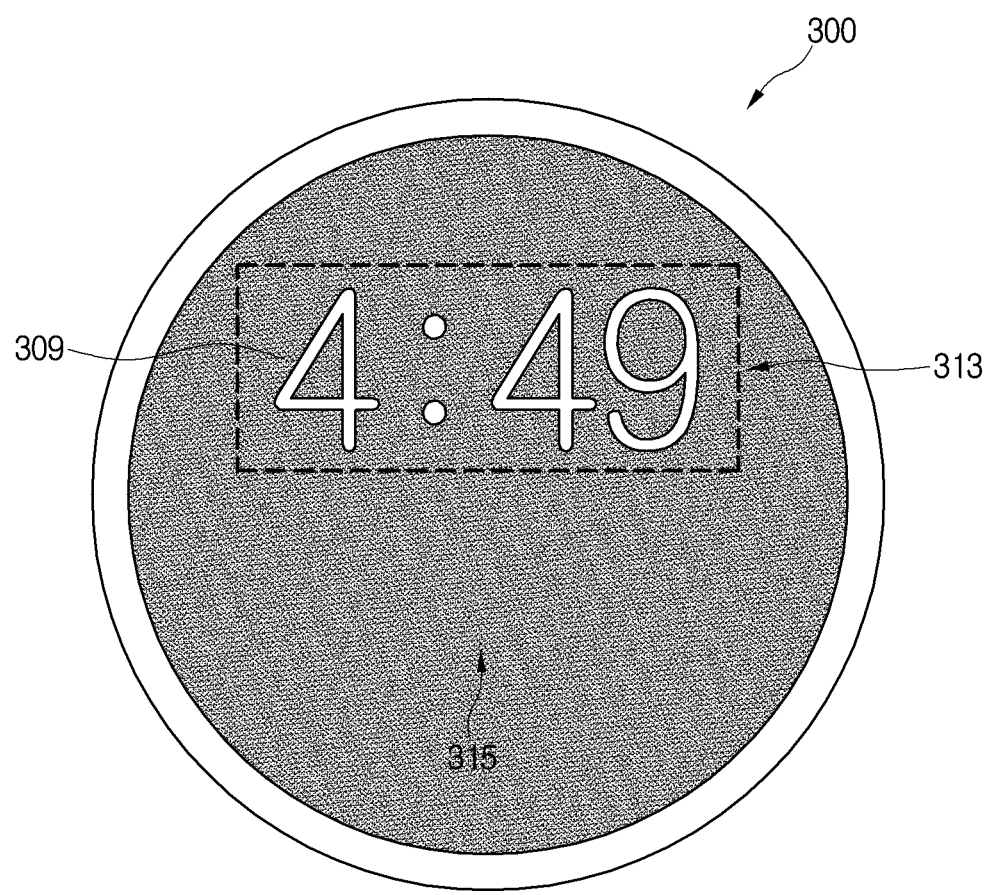

As shown in FIG. 3c, a digital watch shape may be displayed on the standby screen 300. In this case, the object region 313 including numbers on the standby screen 300 having the digital shape may have luminance having high graylevel or white graylevel higher than the graylevel and on the contrary, the background region 315 may have luminance lower than the object region 313 or having black graylevel.

The standby screen 300 may include the object region 313 and the background region 315.

For example, the object region 313 may include an hour hand 301, a minute hand 303, a second hand 305, letters, numbers 309, and scales. For example, the background region 315 may be other regions excluding the object region 313 from the standby screen 300.

The standby screens 300 on FIGS. 3a to 3c are represented in black or white but the inventive concept may be represented in full colors close to natural colors.

Since the object region 313 or background region 315 on the standby screen 300 is represented with luminance having graylevel between black graylevel and white graylevel or having white graylevel, power consumption may increase. In addition, since the power VDDEL needing high power consumption is supplied from the power supply unit 356 in order to display the standby screen 300 as shown in FIG. 7a, power consumption may increase.

Figure 4:
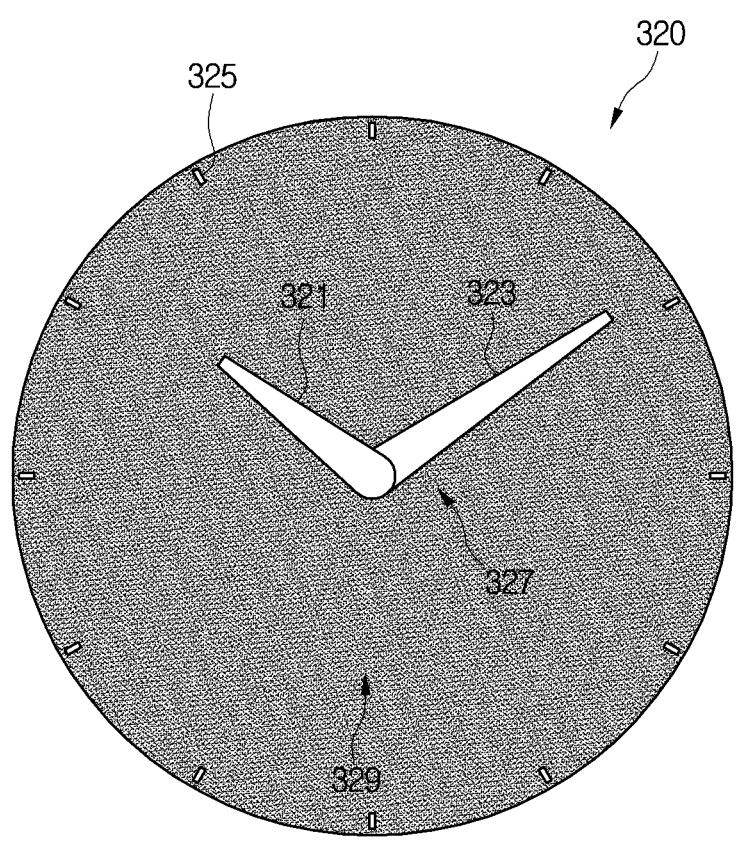
FIG. 4 is a screen shot showing an ambient screen displayed in a low-power mode.

On the contrary, as shown in FIG. 4, an ambient screen 320 having an analog watch shape may be displayed. Since the ambient screen 320 includes an object region 327 including minimum information, e.g., an hour hand 321, a minute hand 323, and scales 325, and a background region 329, power consumption may decrease compared to the analog watch shape on the standby screen 300. In addition, since as shown in FIG. 7b, the power VDDEL supplied from the power supply unit 356 increasing high power consumption is not used in order to display the ambient screen 320 and instead, and the power DDVDH generated from the OLED driver 362 and decreasing power consumption is used, displaying the ambient screen 320 in the low-power mode may decrease power consumption compared to displaying the standby screen 300 in the normal mode.

Since the inventive concept enables additional various information to be displayed on the ambient screen 320 displayed in the low-power mode and not the standby screen 300 displayed in the normal mode, power consumption may further decrease.

As another example, missed calls, schedules, plans, battery states, weather and so on may be further displayed on the ambient screen 320 in addition to the analog or digital watch shape, though not shown.

According to the inventive concept, since the type of the object 313 displayed on the ambient screen 320 may be minimized compared to the standby screen 300, power consumption may decrease.

The touch screen 151 of the inventive concept may include a liquid crystal display (LCD) device or organic light-emitting display (OLED) device.

Figure 5:
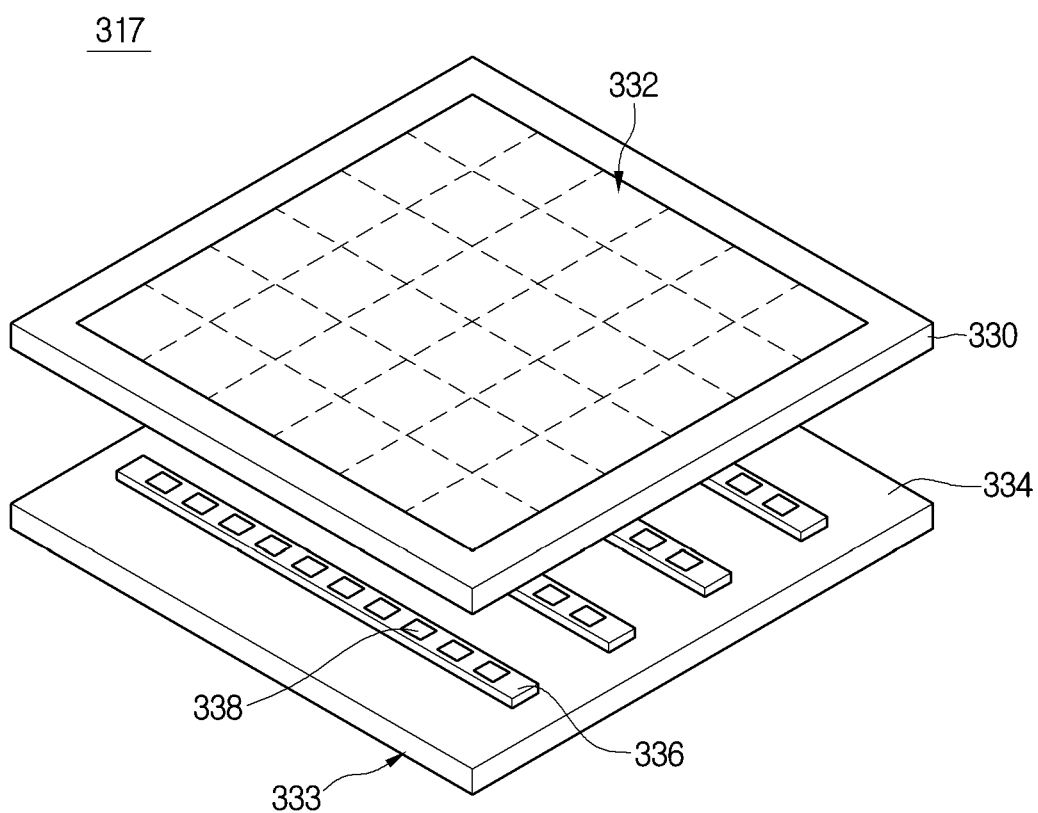
FIG. 5 shows a liquid crystal display (LCD) device as an example of a touch screen according to an embodiment.

FIG. 5 shows an LCD device as an example of a touch screen according to an embodiment.

Referring to FIG. 5, an LCD device 317 may include a LCD panel 330 and a backlight unit 333.

The LCD panel 330 may include two substrates, with liquid crystal materials therebetween and the liquid crystals of the liquid crystal materials may be displaced by power provided to electrodes disposed on the two substrates so that the transmissivity of light may be controlled.

The LCD panel 330 may include a plurality of pixels 332. Gate lines and data lines may be disposed on one of the two substrates so that the lines intersect each other, and pixels 332 may be defined by the intersection of the gate line and the data line.

The backlight unit 333 is a member for generating light to be provided to the LCD panel 330, a plurality of array substrates 336 spaced apart from each other is disposed on a casing 334, and a plurality of light emitting elements 338 may be mounted on each array substrate in a row. Each light emitting element 338 is a semiconductor light emitting element and may be a single white light emitting element generating a white light or a set light-emitting element including a red light-emitting element, a green light-emitting element, and a red light-emitting element in order to generate a white light, but the inventive concept is not limited thereto.

The luminance of the LCD device 317 may be determined by the intensity of power applied to each pixel 332 and an amount of light provided from the backlight unit 333. That is, when light is supplied from the backlight unit 333 to the LCD panel 330, the transmissivity of light passing through the LCD panel 330 varies depending on the twisted level of a liquid crystal of the liquid crystal material and luminance may be adjusted by a change in the transmissivity of light.

For example, when light completely fails to pass through a specific pixel 332 of the LCD panel 330, a corresponding specific pixel 332 may be expressed with luminance having black graylevel.

For example, when light provided from the backlight unit 333 passes through the specific pixel 332 of the LCD pan 01330, the corresponding specific pixel 332 may be expressed with luminance having high graylevel lower than white graylevel.

Thus, in order to express each pixel 332 of the LCD panel 330 with luminance having black graylevel or luminance having white graylevel or luminance having black graylevel and luminance having white graylevel, the intensity of power provided to each pixel 332 or the intensity of power provided to the backlight unit 333 may vary.

For example, when the specific pixel 332 needs to be expressed with luminance having black graylevel, there may be an off state in which any power may not be applied to the specific pixel 332 or any power may not be applied to the backlight unit 333.

For example, when the specific pixel 332 needs to be expressed with luminance having white graylevel, maximum power may be applied to the specific pixel 332 and power may be applied to the backlight unit 333.

Therefore, when each pixel 332 of the LCD panel 330 is expressed with luminance having black graylevel, minimum power may be consumed.

Figure 6:
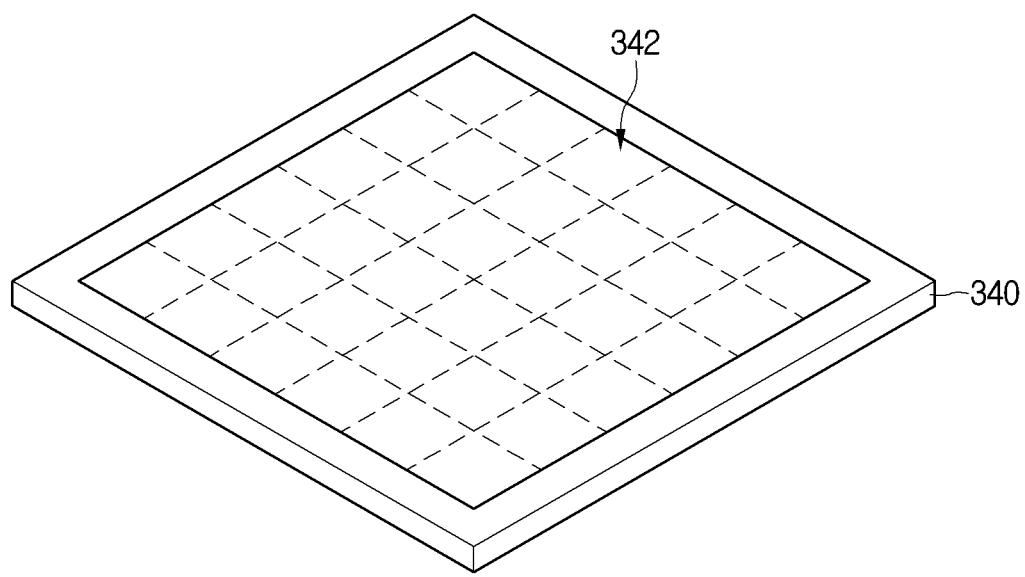
FIG. 6 shows an organic light-emitting display (OLED) as an example of a touch screen according to an embodiment.

FIG. 6 shows an OLED device as an example of a touch screen according to an embodiment.

Referring to FIG. 6, an OLED device 319 may include an OLED panel 340.

Since the OLED device 319 has no need for the backlight unit 333 that the LCD device 317 includes, its thickness may decrease compared to the LCD device 317.

The OLED panel 340 may include an organic emissive layer generating, by itself, light between two substrates.

The organic emissive layer may be formed of an organic material and include a plurality of layers.

The OLED panel 340 may include a plurality of pixels 342. Gate lines and data lines may be disposed on one of the two substrates so that the lines intersect each other, and pixels 342 may be defined by the intersection of the gate line and the data line.

An organic material corresponding to each pixel 342 may generate a black or white light or different color lights but the inventive concept is not limited thereto. Luminance expressed on each pixel 342 may increase or decrease depending on the intensity of power provided to each pixel.

Each pixel 342 of the OLED panel 340 may include a driving transistor. Thus, the luminance of light of each pixel 342 may vary depending on the intensity of a driving current flowing on the driving transistor. The intensity of the driving current flowing on the driving transistor may depend on the intensity of power supplied to each pixel or on the size of a data voltage.

For example, when power is not applied to the driving transistor, a corresponding pixel 342 does not generate light and may be thus expressed with luminance having black graylevel.

For example, when maximum power is applied to the driving transistor, a corresponding pixel 342 generates a maximum amount of light and may be thus expressed with luminance having white graylevel.

FIG. 7*a* shows power flow in a normal mode according to an embodiment, and FIG. 7*b* shows power flow in a low-power mode according to an embodiment.

As shown in FIG. 7*a*, in the normal mode, the power VDDEL is supplied from the power supply unit 356 of a main board 350 to the OLED panel 364 of a display module 360 so that a standby screen may be displayed on the OLED panel 364.

On the contrary, in the low-power mode, the power supply unit 356 of the main board 350 is disabled by a disable signal generated at the OLED driver 362 of the display module 360, so power is not supplied from the power supply unit 356 to the OLED panel 364, as shown in FIG. 7*b*. Instead, the power DDVDH is supplied from the OLED driver 362 to the OLED panel 364 so that an ambient screen may be displayed on the OLED panel 364 by the power DDVDH.

The power DDVDH from the OLED driver 362 may be lower than the power VDDEL from the power supply unit 356. For example, the power DDVDH from the OLED driver 362 may be about 5.5 V and the power VDDEL from the power supply unit 356 may be about 8 V but the inventive concept is not limited thereto.

As such, in the low-power mode, the luminance of the ambient screen may be implemented by the power DDVDH from the OLED driver 362 instead of the power VDDEL from the power supply unit 356. Thus, since the power DDVDH from the OLED driver 362 that is lower than the power VDDEL from the power supply unit 356 used in the normal mode is used in the low-power mode, power consumption may further decrease in the low-power mode compared to the normal mode.

As such, since in the low-power mode, power is not supplied from the power supply unit 356 to the OLED panel 364 and thus there is no power consumption, a waste of power may remarkable decrease.

Reference numerals 352 and 354 that are not mentioned but are shown in FIGS. 7*a* and 7*b* may represent a PMU and an MPU, respectively. The PMU 252 may generate a source voltage supplied to the OLED driver 362 and the MPU may generate a control signal for generating a data voltage of the OLED driver 362, but the inventive concept is not limited thereto.

The OLED panel 364 in FIGS. 7*a* and 7*b* may be the OLED panel 340 in FIG. 6 and the power supply unit 356 may be the power supply unit 190 in FIG. 1.

In the low-power mode, an operating frequency may be about 30 Hz, luminance may be maintained at about 10 nit, and there may be about 6,291 pixels, but the inventive concept is not limited thereto.

In the normal mode, the operating frequency may be about 60 Hz and luminance may also be higher than about 10 nit that is a value in the low-power mode.

Thus, in the low-power mode, an ambient screen displayed may be generally dark by low-power driving compared to the normal mode.

As such, since in the low-power mode, the ambient screen is displayed at a lower operating frequency and with lower luminance compared to the normal mode, power consumption may further decrease.

In the above, operations in the normal mode and low-power mode of the inventive concept have been discussed.

In the following, a method of selecting the normal or low-power mode, a method of switching between a standby screen and an ambient screen accordingly, and a switch between various ambient screens are described with reference to FIGS. 8 to 45.

Figure 8:
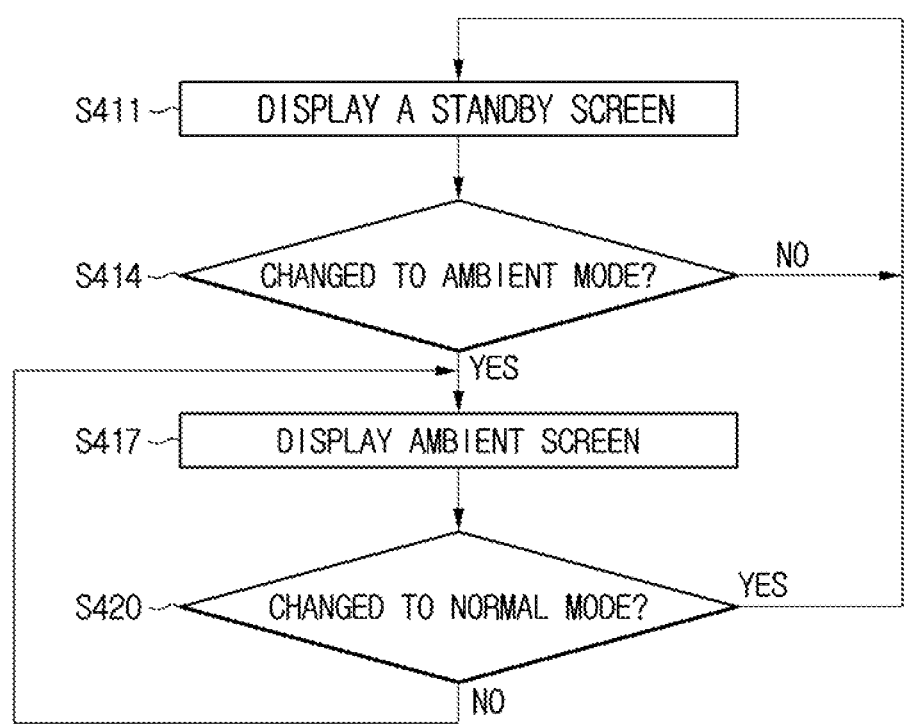
FIG. 8 is a flowchart of an operating method of a watch-type mobile terminal according to an embodiment.

FIG. 8 is a flowchart of an operating method of a watch-type mobile terminal according to an embodiment.

Referring to FIG. 8, the control unit 180 of a watch-type mobile terminal 100 displays a standby screen on a touch screen 151 in step S411.

A setting may be implemented such that the standby screen is displayed by default when power is supplied to the system (FIG. 1) of the watch-type mobile terminal 100 and the system is activated, but the inventive concept is not limited thereto.

For example, when power is not supplied to the system of the watch-type mobile terminal 100 to inactivate the system while the ambient screen is displayed, and then power is again supplied to the system of the watch-type mobile terminal 100 to activate the system, the ambient screen may be displayed or a standby screen may be displayed.

The standby screen may be displayed in a normal mode. In the normal mode, the power VDDEL from the power supply unit 356 may be supplied to the touch screen 151, e.g., OLED panel 364, as shown in FIG. 7*a*.

As such, since in the normal mode, the power VDDEL from the power supply unit 356 used for the display of the standby screen is high, power consumption may also increase.

On the contrary, in the low-power mode, the power VDDEL from the power supply unit 356 is not supplied o the OLED panel 364 and instead, the power DDVDH generated at the OLED driver 362 may be used for the display of the standby screen, as shown in FIG. 7*b*. Thus, since in the low-power mode, the power VDDEL from the power supply unit 356 is not used, there is no power consumption.

A standby screen 300 may include a plurality of object regions 313 and a background region 315 as shown in FIGS. 3*a* to 3*c*.

As shown in FIGS. 3*a* and 3*c*, when the object region 313 is expressed with white graylevel, the background region 315 may be expressed with black graylevel or graylevel lower than luminance of the object region 313.

On the contrary, when the background region 315 is expressed with white graylevel, the object region 313 may be expressed with black graylevel or graylevel lower than luminance of the background region 315 as shown in FIG. 3*b*.

When a change to the low-power mode is checked in step S414 and the change to the low-power mode is implemented, the control unit 180 displays the ambient screen on the touch screen 151 in step S417.

Since in the low-power mode, the power VDDEL from the power supply unit 356 is not used for the display of the ambient screen as described above, power consumption may remarkably decrease compared to the normal mode.

The ambient screen may be implemented as various screens and related descriptions are provided below.

the control unit 180 checks if it is changed to the normal mode in step S417 and if so, the process proceeds to step S411 and the control unit 180 displays the standby screen on the touch screen 151 in step S420.

In the present disclosure, when an external power source, e.g., battery power VBAT as shown in FIGS. 7a and 7b is applied to the PMU 352, the MPU 354 and the power supply unit 356, the normal mode may be set by default. Thus, the standby screen may be displayed on the touch screen 151.

Alternatively, when the external power source is turned on, the low-power mode may also be set by default, the inventive concept is not limited thereto.

In the following, various ambient screens that may be changed from the standby screen are described.

Figure 9:
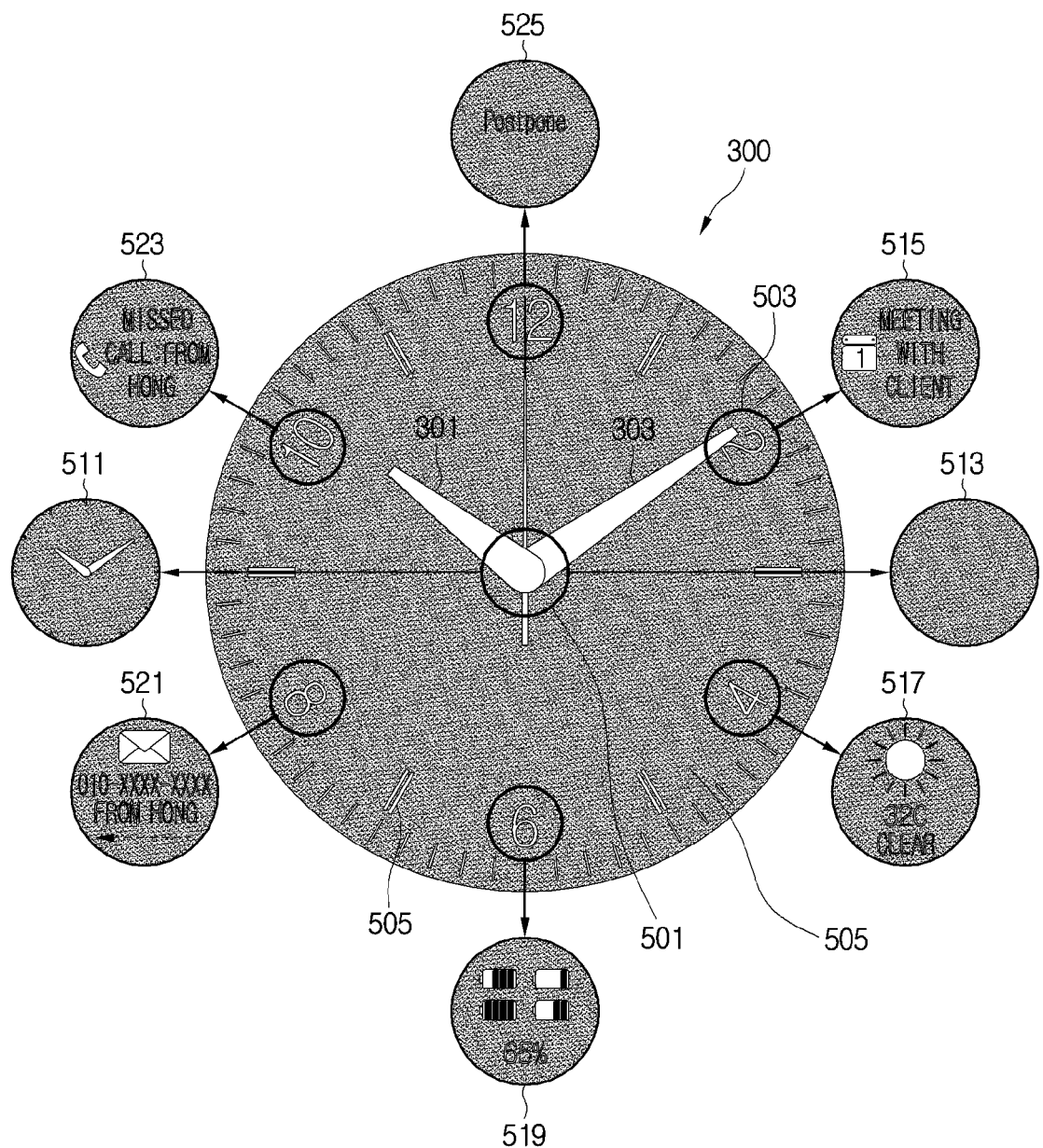
FIG. 9 is a screen shot showing a change from a standby screen to various ambient screens.

FIG. 9 is a screen shot showing a change from a standby screen to various ambient screens.

As shown in FIG. 9, a standby screen 300 may be changed to various ambient screens 511, 513, 515, 517, 519, 521, 523, and 525 in response to touch operations on different locations on the standby screen.

The standby screen 300 may have a central region 501 at which an hour hand 301 and a minute hand 303 meet, and a number region 503 on which numbers for times are displayed.

The number region 503 may be displayed along the perimeter of the standby screen 300 at a distance from the central region 201 of the standby screen 300.

For example, numbers, such as "2", "4", "6", "8", "10", "12" may be indicated on the number region. Big scales located between numbers may be indicated by corresponding numbers, such as "1", "3", "5", "7", "9", "11" but the inventive concept is not limited thereto.

The touch screen 151 may be designed so that the number region 503 including the number is distinguished from another region surrounding the number region, e.g., background region 505.

The number region 530 may include a surrounding region adjacent to a corresponding number as well as the corresponding number. The range of the surrounding region may be designed by a manufacturer or set by a user.

As a first example, when a tap operation of tapping the central region 501 on the standby screen 300 twice is input, an ambient screen 511 having an analog watch shape showing minimum information may be displayed instead of the standby screen 300

The analog watch shape displayed on the ambient screen 511 may minimize power because it is simpler compared to the analog watch shape on the standby screen 300 (the watch shape is expressed with high graylevel or white graylevel). For example, the analog watch shape displayed on the ambient screen 511 may have an hour hand, a minute hand, and hour-based scales that correspond to graylevel between black graylevel and white graylevel. On the contrary, the analog watch shape on the standby screen 300 may have an hour hand 301, a minute hand 303, a second hand, hour-based and minute-based scales, letters, numbers, and so on. In addition, another kind of a watch excluding the analog watch shape may be further displayed on the standby screen 300.

As such, since power consumption increases in order to display the analog watch shape on the standby screen 300, a change to a low-power mode may be implemented to display the analog watch shape on the ambient screen 511 so that power consumption may decrease.

As a second example, when a tap operation of tapping the central region 501 on the standby screen 300 three time is input, the ambient screen 513 having black graylevel may be displayed instead of the standby screen 300. Since as shown in FIG. 7b, any power from the power supply unit 356 or the OLED driver 362 is not applied to the touch screen 151, the ambient screen 513 having black graylevel through which a user may not see anything may be displayed.

Since the ambient screen 513 having black graylevel has no power consumption, a change to the ambient screen 513 having black graylevel when the watch-type mobile terminal 100 is not used may be efficient in decreasing power consumption.

In this example, the ambient screen 513 having black graylevel indicates the turn off of the touch screen 515, so it should be noted that this is different from what the battery power VBAT is not applied to the components 352, 354 and 356 by compulsory turn off as shown in FIGS. 7a and 7b.

In the present disclosure, the ambient screen 513 may be expressed with black graylevel because the battery power VBAT is supplied to the components 352, 354 and 356 but any power from the power supply unit 356 or the OLED driver 362 is not supplied to the touch screen 151, i.e., OLED panel 364.

As a third example, when a tap operation of tapping the number region 503 including "2" on the standby screen 300 twice is input, the ambient screen 515 showing a meeting plan may be displayed instead of the standby screen 300. For example, the letters 'meeting with client' may be expressed with graylevel higher than black graylevel or with white graylevel on the ambient screen 151 and other regions excluding the letters, i.e., background region may be expressed with black graylevel.

Thus, since only some letters of the entire size of the ambient screen 515 consume power and the background region has no power consumption, the ambient screen 515 may be displayed with minimum power.

As a fourth example, when a tap operation of tapping the number region 503 including "4" on the standby screen 300 twice is input, the ambient screen 517 showing weather information may be displayed instead of the standby screen 300. For example, an item representing a weather state and information on temperature and the weather state may be expressed with high graylevel or white graylevel on the ambient screen 517 and the background region may be expressed with black graylevel.

Thus, since only some items or information of the entire size of the ambient screen 517 consume power and the background region has no power consumption, the ambient screen 517 may be displayed with minimum power.

As a fifth example, when a tap operation of tapping the number region 503 including "6" on the standby screen 300 twice is input, the ambient screen 519 showing battery state information may be displayed instead of the standby screen 300. For example, an item representing a battery state may be expressed with high graylevel or white graylevel on the ambient screen 519 and the background region may be expressed with black graylevel.

Thus, since only some items of the entire size of the ambient screen 519 consume power and the background region has no power consumption, the ambient screen 519 may be displayed with minimum power.

As a sixth example, when a tap operation of tapping the number region 503 including "8" on the standby screen 300 twice is input, the ambient screen 521 showing a text message may be displayed instead of the standby screen 300. For example, an item representing the text message, the other party's phone number and name may be expressed with high graylevel or white graylevel on the ambient screen 521 and the background region may be expressed with black graylevel.

Thus, since only some items or information of the entire size of the ambient screen 521 consumes power and the background region has no power consumption, the ambient screen 521 may be displayed with minimum power.

As a seventh example, when a tap operation of tapping the number region 503 including "10" on the standby screen 300 twice is input, the ambient screen 523 showing missed calls may be displayed instead of the standby screen 300. For example, an item representing a missed call, information on the missed call, and the other party's name may be expressed with high graylevel or white graylevel on the ambient screen 523 and the background region may be expressed with black graylevel.

Thus, since only some items or information of the entire size of the ambient screen 523 consumes power and the background region has no power consumption, the ambient screen 523 may be displayed with minimum power.

As an eighth example, when a tap operation of tapping the number region 503 including "12" on the standby screen 300 twice is input, the ambient screen 525 showing a user-defined notification may be displayed instead of the standby screen 300. For example, when the user-defined notification is 'postpone', the information 'postpone' is expressed with high graylevel or white graylevel on the standby screen 300 and the background region may be expressed with black graylevel.

Thus, since only some items or information of the entire size of the ambient screen 525 consumes power and the background region has no power consumption, the ambient screen 525 may be displayed with minimum power.

As shown in FIG. 3b, even when the background region 315 on the standby screen 300 is expressed with high graylevel or white graylevel, the background regions of the ambient screens 511, 513, 515, 517, 519, 521, 523, and 525 according to first to eighth examples may be expressed with black graylevel in order to decrease power consumption.

The sizes of the background regions of the ambient screens 511, 513, 515, 517, 519, 521, 523, and 525 according to the first to eighth examples may be larger than those of object regions representing information, but the inventive concept is not limited thereto.

The touch operations in the third to eighth examples may be tap operations of tapping corresponding number regions 503 twice on the standby screen 300 but the inventive concept is not limited thereto.

Since the background regions of the ambient screens 511, 513, 515, 517, 519, 521, 523, and 525 are expressed with black graylevel having no power consumption, power consumption may further decrease with an increase in the size of the background region and with a decrease in the size of an object representing information.

When a tap operation of tapping the standby screen 300 once is input, notification windows (not shown) showing information on the ambient screens 515, 517, 519, 521, 523, and 525 may displayed on the number regions 503. When a tap operation of tapping a corresponding notification window once is input, the standby screen 300 may be changed to the ambient screen 515, 517, 519, 521, 523, or 525 corresponding to the corresponding notification window so that the ambient screen may be displayed.

FIGS. 10a to 10d are screen shots showing a change from a standby screen having an analog watch shape to an ambient screen including a specific item.

Figure 10A:
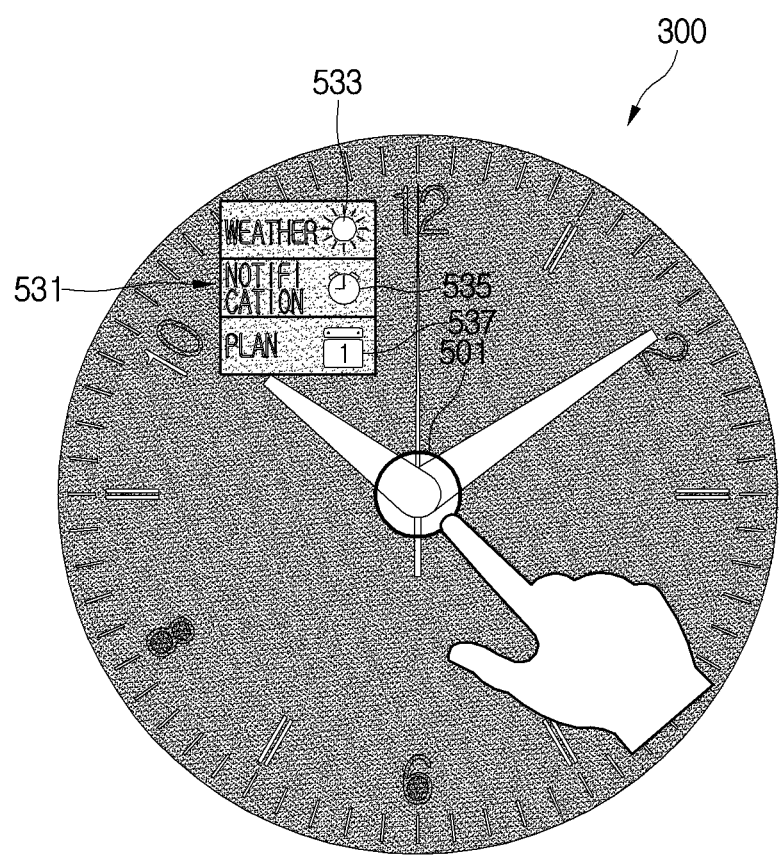
FIGS. 10a to 10d are screen shots showing a change from a standby screen having an analog watch shape to an ambient screen including a specific item.

As shown in FIG. 10a, when a tap operation of tapping the central region 501 twice on the standby screen 300 and a hold & touch operation are input, a notification window 531 including a weather item 533, a notification item 535, and a plan item 537 may be displayed.

The hold & touch operation may mean that the central region 501 is touched and the touch is maintained.

The notification window 531 may be displayed on a specific region on the standby screen 300. For example, the notification window 531 may be displayed on a region between the number "9" and the number "12" but the inventive concept is not limited thereto.

Figure 10B:
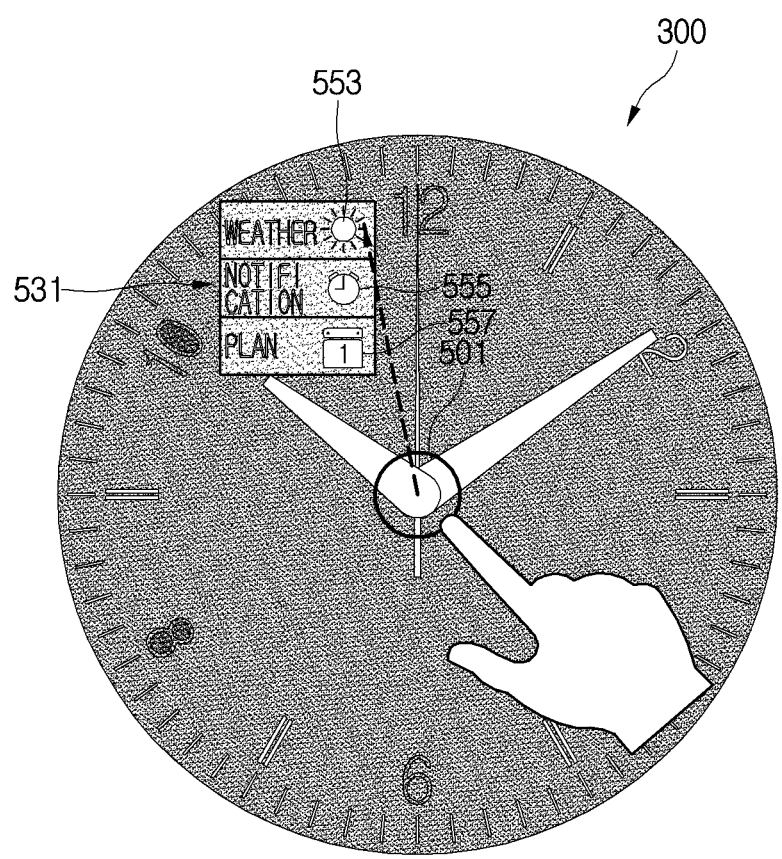
Figure 10C:
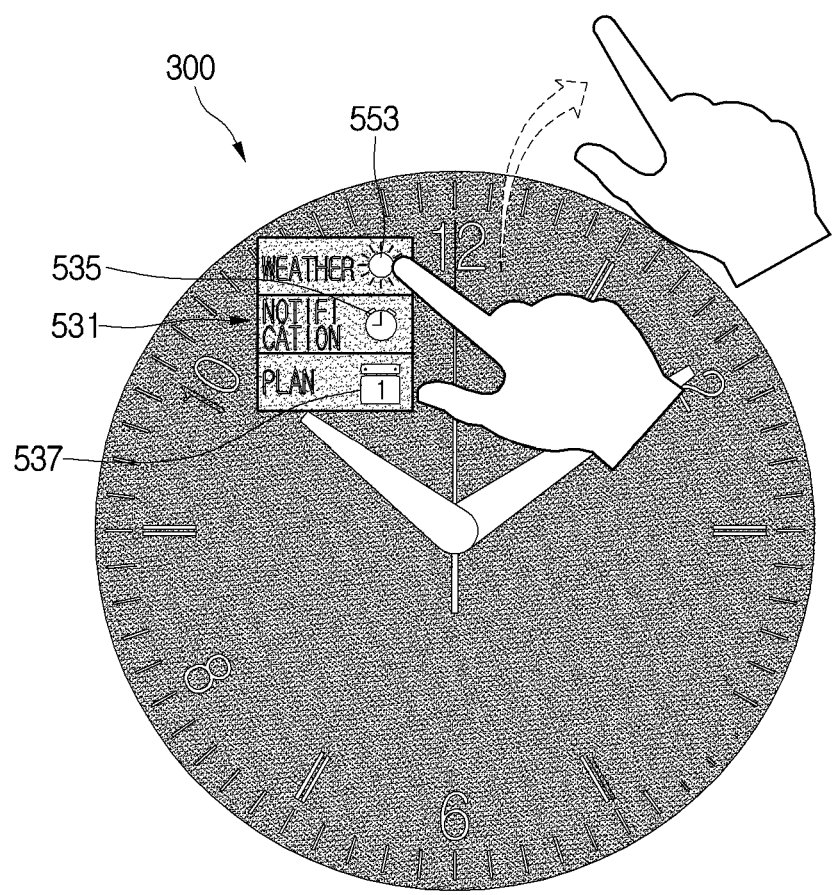
Figure 10D:
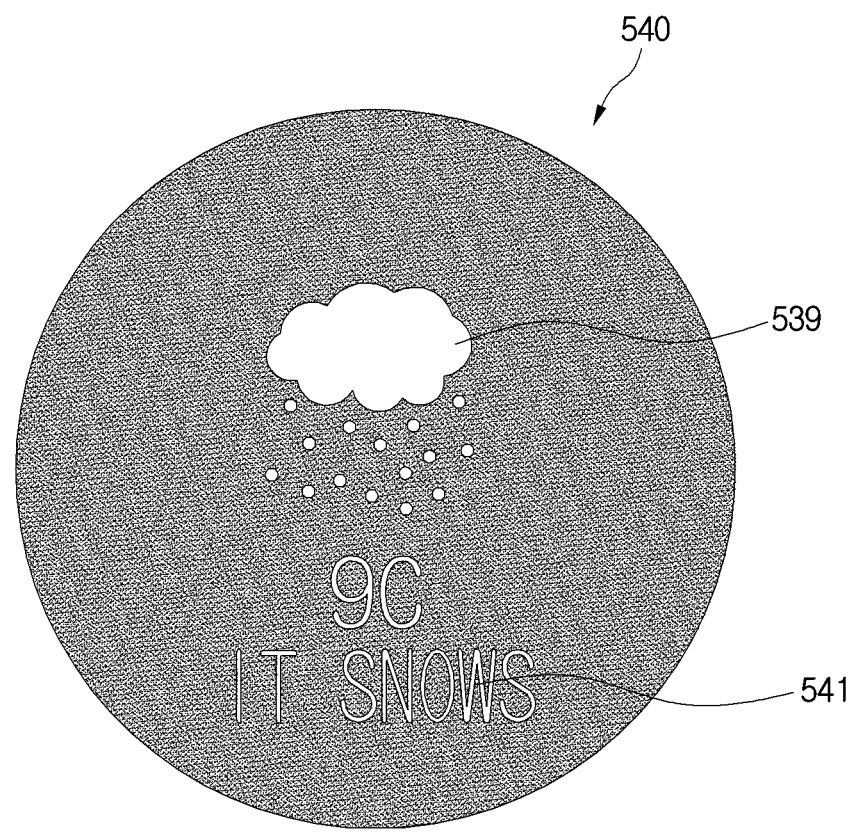

When a dragging operation from the central region 501 to a specific item is input (in FIG. 10b) and then a drop operation from the specific item is input (in FIG. 10c), the standby screen 300 is changed to an ambient screen 540 and information corresponding to the specific item may be displayed on the ambient screen 540 (in FIG. 10d).

For example, as shown in FIGS. 10b and 10c, when dragging from the central region 501 on the standby screen 300 to the weather item 533 of the notification window 531 is performed and then a drop operation from the weather item 533 is performed, an item 539 representing a weather state and information 541 on temperature and forecast may be displayed on the ambient screen 540, as shown in FIG. 10d.

In FIG. 10b, when dragging to a specific item is performed and a finger is located on the specific item, the size of the specific item may be enlarged. A user may easily check by the enlarged specific item whether a corresponding item has been correctly selected.

As not shown, when dragging to a specific item is performed and a finger is located on the specific item, the color of the specific color may be changed to be different from those of other items or the specific item may be highlighted, but the inventive concept is not limited thereto.

Figure 11A:
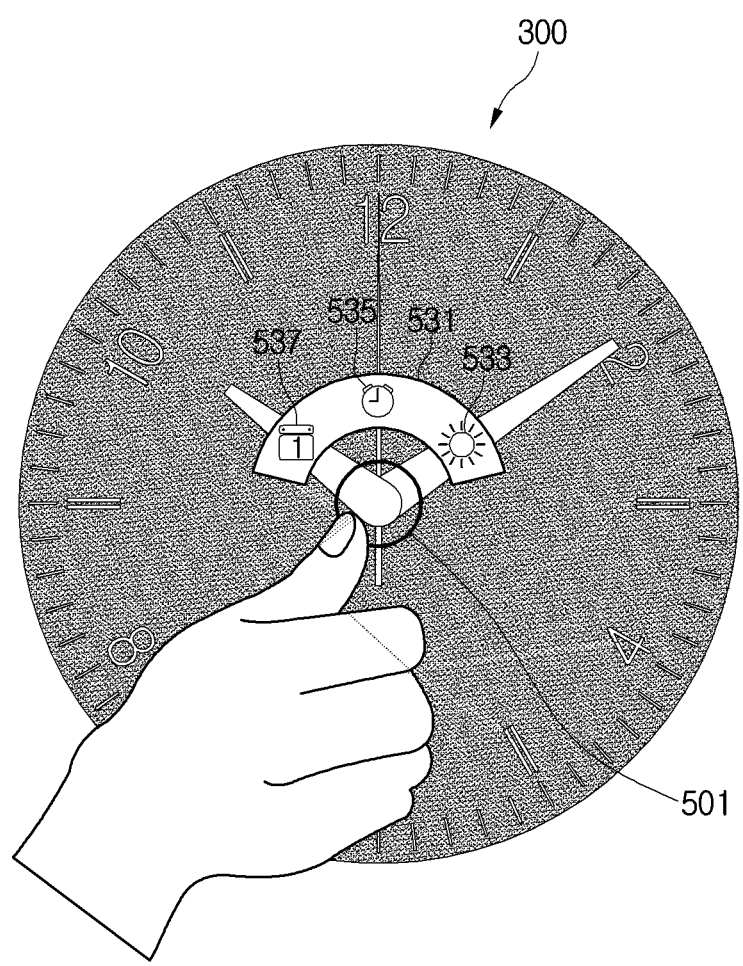
FIGS. 11a to 11c are other screen shots showing a change from a standby screen having an analog watch shape to an ambient screen including a specific item.
Figure 11B:
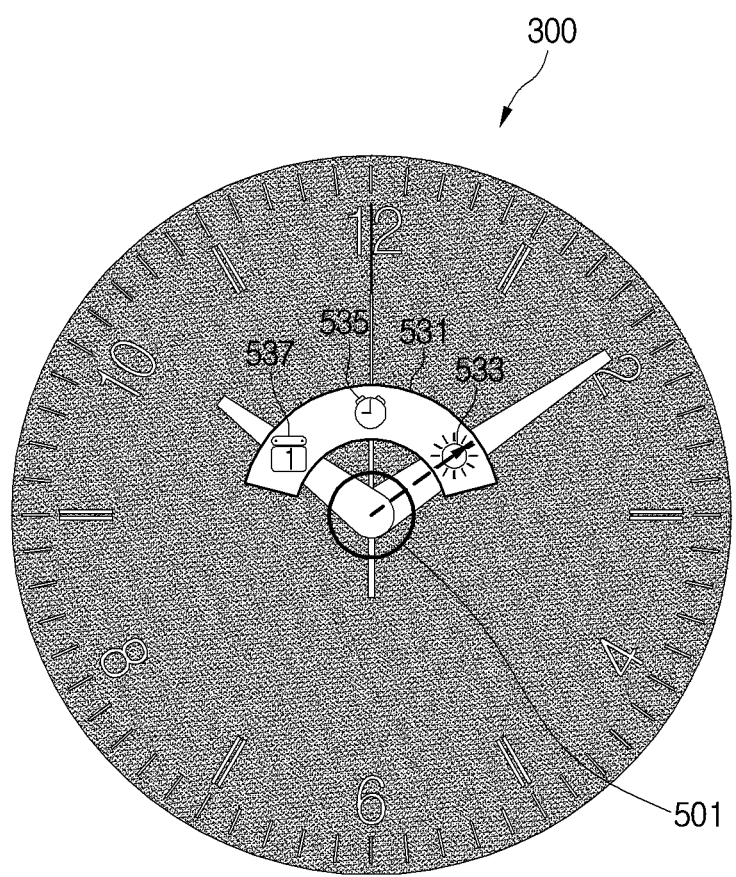
Figure 11C:
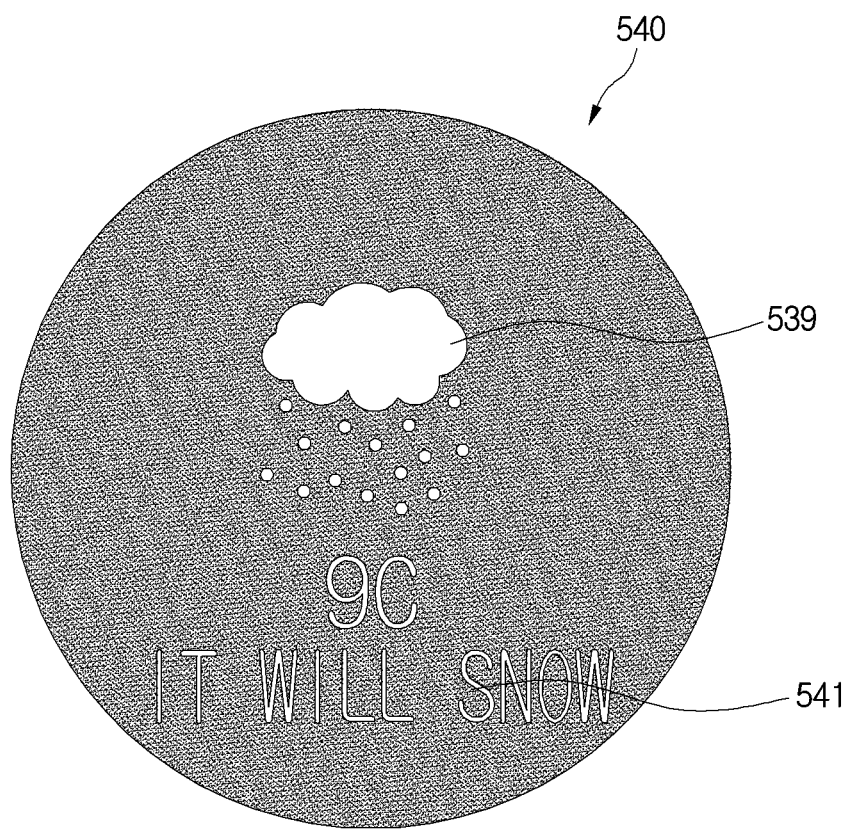

FIGS. 11a to 11c are other screen shots showing a change from a standby screen having an analog watch shape to an ambient screen including a specific item.

As shown in FIG. 11a, when a tap operation of tapping the central region twice 501 on a standby screen 300 and a hold & touch operation are input, a notification window 531 including a weather item 533, a notification item 535, and a plan item 537 may be displayed.

The weather item 533, the notification item 535, and the plan item 537 of the notification window 531 may be displayed around the central region 501 on the standby screen 300.

For example, the notification window 531 may be displayed in a sectorial shape near the central region 501 on the standby screen 300 and the weather item 533, the notification item 535, and the plan item 537 may be displayed in the notification window 531 clockwise around the central region 501, but the inventive concept is not limited thereto.

When as shown in FIG. 11b, dragging from the central region 501 on the standby screen 300 to the weather item 533 of the notification window 531 is performed an then dropping from the weather item 533 is performed, the standby screen 300 may be changed to the ambient screen 540 and information 539 and 541 corresponding to a corresponding specific item may be displayed on the ambient screen 540 as shown in FIG. 11c.

FIGS. 12a to 12d are still other screen shots showing a change from a standby screen having an analog watch shape to an ambient screen including a specific item.

Figure 12A:
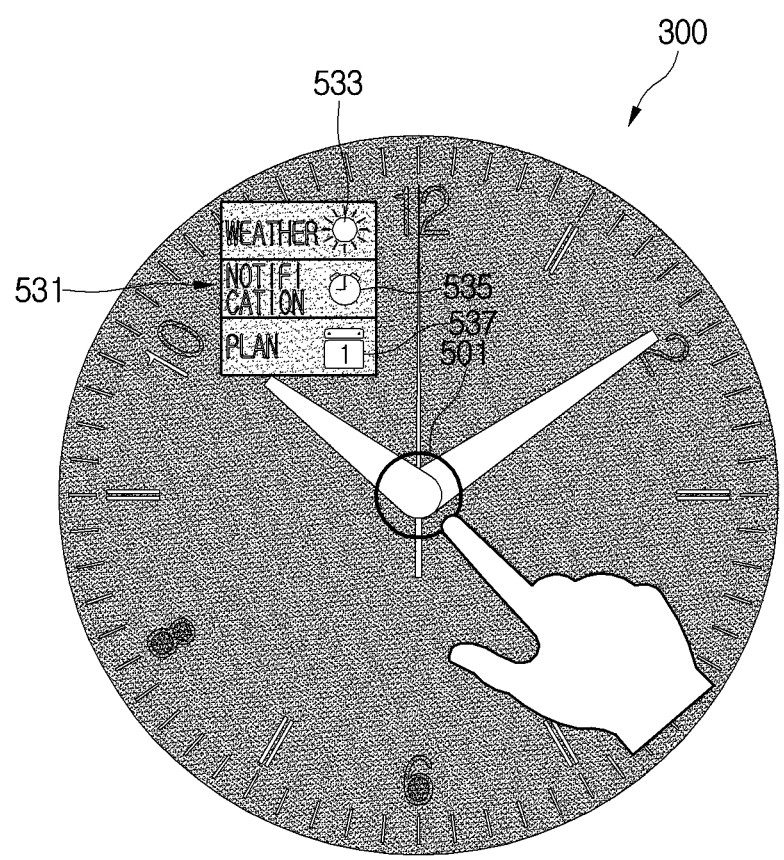
FIGS. 12a to 12d are still other screen shots showing a change from a standby screen having an analog watch shape to an ambient screen including a specific item.

As shown in FIG. 12a, when a tap operation of tapping the central region twice 501 on a standby screen 300 and a hold & touch operation are input, a notification window 531 including a weather item 533, a notification item 535, and a plan item 537 may be displayed.

The notification window 531 may be displayed on a specific region on the standby screen 300.

Figure 12B:
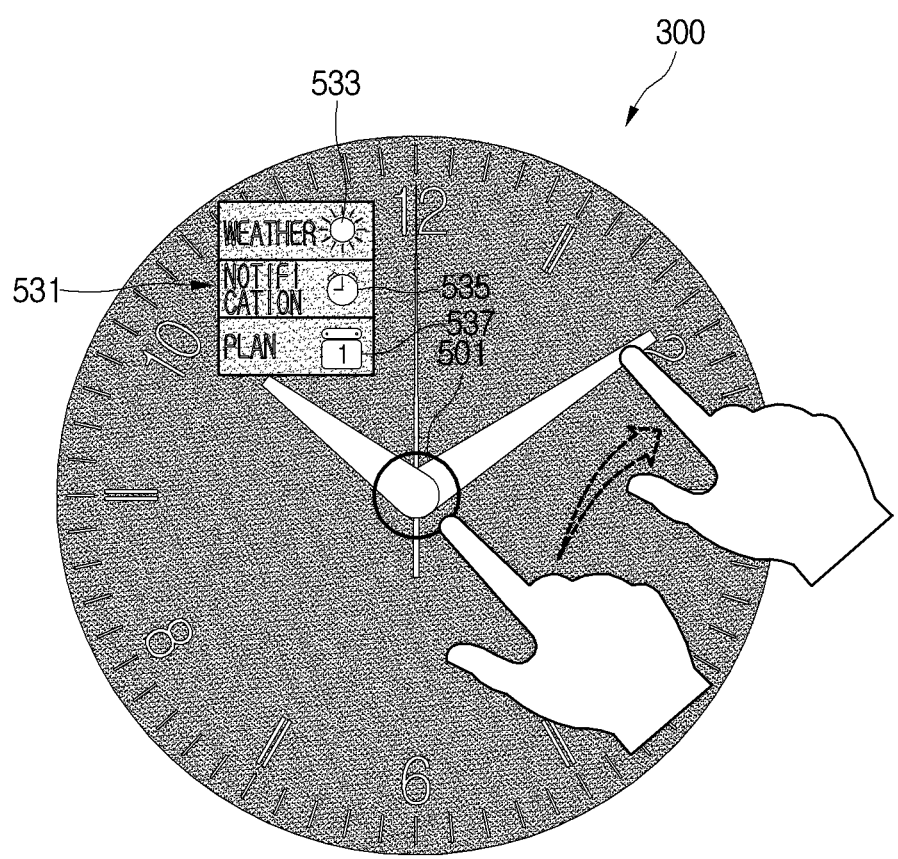

As shown FIG. 12b, even when, after the display of the notification window 531, a drop operation is input from a location at which the hold & touch operation is maintained, the notification window 531 may be still displayed.

Figure 12C:
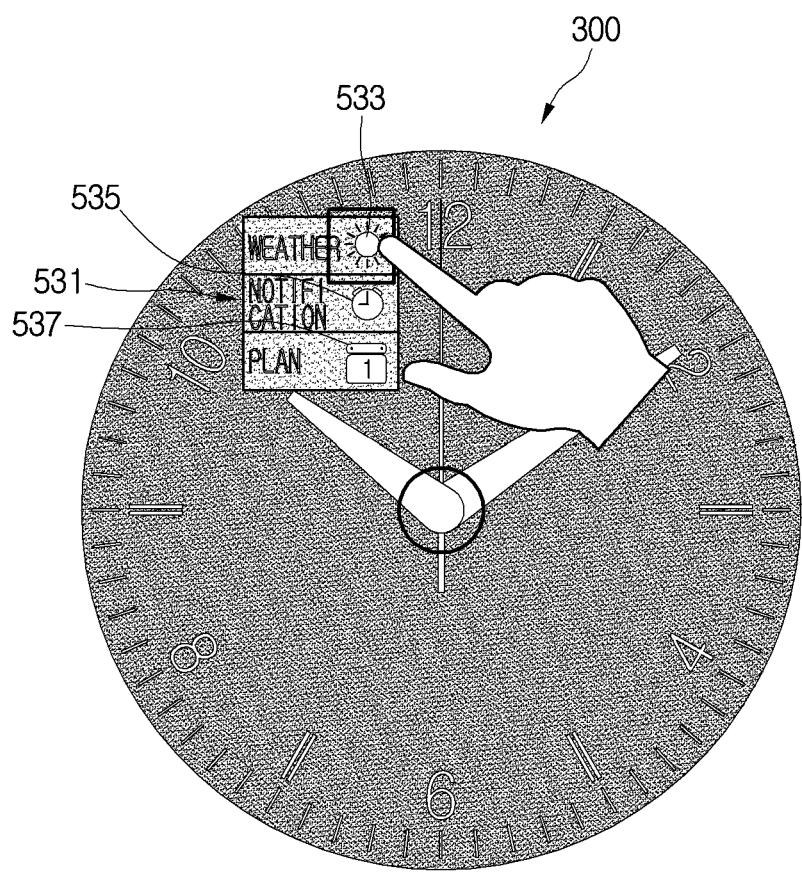
Figure 12D:
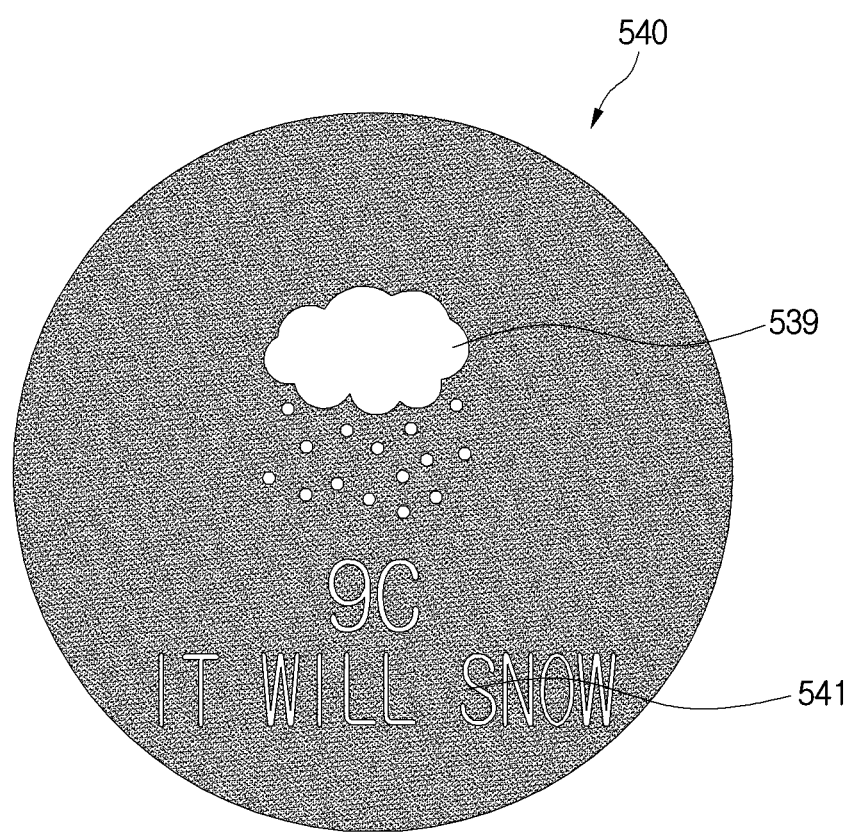

Subsequently, when a touch operation on a specific item among items 533, 535 and 537 of the notification window 531 is input, the standby screen 300 may be changed to an ambient screen 540 and information corresponding to the specific item may be displayed on the ambient screen 540, as shown in FIG. 12d.

For example FIG. 12c, when a touch operation on a weather item 533 among the items 533, 535 and 537 of the notification window 531 is input, the item 539 representing a weather state and information 541 on temperature and forecast may be displayed on the ambient screen, as shown in FIG. 12d.

Although not shown, the color of the specific item may be changed to be different from that of another item or the specific item may be highlighted when a touch operation on a specific item is input, but the inventive concept is not limited thereto. As such, since a specific item is changed to be different from another item, a user may easily check whether he or she has selected an intended item correctly.

Figure 13A:
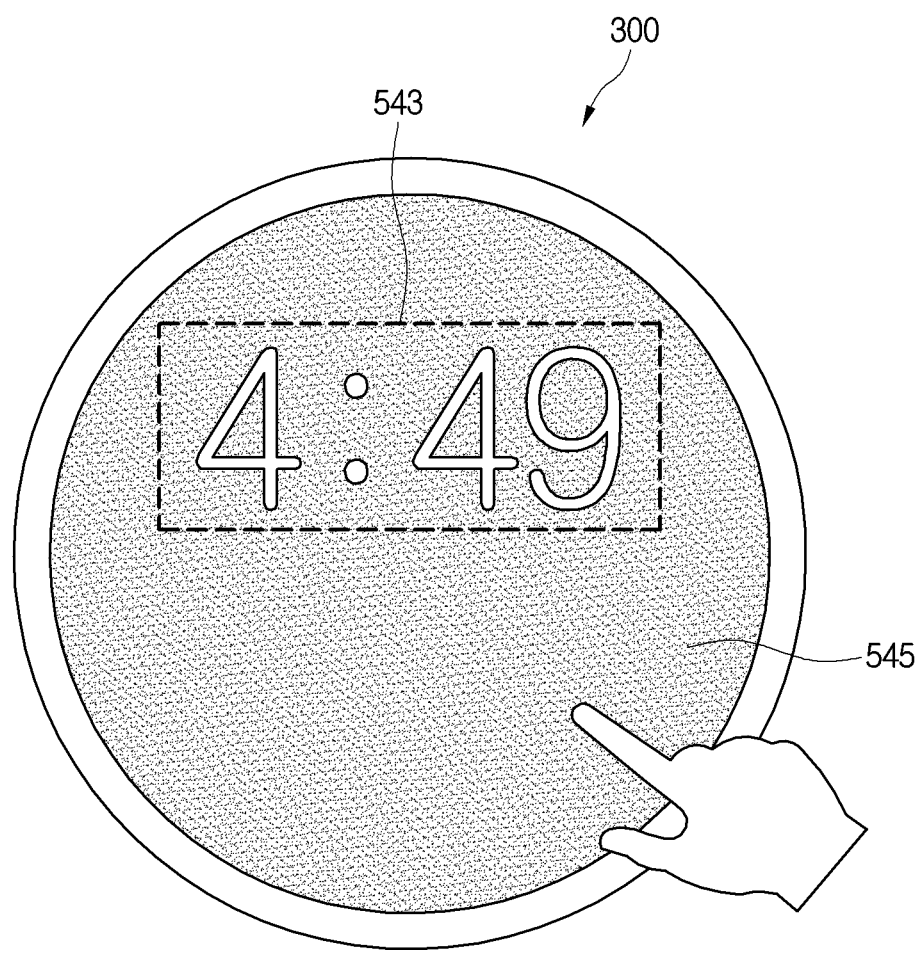
FIGS. 13a and 13b are screen shots showing a change from a standby screen having a digital watch shape to an ambient screen having a digital watch shape.
Figure 13B:
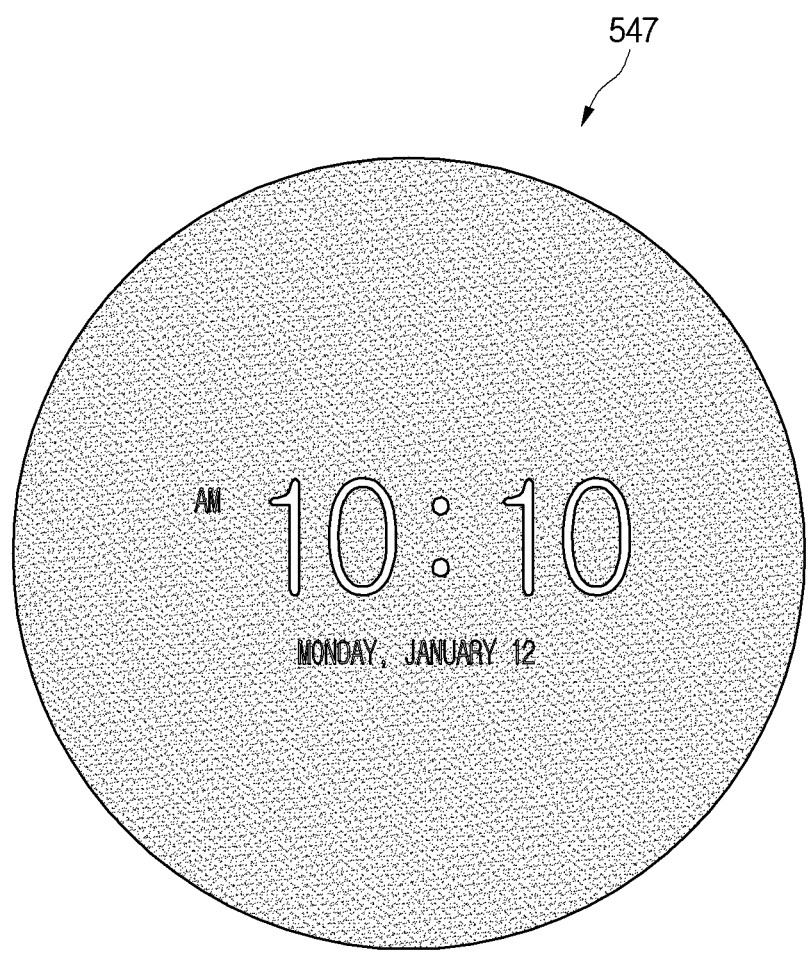

FIGS. 13a and 13b are screen shots showing a change from a standby screen having a digital watch shape to an ambient screen having a digital watch shape.

As shown in FIG. 13a, a digital watch shape represented with digital numbers may be displayed on a standby screen 300.

The standby screen 300 having the digital watch shape has no hour hand, minute hand or number region. Thus, a touch operation on a central region 501 or number region 503 that is performed on FIGS. 9 to 11c may not be performed on the standby screen 300.

Thus, the standby screen 300 represented with digital numbers in FIG. 13a may use another touch operation in order to perform a change to an ambient screen.

For example, the standby screen 300 may include a watch region 543 showing a digital watch and a background region 545 excluding the watch region 543.

When an operation of twice tapping the background region 545 on the standby screen 300 is input from a user, the standby screen 300 may be changed to an ambient screen 547 including the digital watch and the ambient screen may be displayed, as shown in FIG. 13b.

By an operation of twice tapping any location on the background region 545 on the standby screen 300, a change to the ambient screen 547 may be performed.

The ambient screen 547 may include numbers representing time, objects representing information on date, month and day, and a background region.

On the standby screen 300 in FIG. 13a, numbers on the watch region 543 and the background region 545 are all expressed with white graylevel or lower graylevel than white graylevel. For example, the luminance of the background region 545 may be lower than that of the number on the watch region 543, but the inventive concept is not limited thereto.

On the contrary, while the numbers representing time and the information on day, date, and month on the ambient screen 547 in FIG. 13b may be expressed with white graylevel or lower graylevel than white graylevel, the background region may be expressed with black graylevel.

Thus, since the luminance of the ambient screen 547 is lower than that of the standby screen 300, the power consumption of the ambient screen may decrease.

Figure 14A:
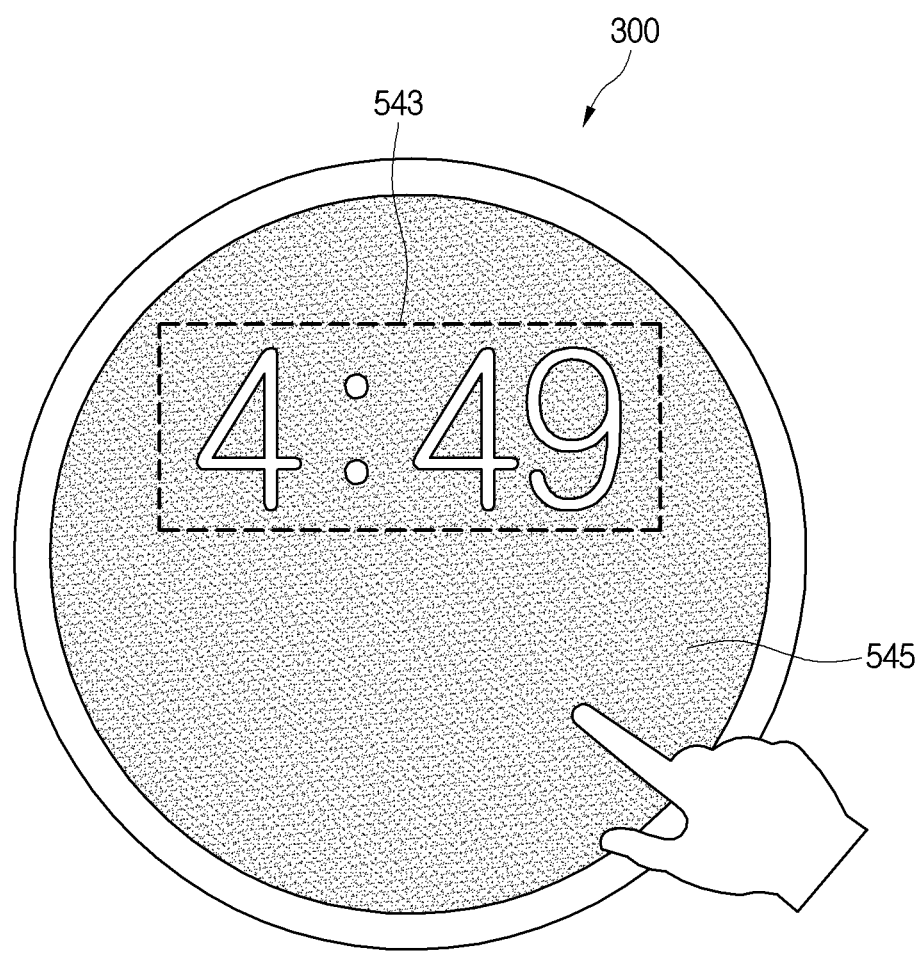
FIGS. 14a and 14b are screen shots showing a change from a standby screen having a digital watch shape to an ambient screen having luminance having black graylevel.
Figure 14B:
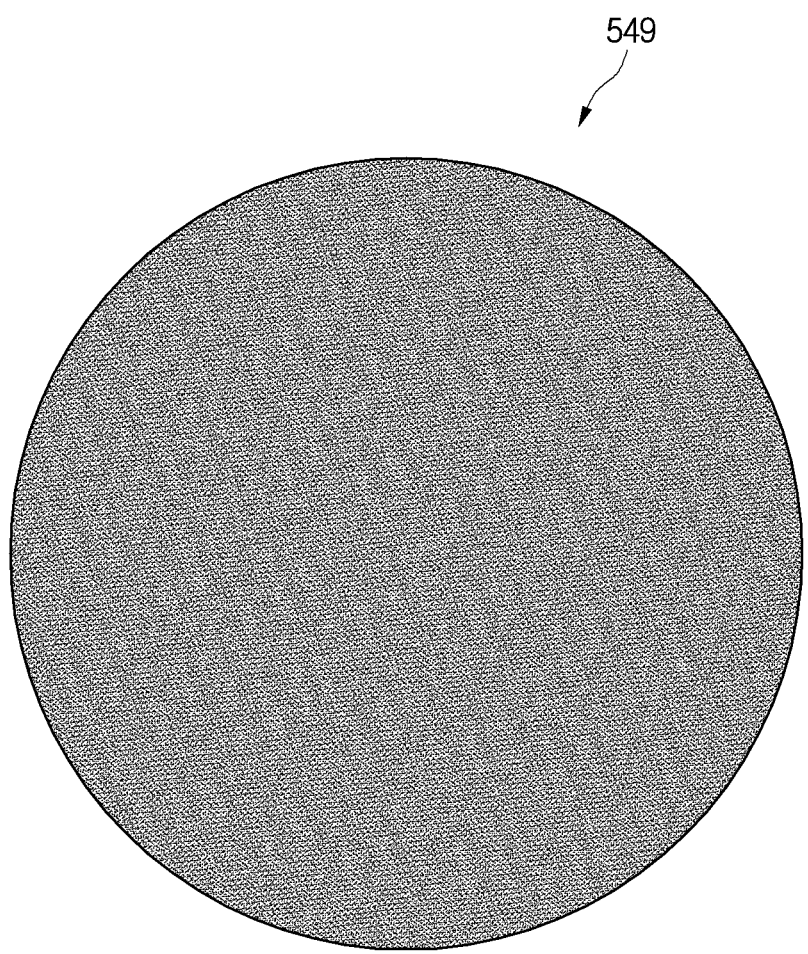

FIGS. 14a and 14b are screen shots showing a change from a standby screen having a digital watch shape to an ambient screen having luminance having black graylevel.

As shown in FIG. 14a, a digital watch shape represented with digital numbers may be displayed on a standby screen 300.

When an operation of tapping a background region 545 three times on the standby screen 300 is input from a user, the standby screen 300 may be changed to an ambient screen 549 having luminance having black graylevel and a changed screen may be displayed, as shown in FIG. 14b.

In order to implement luminance having black graylevel in a low-power mode, power DDVDH from an OLED driver 362 as well as power VDDEL from a power supply unit 356 in FIGS. 7a and 7b are not supplied to a touch screen 151, i.e., an LCD panel 330 and an OLED panel 340, so both each pixel of the LCD panel 330 and each pixel of the OLED panel 340 are implemented with black graylevel so that no identifiable information is displayed on the touch screen 151.

FIGS. 15a to 15d are screen shots showing a change from a standby screen having a digital watch shape to an ambient screen including a specific item.

Figure 15A:
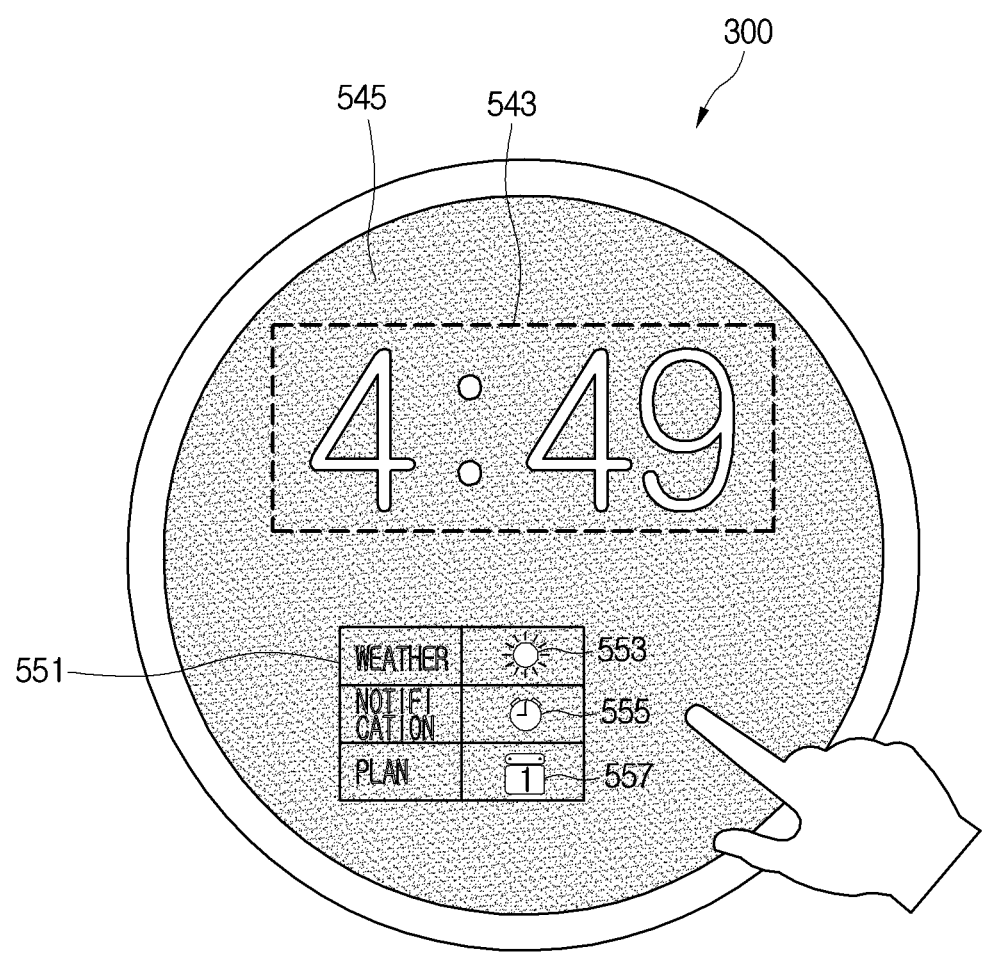
FIGS. 15a to 15d are screen shots showing a change from a standby screen having a digital watch shape to an ambient screen including a specific item.

As shown in FIG. 15a, a standby screen 300 may include a watch region 543 having a digital watch and a background region 545 excluding the watch region.

When a tap operation of tapping a portion of the background region 545 twice on the standby screen 300 and a hold & touch operation are input, a notification window 551 including a weather item 553, a notification item 555, and a plan item 557 may be displayed.

The notification window 551 may be displayed to overlap the watch region 543 or be displayed on some portions of the background region 545. For example, the notification window 551 may be displayed on some portions of the background region 545 that is located under the watch region 543.

Figure 15B:
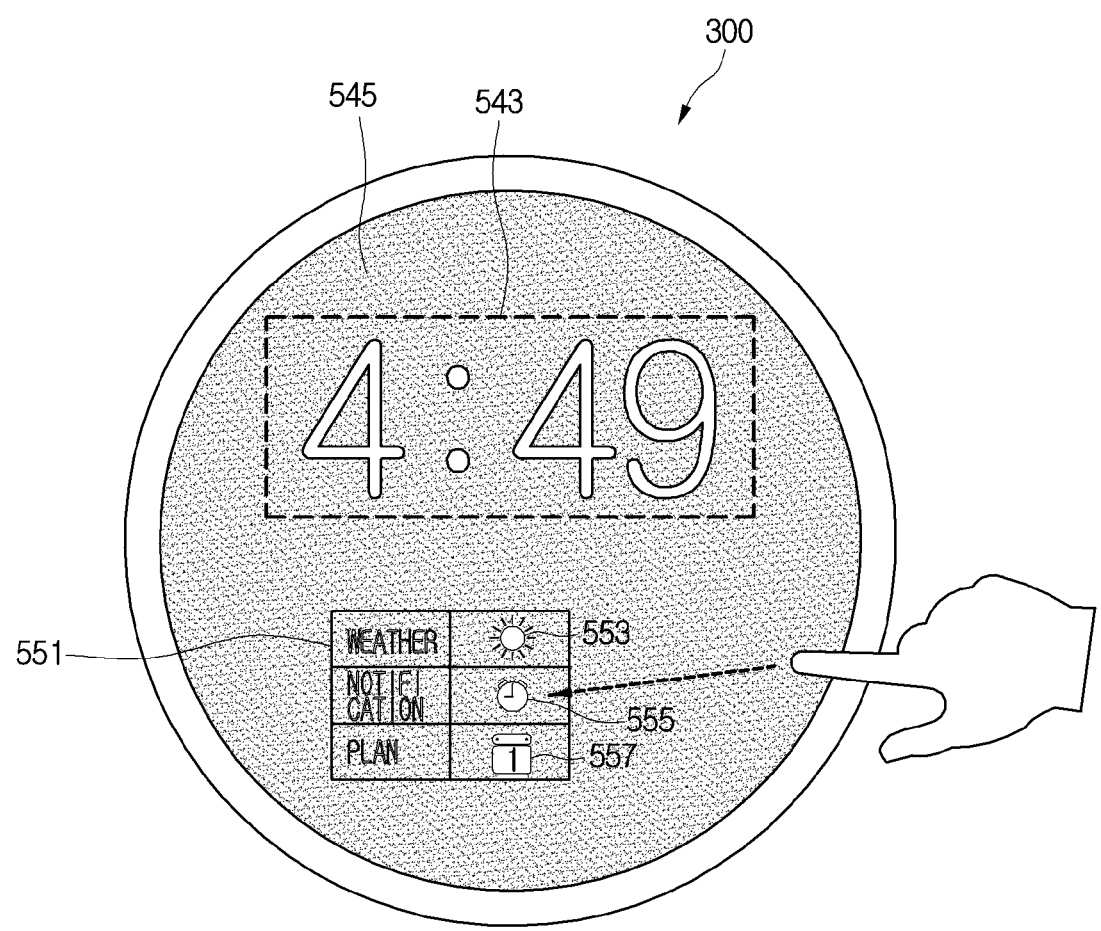
Figure 15C:
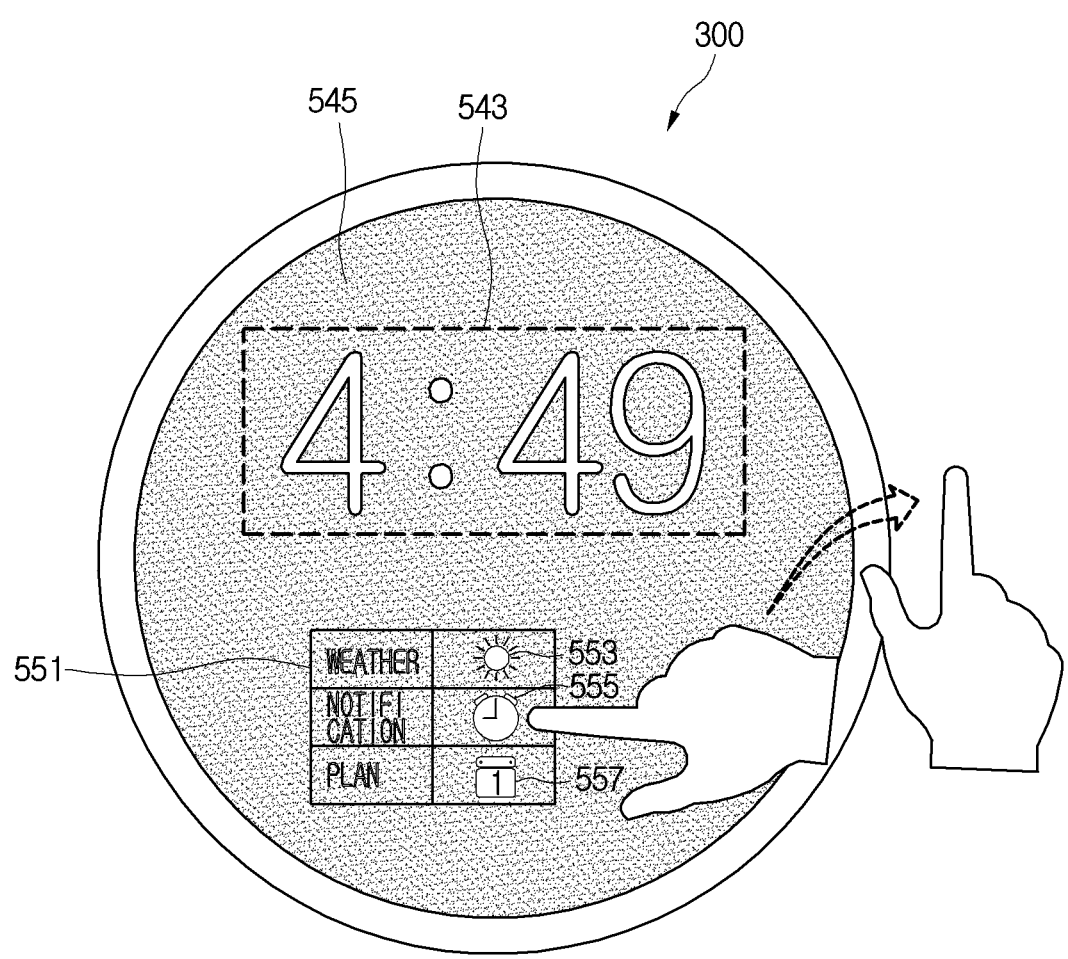
Figure 15D:
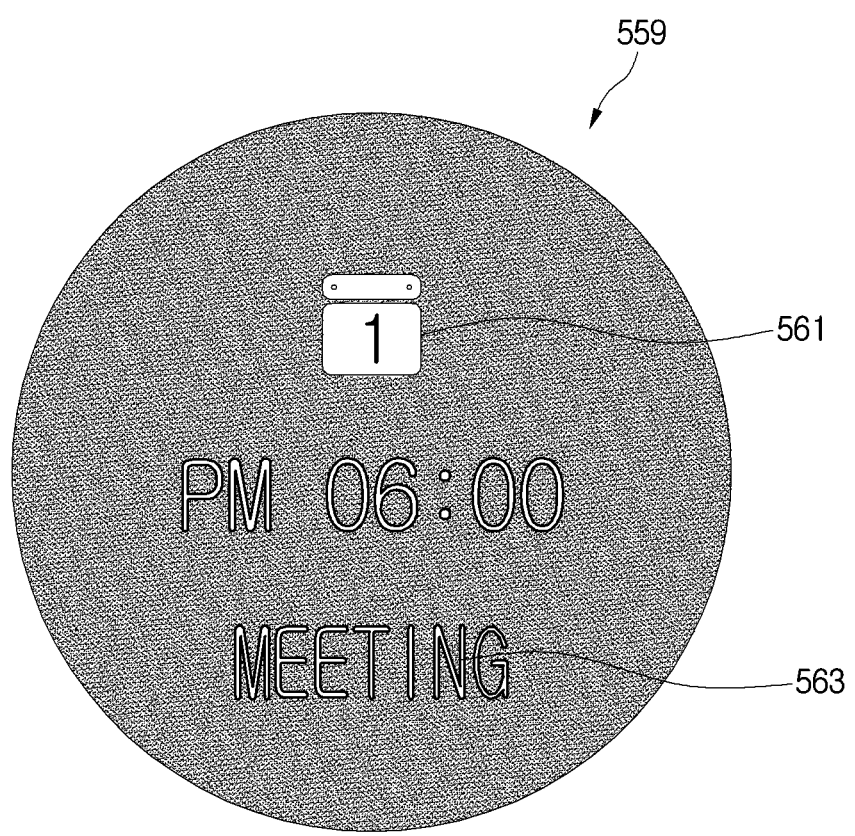

When a dragging operation from a location at which a tap operation is performed, to a specific item is input (in FIG. 15b) and then a drop operation from a specific item is input (in FIG. 15c), the standby screen 300 is changed to an ambient screen 559 and information 561 and 563 corresponding to the specific item may be displayed on the ambient screen 559 (in FIG. 15d).

For example, when as shown in FIGS. 15b and 15c, a dragging operation from a location at which a tap operation is performed, to a notification item 555 of the notification window 551 is performed and then a drop operation from a plan item 557 is input, an item 561 representing a notification and information 563 on a time and notification detail may be displayed on the ambient screen 559 as shown in FIG. 15d.

In FIG. 15b, when dragging to a specific item is performed and a finger is located on the specific item, the size of the specific item may be enlarged. A user may easily check by the enlarged specific item whether an item has been correctly selected.

When dragging to a specific item is performed and a finger is located on the specific item, the color of the specific color may be changed to be different from those of other items or the specific item may be highlighted though not shown, but the inventive concept is not limited thereto.

Figure 16A:
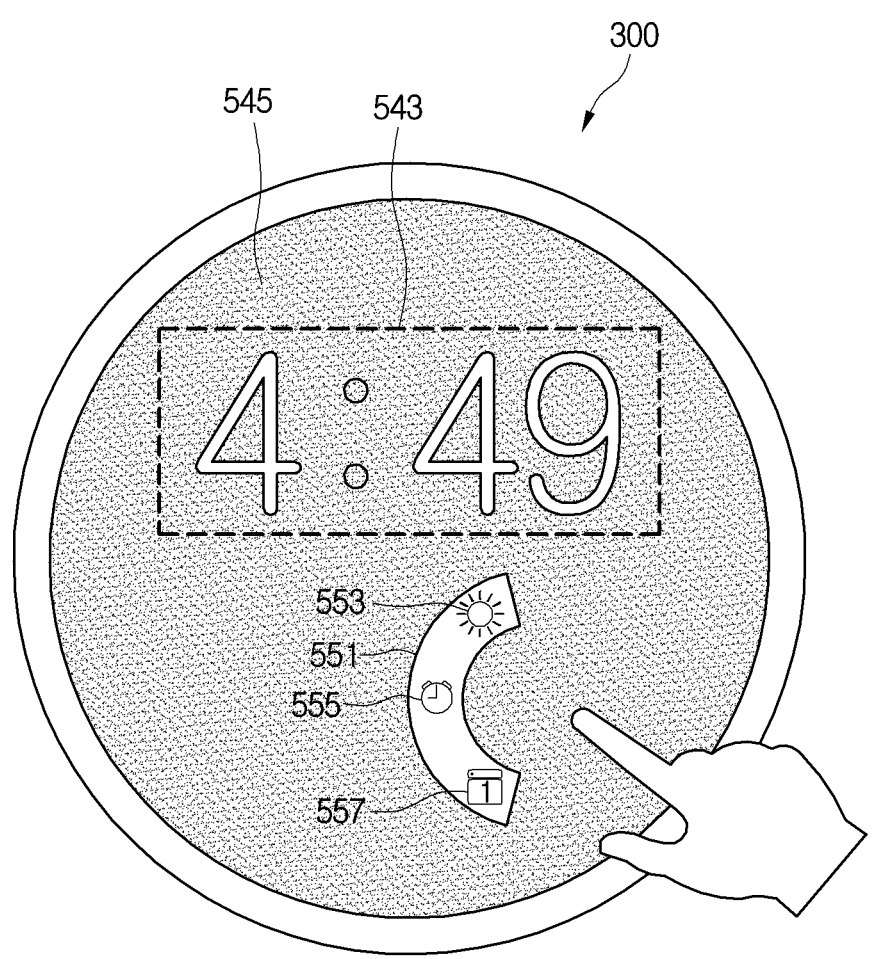
FIGS. 16a to 16c are other screen shots showing a change from a standby screen having a digital watch shape to an ambient screen including a specific item.
Figure 16B:
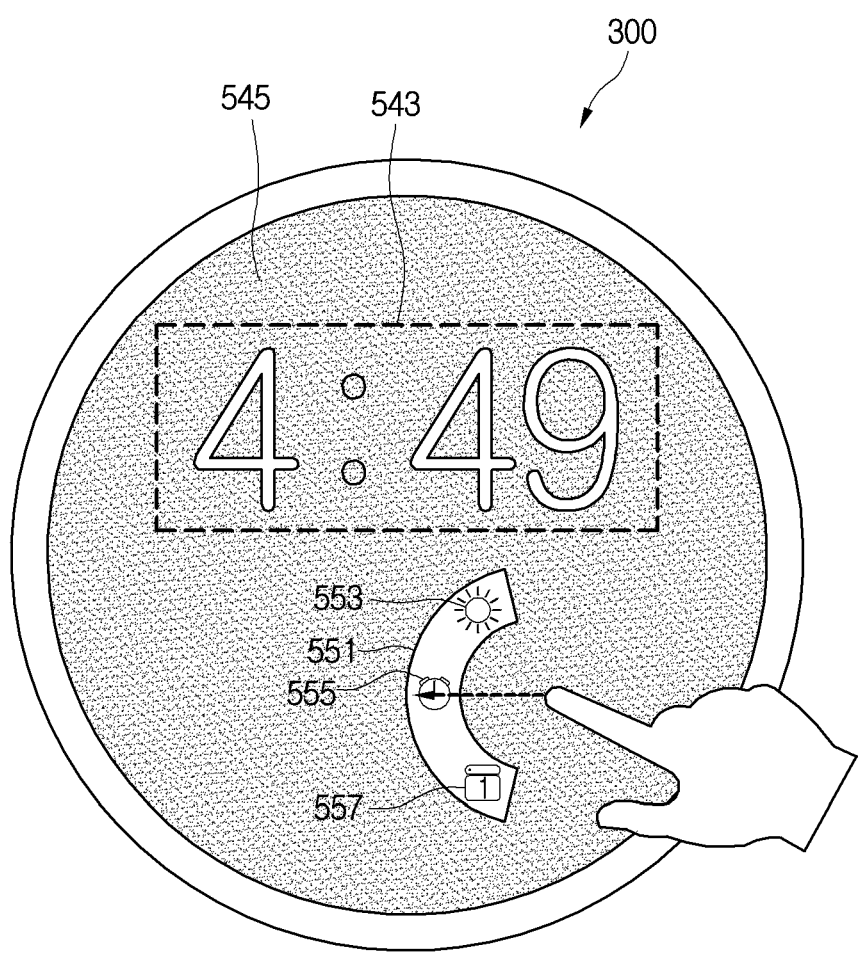
Figure 16C:
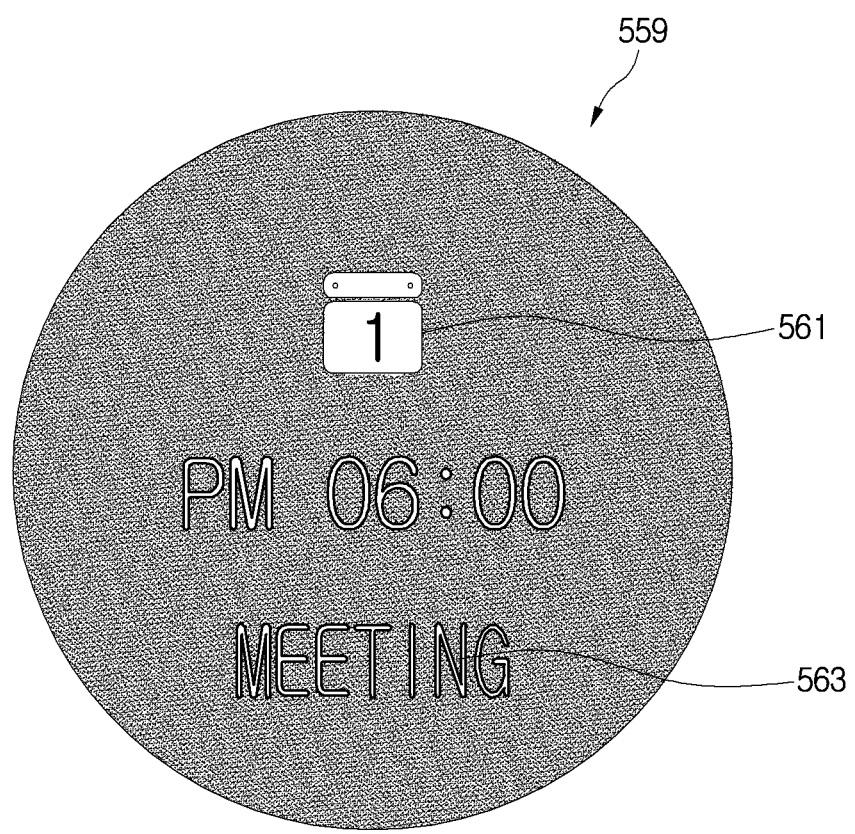

FIGS. 16a to 16c are other screen shots showing a change from a standby screen having a digital watch shape to an ambient screen including a specific item.

As shown in FIG. 16a, when a tap operation of tapping a portion of a background region 545 twice on a standby screen 300 and a hold & touch operation are input, a notification window 551 including a weather item 553, a notification item 555, and a plan item 557 may be displayed.

The weather item 553, the notification item 555, and the plan item 557 of the notification window 551 may be displayed around a portion of the background region 545 on the standby screen 300.

For example, the notification window 551 may be displayed in a sectorial shape near a portion of the background region 545 on the standby screen 300 and the weather item 553, the notification item 555, and the plan item 557 may be displayed in the notification window 551 anticlockwise, but the inventive concept is not limited thereto.

When as shown in FIG. 16b, a dragging operation from a location at which a tap operation is performed, to a specific item, e.g., notification item 555 is input and then a drop operation from the notification item 555 is input (in FIG. 116b), the standby screen 300 is changed to the ambient screen 559 and information 561 and 563 corresponding to the notification item 555 may be displayed on the ambient screen 559 (in FIG. 16c).

FIGS. 17a to 17d are still other screen shots from a change a standby screen having a digital watch shape to an ambient screen including a specific item.

Figure 17A:
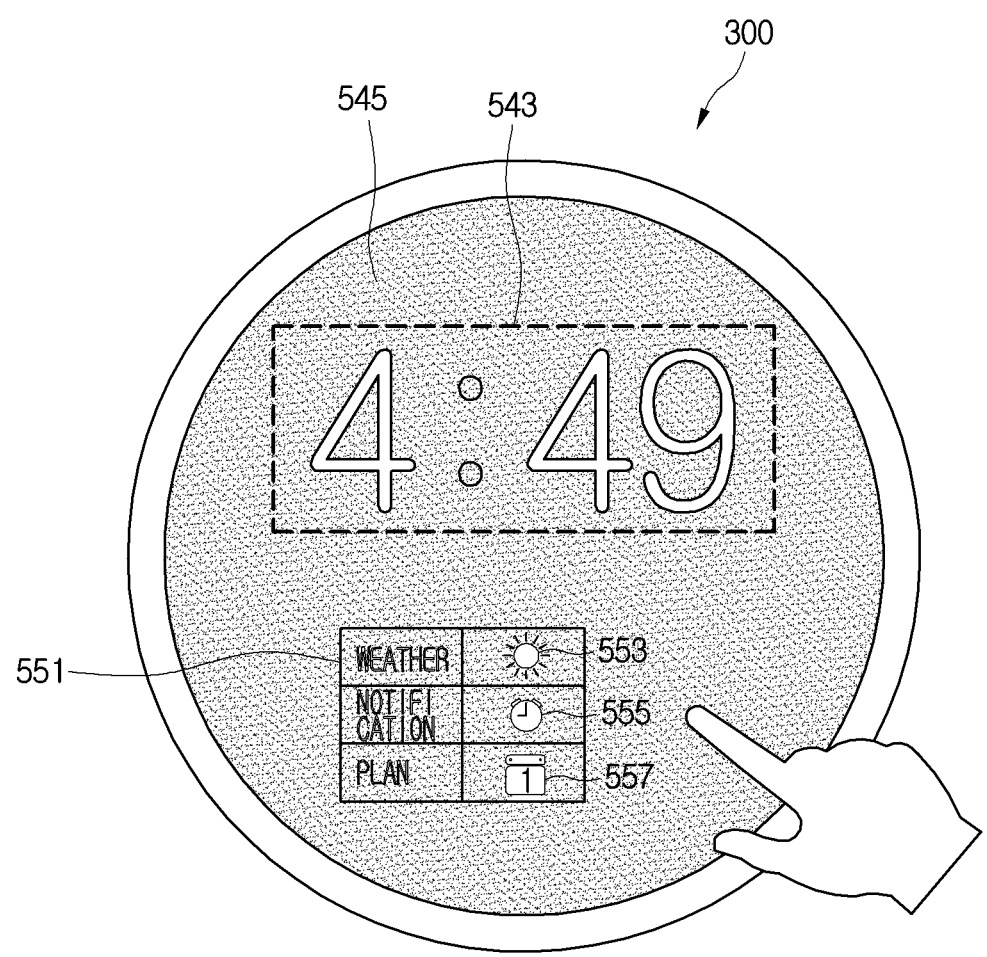
FIGS. 17a to 17d are still other screen shots showing a change from a standby screen having a digital watch shape to an ambient screen including a specific item.

As shown in FIG. 17a, a standby screen 300 may include a watch region 543 having a digital watch and a background region 545 excluding the watch region 543.

When a tap operation of tapping a portion of the background region 545 twice on the standby screen 300 and a hold & touch operation are input, a notification window 551 including a weather item 553, a notification item 555, and a plan item 557 may be displayed.

The notification window 551 may be displayed to overlap the watch region 543 or be displayed on some regions of the background region 545.

Figure 17B:
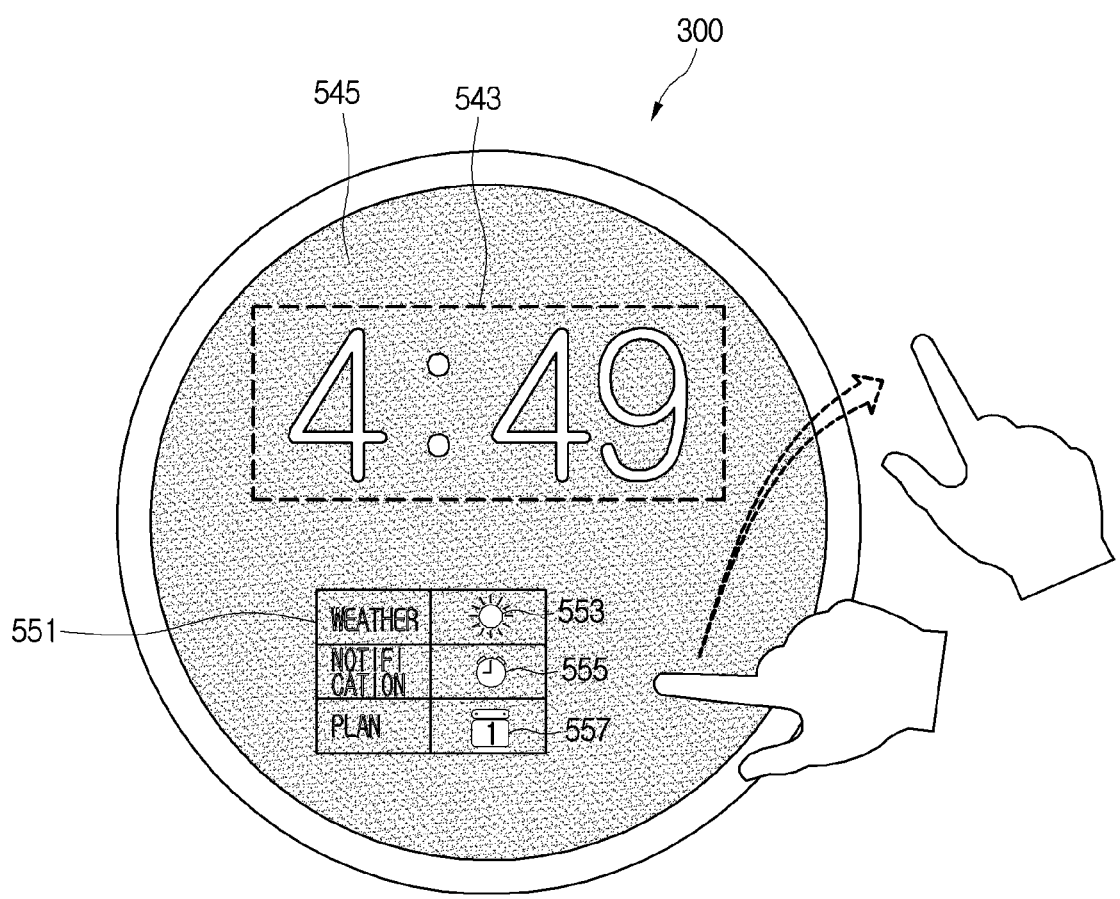

As shown in FIG. 17b, when a drop operation is input from a location at which a tap operation is performed, the notification window 551 may be still displayed.

Figure 17C:
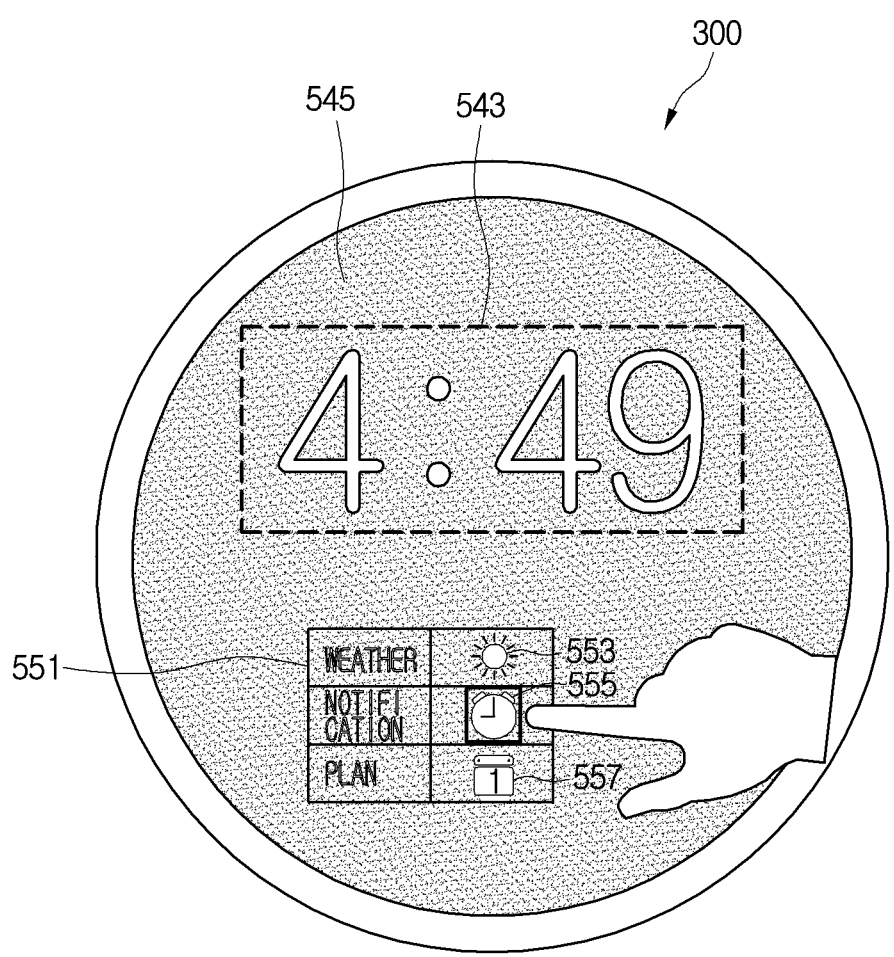
Figure 17D:
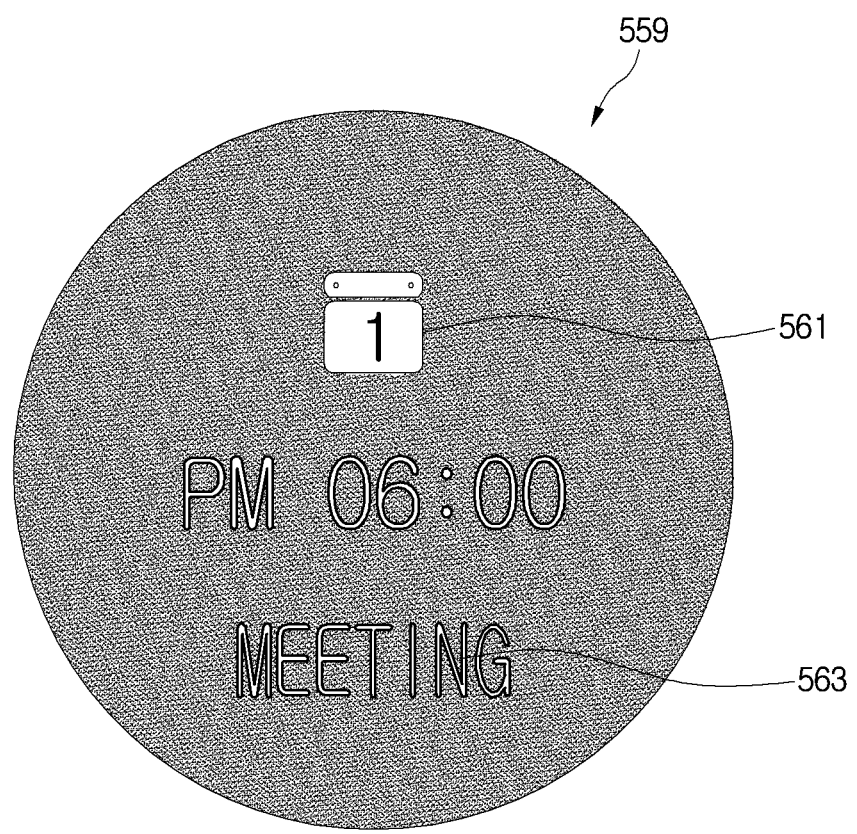

Subsequently, when a touch operation on a specific item among items 553, 555 and 557 of the notification window 551 is input in FIG. 17c, the standby screen 300 may be changed to an ambient screen 559 and information 561 and 563 corresponding to the specific item may be displayed on the ambient screen 559, as shown in FIG. 17d.

For example, when as shown in FIG. 12c, a touch operation on a notification item 555 among the items 553, 555 and 557 of the notification window 551 is input, the item 561 representing a notification and information 563 on a time and notification detail may be displayed on the ambient screen 559, as shown in FIG. 17d.

Although not shown, the color of the specific item may be changed to be different from that of another item or the specific item may be highlighted, when a touch operation on the specific item is input, but the inventive concept is not limited thereto. As such, since a specific item is changed to be different from another item, a user may easily check whether he or she has selected an intended item correctly.

Figure 18A:
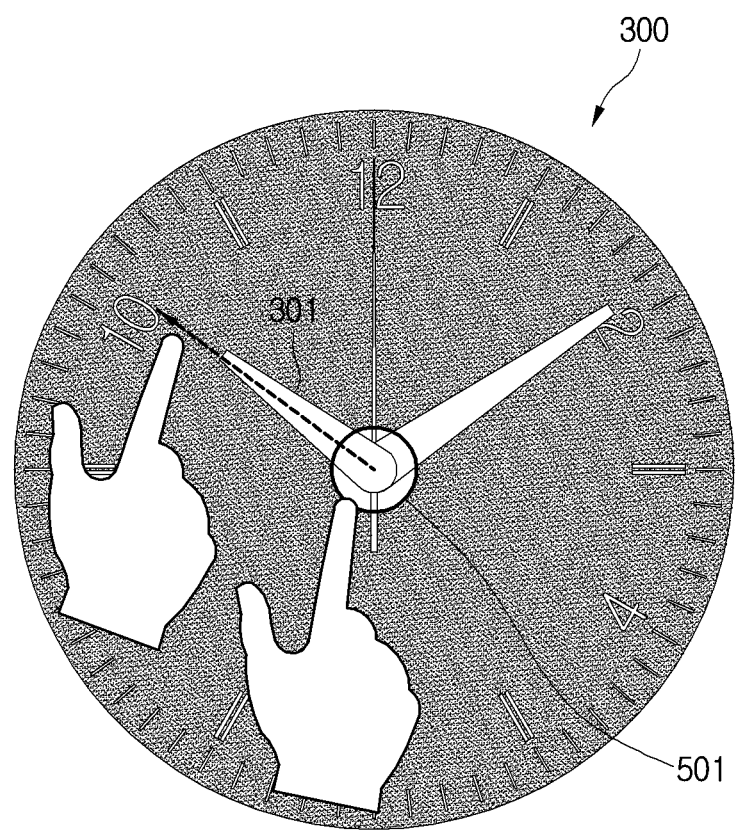
FIGS. 18a to 18c are screen shots showing a change from a standby screen having an analog watch shape to an ambient screen including a schedule.
Figure 18B:
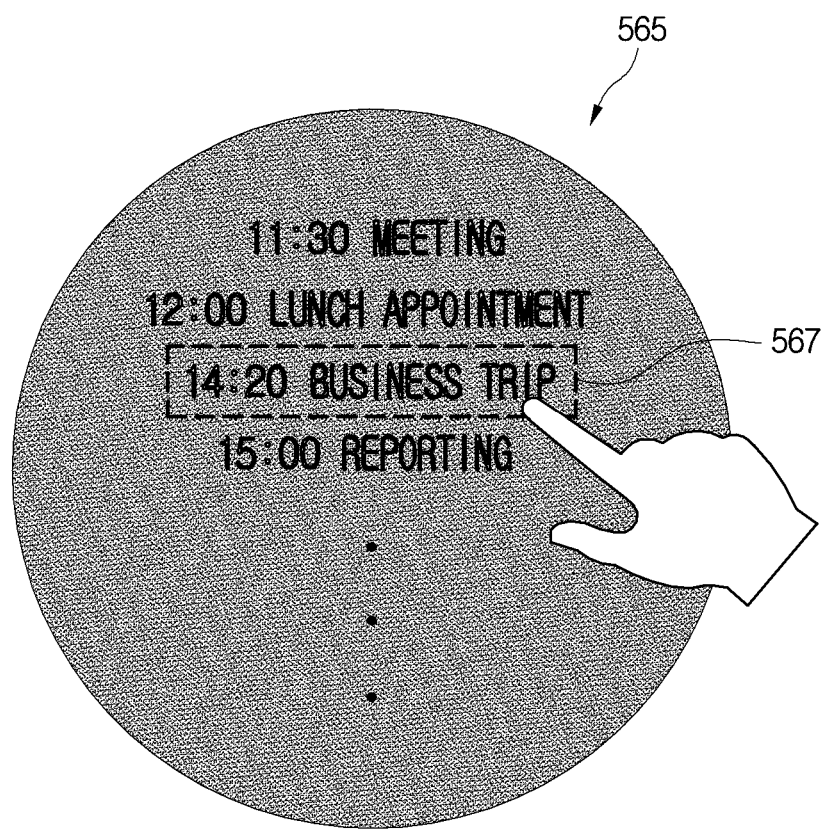
Figure 18C:
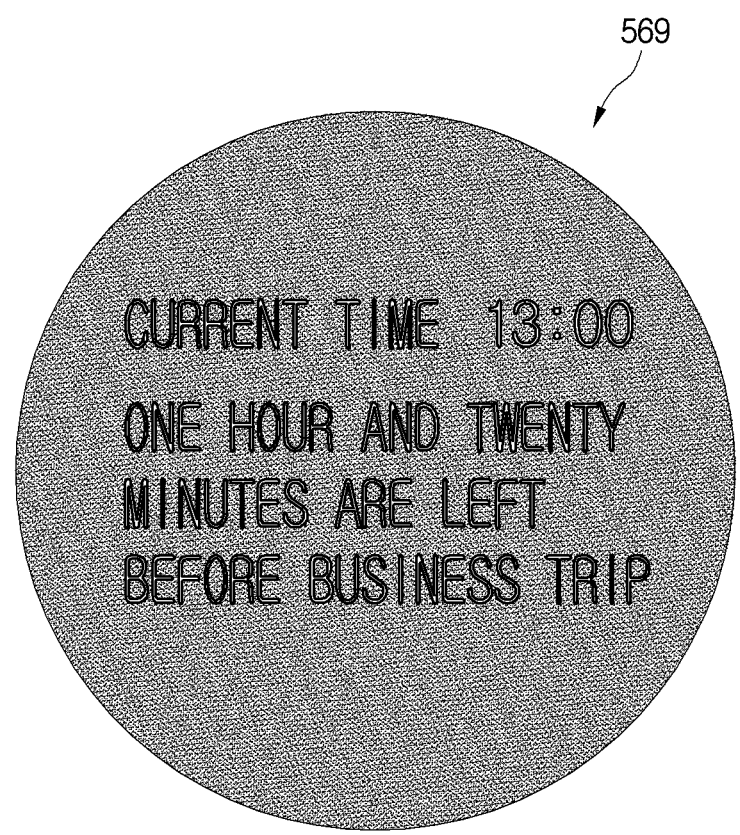

FIGS. 18a to 18c are screen shots showing a change from a standby screen having an analog watch shape to an ambient screen including a schedule.

As shown in FIG. 18a, when a tap operation of tapping a central region 501 twice on a standby screen 300 having an analog watch shape is input on the standby screen 300 and then a dragging operation is input from the central region 501 along length of an hour hand 301, an ambient screen 565 including a schedule list 567 may be displayed as shown in FIG. 18b.

The schedule list 567 may include e.g., meeting at 11:30, lunch appointment at 12 o'clock, business trip at 14:20, and reporting at 15 o'clock.

A user may easily check his or her plan through the schedule list 567 displayed on the ambient screen 565.

If an alarm is set from the user so that the business trip to be performed at 14:20 is notified before one hour and twenty minutes, another ambient screen 569 may be displayed which includes the current time and a message showing that there are one hour and twenty minutes left before the business trip as shown in FIG. 18c, at 13 o'clock that is left one hour and twenty minutes from 14:20. The setting may be implemented so that sound or vibration may be produced along with a corresponding message but the inventive concept is not limited thereto.

The other ambient screen 569 may be changed to the standby screen 300 having the analog watch shape as shown in FIG. 18a, after a certain time elapses or when an operation of tapping the other ambient screen 569 e.g., twice or three times is input, but the inventive concept is not limited thereto.

Figure 19A:
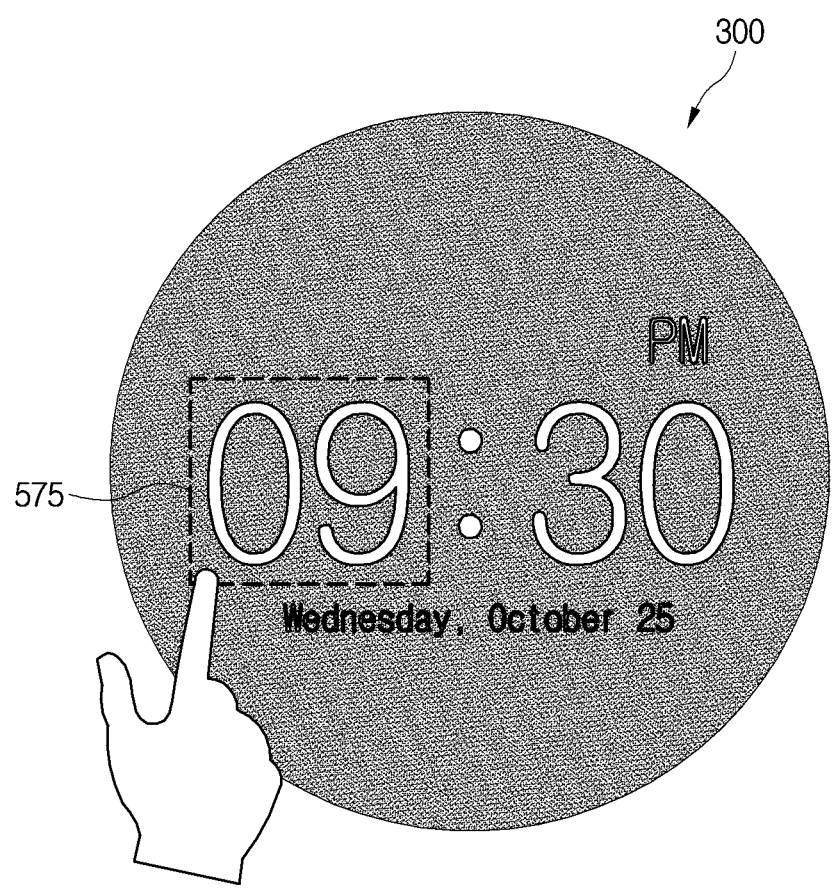
FIGS. 19a to 19c are screen shots showing a change from a standby screen having a digital watch shape to an ambient screen including a schedule.
Figure 19B:
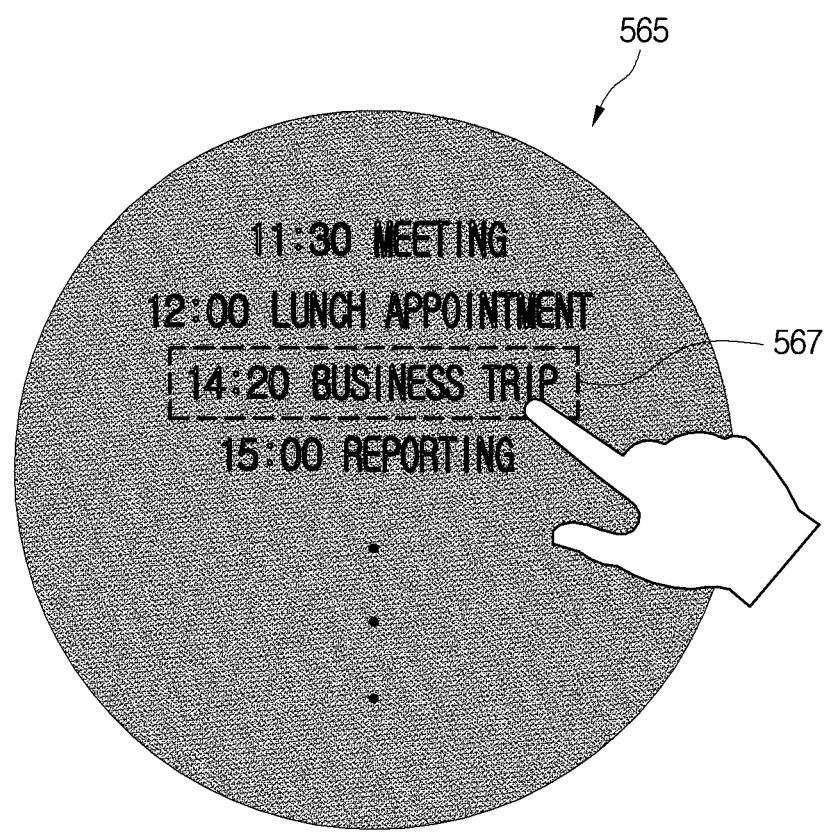
Figure 19C:
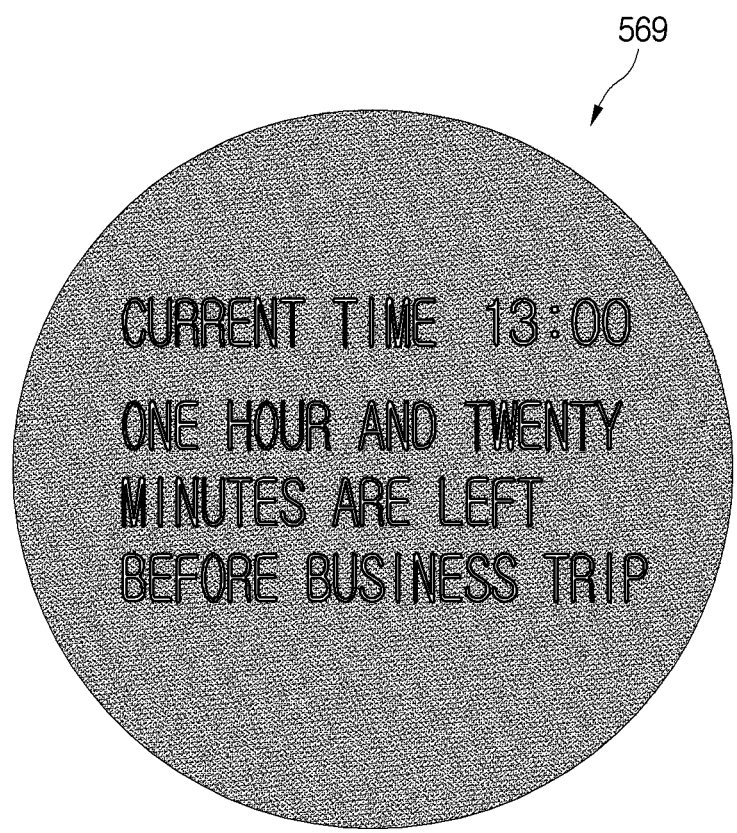

FIGS. 19a to 19c are screen shots showing a change from a standby screen having a digital watch shape to an ambient screen including a schedule.

When as shown in FIG. 19a, a tap operation of twice tapping a time region 575, e.g., "09" and a region therearound on a standby screen 300 having a digital watch shape is input on the standby screen 300 and then a touch & hold operation is input, an ambient screen 565 including a schedule list 567 may be displayed as shown in FIG. 19b.

A user may easily check his or her plan through the schedule list 567 displayed on the ambient screen 565.

If an alarm is set from the user so that the business trip to be performed at 14:20 is notified before one hour and twenty minutes, another ambient screen 569 may be displayed which includes the current time and a message showing that there are one hour and twenty minutes left before the business trip as shown in FIG. 19c, at 13 o'clock that is left one hour and twenty minutes from 14:20. The setting may be implemented so that sound or vibration may be produced along with a corresponding message, but the inventive concept is not limited thereto.

Figure 20A:
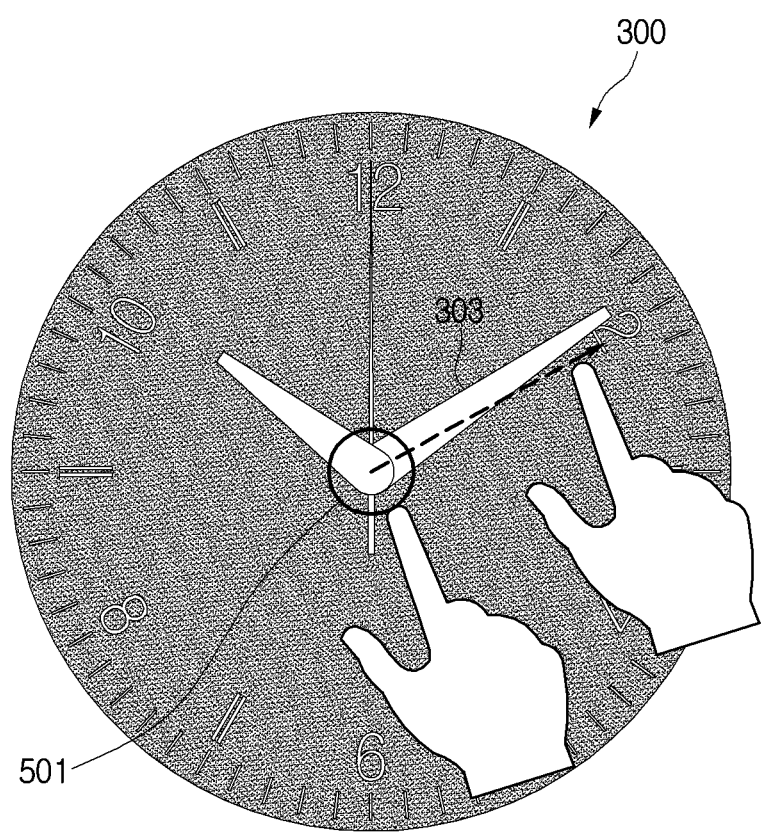
FIGS. 20a to 20c are screen shots showing a change from a standby screen having an analog watch shape to an ambient screen for schedule input.
Figure 20B:
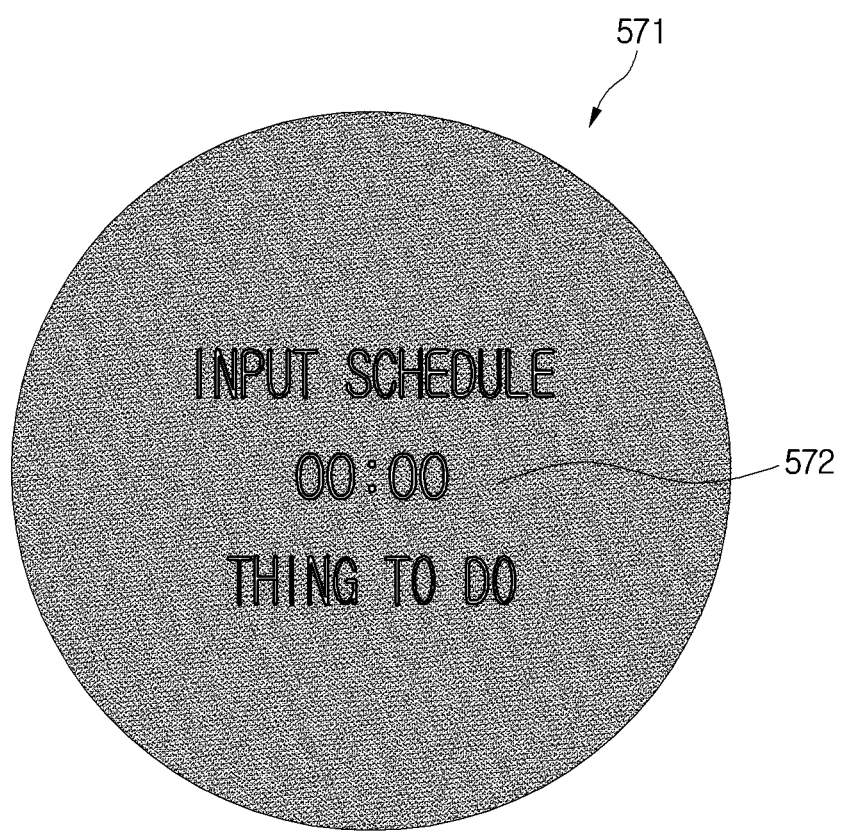
Figure 20C:
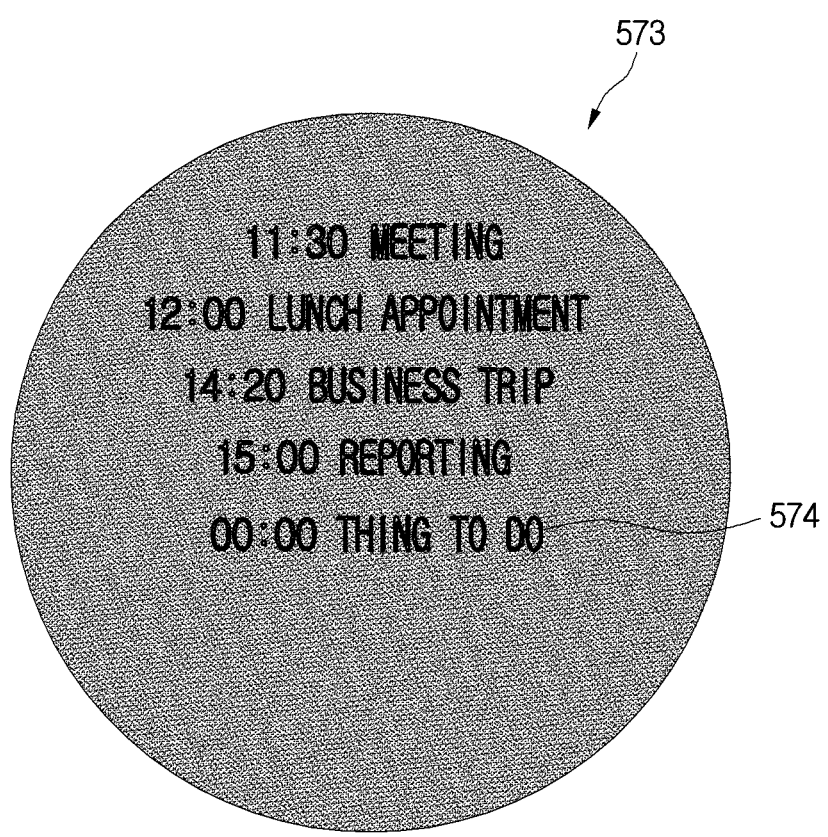

FIGS. 20a to 20c are screen shots showing a change from a standby screen having an analog watch shape to an ambient screen for schedule input.

When as shown in FIG. 20a, a tap operation of tapping a central region 501 twice on a standby screen 300 having an analog watch shape is input on the standby screen 300 and then a dragging operation is input from the central region 501 along length of a minute hand 303, an ambient screen 571 including an entry window for inputting a schedule may be displayed as shown in FIG. 20b.

When a schedule is inputted to an input window 571 through a keyboard input from a user, another ambient screen 573 including a schedule list 574 to which a corresponding schedule has been added may be displayed as shown in FIG. 20c.

The other ambient screen 573 may be changed to the standby screen 300 having the analog watch shape as shown in FIG. 20a, after a certain time elapses or when an operation of tapping the other ambient screen 573 e.g., twice or three times is input, but the inventive concept is not limited thereto.

Figure 21A:
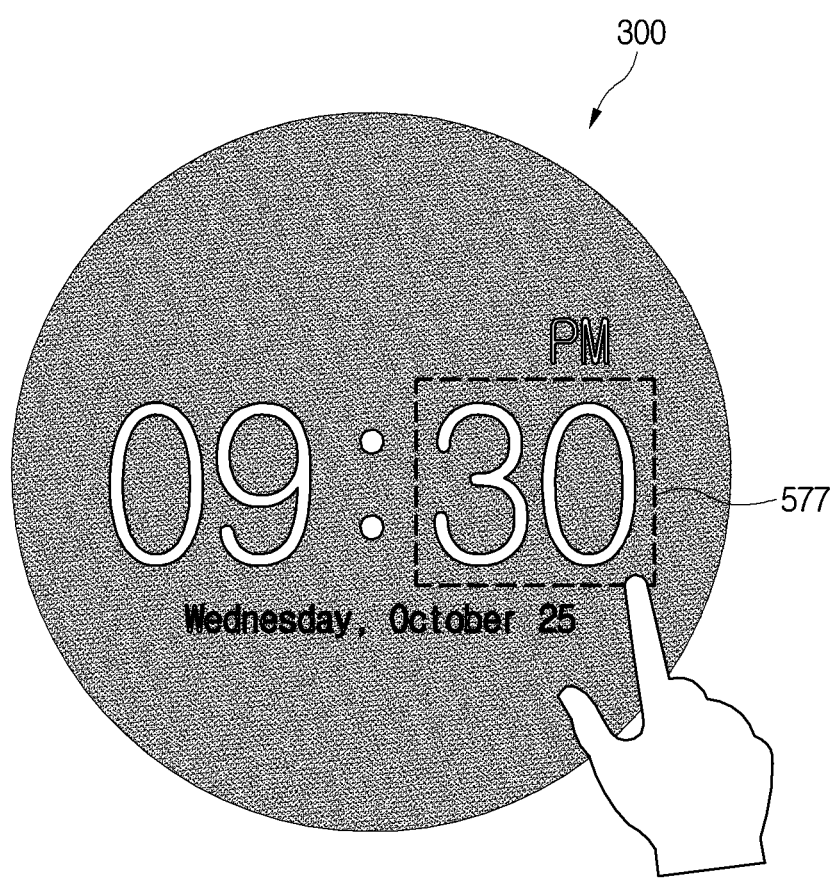
FIGS. 21a to 21c are screen shots showing a change from a standby screen having a digital watch shape to an ambient screen for schedule input.
Figure 21B:
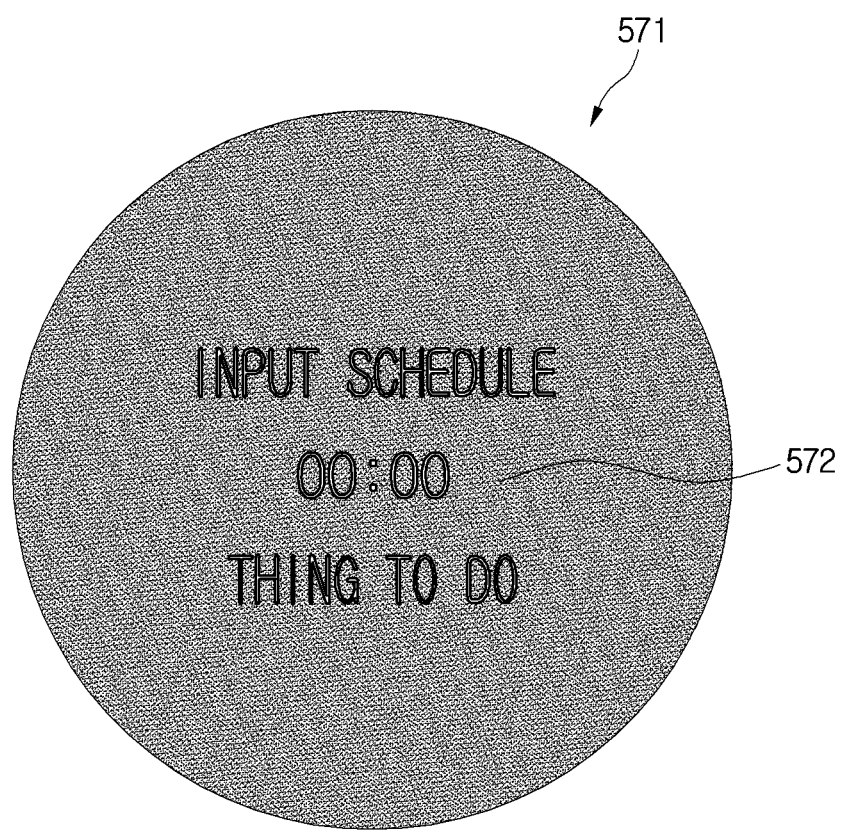
Figure 21C:
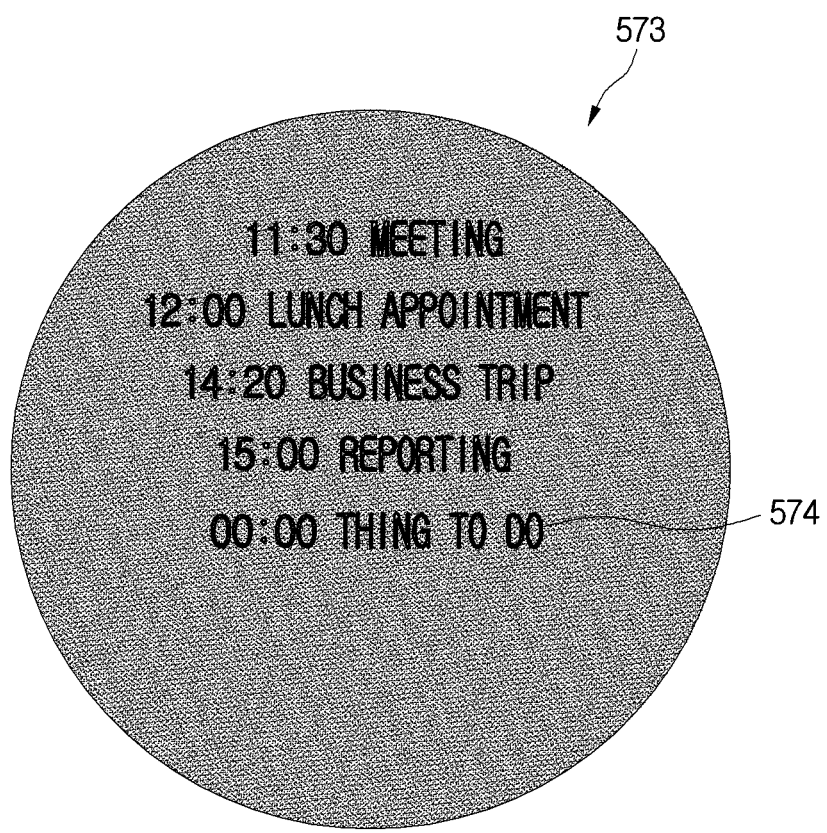

FIGS. 21a to 21c are screen shots showing change from a standby screen having a digital watch shape to an ambient screen for schedule input.

When as shown in FIG. 21a, a tap operation of twice tapping a minute region 577, e.g., "30" and a region therearound on a standby screen 300 having a digital watch shape is input on the standby screen 300 and then a touch & hold operation is input, an ambient screen 571 including an input window 572 for inputting a schedule may be displayed as shown in FIG. 21b.

When a schedule is inputted to the input window 572 through a keyboard input from a user, another ambient screen 573 including a schedule list 574 to which a corresponding schedule has been added may be displayed as shown in FIG. 21c.

The other ambient screen 573 may be changed to the standby screen 300 having the analog watch shape as shown in FIG. 21a, after a certain time elapses or when an operation of tapping the other ambient screen 573 e.g., twice or three times is input, but the inventive concept is not limited thereto.

Figure 22:
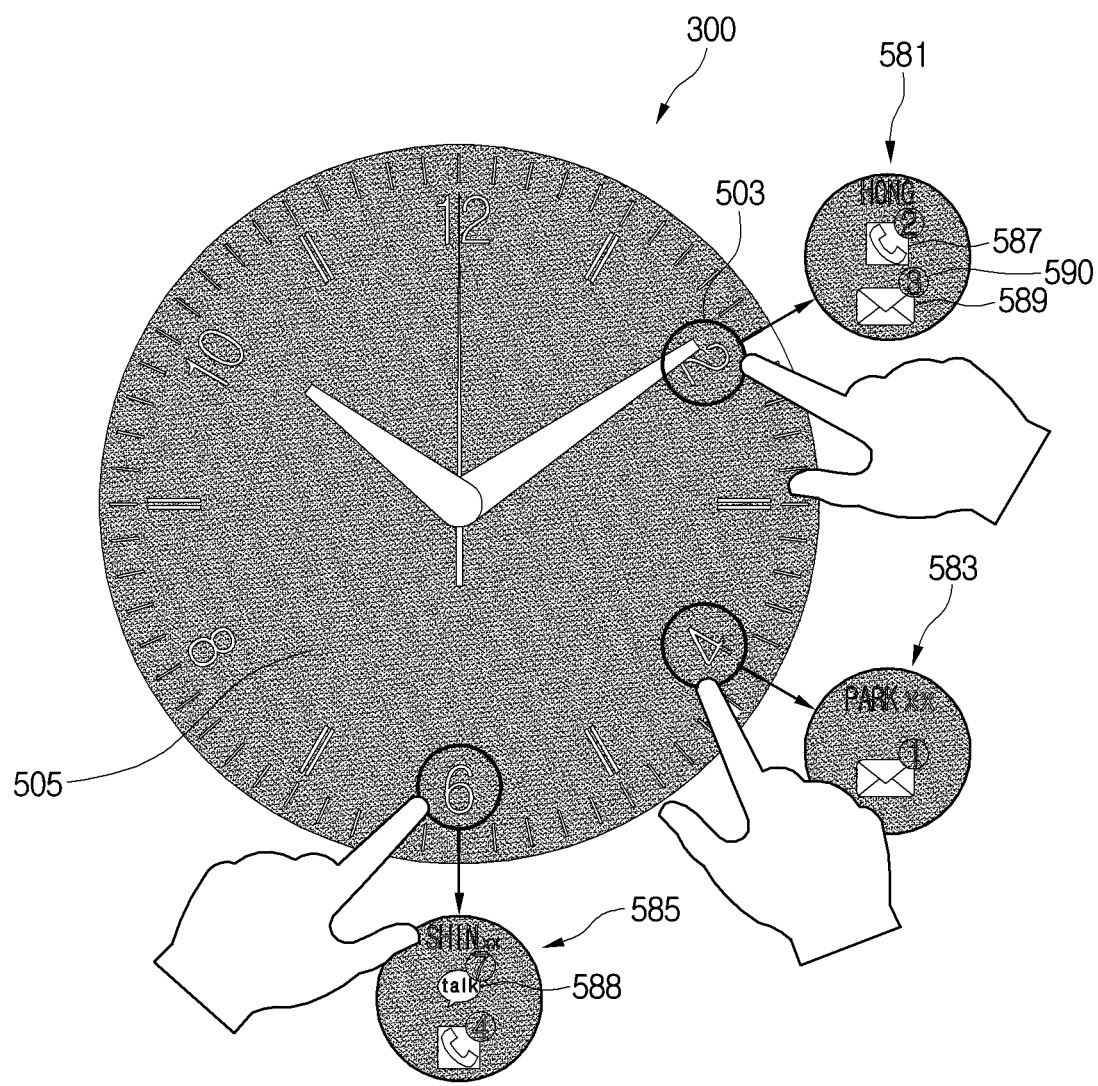
FIG. 22 is a screen shot showing a change from a standby screen having an analog watch shape to an ambient screen including missed notification information corresponding to corresponding speed dial numbers when the speed dial numbers are previously set.

FIG. 22 is a screen shot showing a change from a standby screen having an analog watch shape to an ambient screen including missed notification information corresponding to corresponding speed dial numbers when speed dial numbers are previously set.

For example, speed dial numbers for the other parties may be assigned as shown in Table 1.

TABLE 1

| Name | Speed dial number |
| --- | --- |
| Hong gil dong | 1 |
| Kim XX | 2 |
| Lee XX | 3 |
| Park XX | 4 |
| Choi XX | 5 |
| Shin XX | 6 |

As shown in FIG. 22, twelve number regions 503 may be disposed along the perimeter of a standby screen 300. The twelve number regions 503 may represent time. That is, the twelve number regions 503 may represent 1 o'clock to 12 o'clock. The number regions 503 may also include numbers or big scales but the inventive concept is not limited thereto.

The twelve number regions 503 disposed in this way may be distinguished from adjacent other regions, e.g., background region 505.

The speed dial numbers set in Table 1 may be set to correspond to the number regions 503 on the standby screen 300. For example, the speed dial number "1" set in Table 1 may be set to correspond to the number region 503 including "1" on the standby screen 300 and the speed dial number "4" may be set to correspond to the number region 503 including "4" on the standby screen 300.

Since the twelve number regions 503 are defined on the standby screen 300, up to twelve speed dial numbers may also be set.

If the number of the number regions 503 defined on the standby screen 300 may exceed twelve, the number of the speed dial numbers set may also exceed twelve.

For example, when an operation of twice tapping the number region 503 including "1" on the standby screen 300, the standby screen 300 may be changed to an ambient screen 581 including missed notification information on "Hong gil dong" set to the speed dial number "1".

For example, when an operation of twice tapping the number region 503 including "4" on the standby screen 300, the standby screen 300 may be changed to an ambient screen 583 including missed notification information on "Park XX" set to the speed dial number "4".

For example, when an operation of twice tapping the number region 503 including "6" on the standby screen 300, the standby screen 300 may be changed to an ambient screen 585 including missed notification information on "Shin XX" set to the speed dial number "6".

The missed notification information may include a call item 587, a text message item 589, and a social network message item 588.

The missed notification information may further include number items 590 located near the call item 587 and the text message item 589, respectively.

The numbers on the number items 590 located near respective items 587 and 589 may represent the number of missed calls or messages.

For example, it is possible to recognize from the missed notification information displayed on the ambient screen 581 that there are two missed calls and three missed text messages from "Hong gil dong".

For example, it is possible to recognize from the missed notification information displayed on the ambient screen 583 that there is one missed text message from "Park XX".

For example, it is possible to recognize from the missed notification information displayed on the ambient screen 585 that there are four missed calls and seven missed text messages from "Shin XX".

Figure 23A:
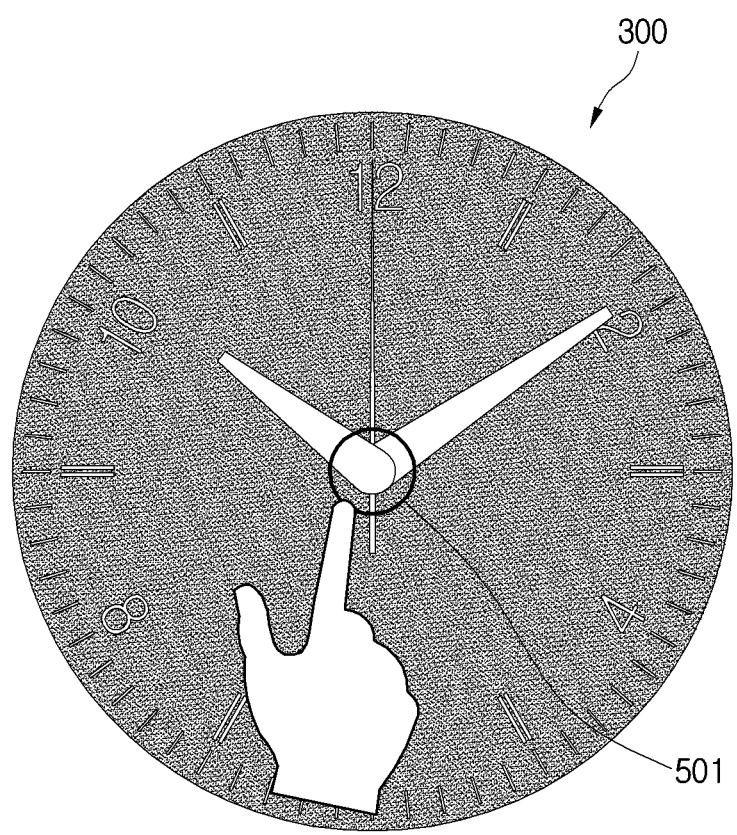
FIGS. 23a and 23b are other screen shots showing a change from a standby screen having an analog watch shape to a ambient screen including missed notification information corresponding to corresponding speed dial numbers when the speed dial numbers are previously set.
Figure 23B:
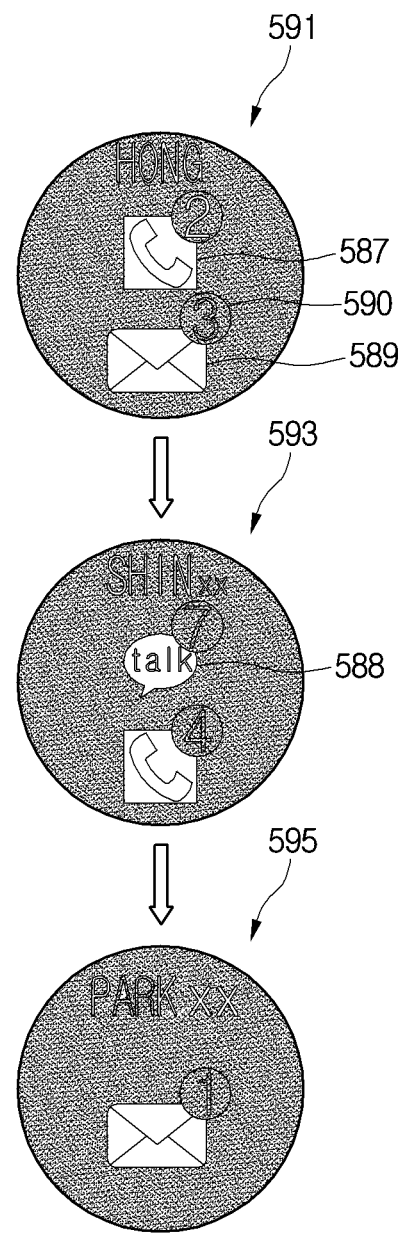

FIGS. 23a 23b are other screen shots showing a change from a standby screen having an analog watch shape to an ambient screen including missed notification information corresponding to corresponding speed dial numbers when speed dial numbers are previously set.

FIGS. 23a and 23b show a change method to ambient screens 591, 593 and 595 using a central region 501 of a standby screen 300, unlike FIG. 22.

As shown in Table 1, speed dial numbers may be set for the other parties.

When as shown in FIG. 23a, an operation of twice tapping the central region 501 of the standby screen 300 is input, the standby screen 300 may be changed to the ambient screen 591 including missed notification information on "Hong gil dong" set to the speed dial number "1" as shown in FIG. 23b.

Subsequently, when a certain time elapses even without an additional operation input from a user, the standby screen may be changed to the ambient screen 593 including missed notification information on "Kim XX" set to the next speed dial number "2". When a certain time elapses, the standby screen may be changed to the ambient screen 595 including missed notification information on "Lee XX" set to the next speed dial number "3".

In such a way, the standby screen may be changed to the ambient screen including missed notification information on the other party set to the last speed dial number.

The last ambient screen may be changed to the standby screen 300 when an operation of tapping the ambient screen twice is input or a certain time elapses, but the inventive concept is not limited thereto.

On the other hand, when after the change to corresponding ambient screens 591, 593 and 595, an operation of tapping a corresponding ambient screen 591, 593 or 595 once, twice or three times is input, the corresponding ambient screen 591, 593 or 595 is maintained in a stationary state and not changed to the next ambient screen 593 or 595. A user may conveniently check missed notification information on a specific other party provided on the ambient screen 591, 593 or 595 maintained in the stationary state.

When an operation of tapping a corresponding ambient screen 591, 593 or 595 once, twice or three times is again input, the corresponding ambient screen may be changed to the next ambient screen.

Figure 24A:
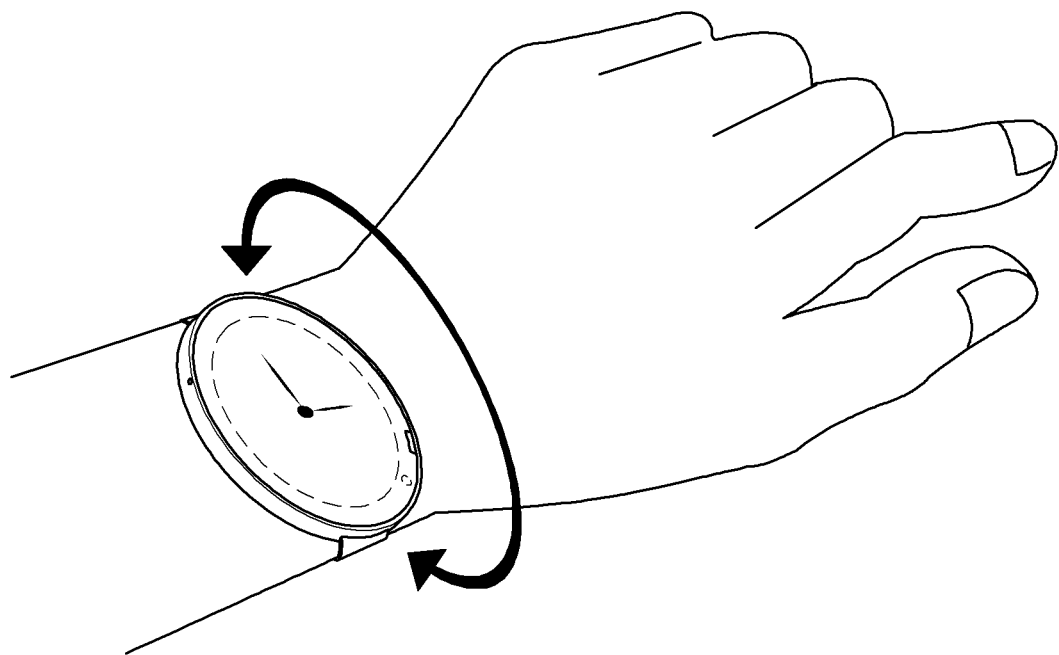
FIGS. 24a and 24b are still other screen shots showing a change from a standby screen having an analog watch shape to an ambient screen including missed notification information corresponding to corresponding speed dial numbers when the speed dial numbers are previously set.
Figure 24B:
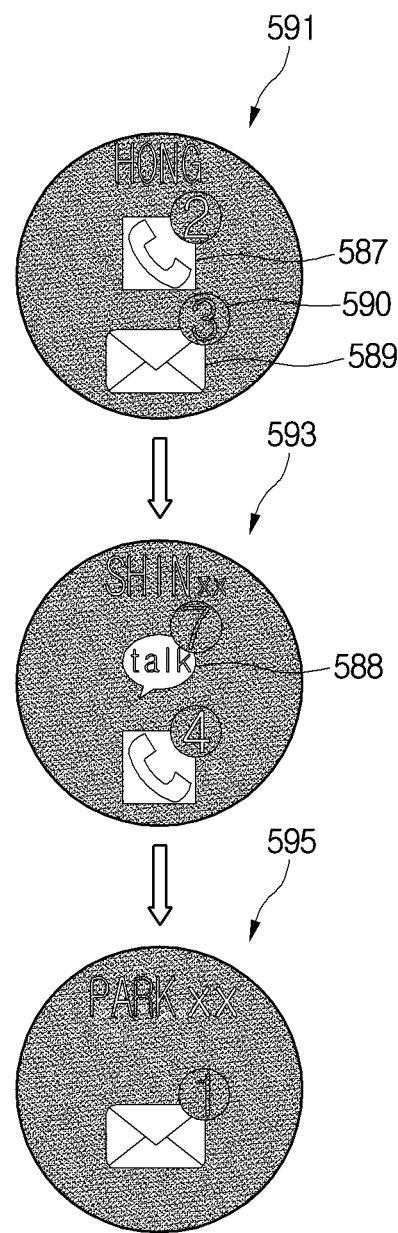

FIGS. 24*a* and 24*b* are still other screen shots showing a change from a standby screen having an analog watch shape to an ambient screen including missed notification information corresponding to corresponding speed dial numbers when speed dial numbers are previously set.

As shown in Table 1, speed dial numbers may be set for the other parties.

When as shown in FIG. 24*a*, an operation of laterally shaking the wrist wearing a watch-type mobile terminal 100 twice or three times is input, a standby screen 300 (in FIG. 22) may be changed to an ambient screen 591 including missed notification information on "Hong gil dong" set to the speed dial number "1" as shown in FIG. 24*b*.

The operation of shaking the wrist may be sensed by an acceleration sensor and/or position sensor that is installed at the watch-type mobile terminal 100.

Subsequently, when a certain time elapses even without an additional operation input from a user, the standby screen may be changed to an ambient screen 593 including missed notification information on "Kim XX" set to the next speed dial number "2". When a certain time elapses, the standby screen may be changed to an ambient screen 595 including missed notification information on "Lee XX" set to the next speed dial number "3".

In such a way, the standby screen may be changed to an ambient screen including missed notification information on the other party set to the last speed dial number.

The last ambient screen may be changed to the standby screen 300 when an operation of tapping the ambient screen twice is input from a user or a certain time elapses, but the inventive concept is not limited thereto.

On the other hand, when after the change to corresponding ambient screens 591, 593 and 595, an operation of tapping a corresponding ambient screen 591, 593 or 595 once, twice or three times is input, the corresponding ambient screen 591, 593 or 595 is maintained in a stationary state and not changed to the next ambient screen 593 or 595. A user may conveniently check missed notification information on a specific other party provided on the ambient screen 591, 593 or 595 maintained in the stationary state.

When an operation of tapping a corresponding ambient screen 591, 593 or 595 once, twice or three times is again input, the corresponding ambient screen 591, 593 or 595 may be changed to the next ambient screen.

Figure 25A:
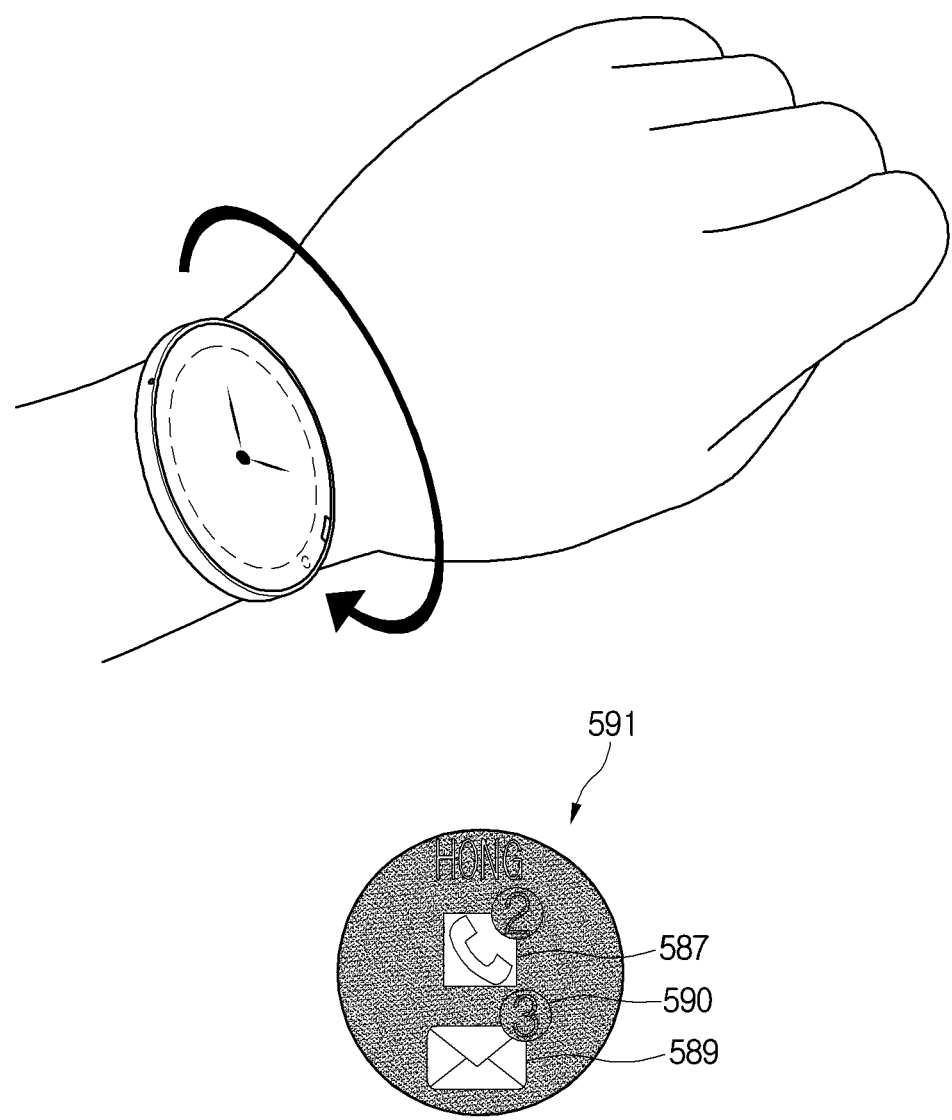
FIGS. 25a to 25c are still other screen shots showing a change from a standby screen having an analog watch shape to an ambient screen including missed notification information corresponding to corresponding speed dial numbers when the speed dial numbers are previously set.
Figure 25B:
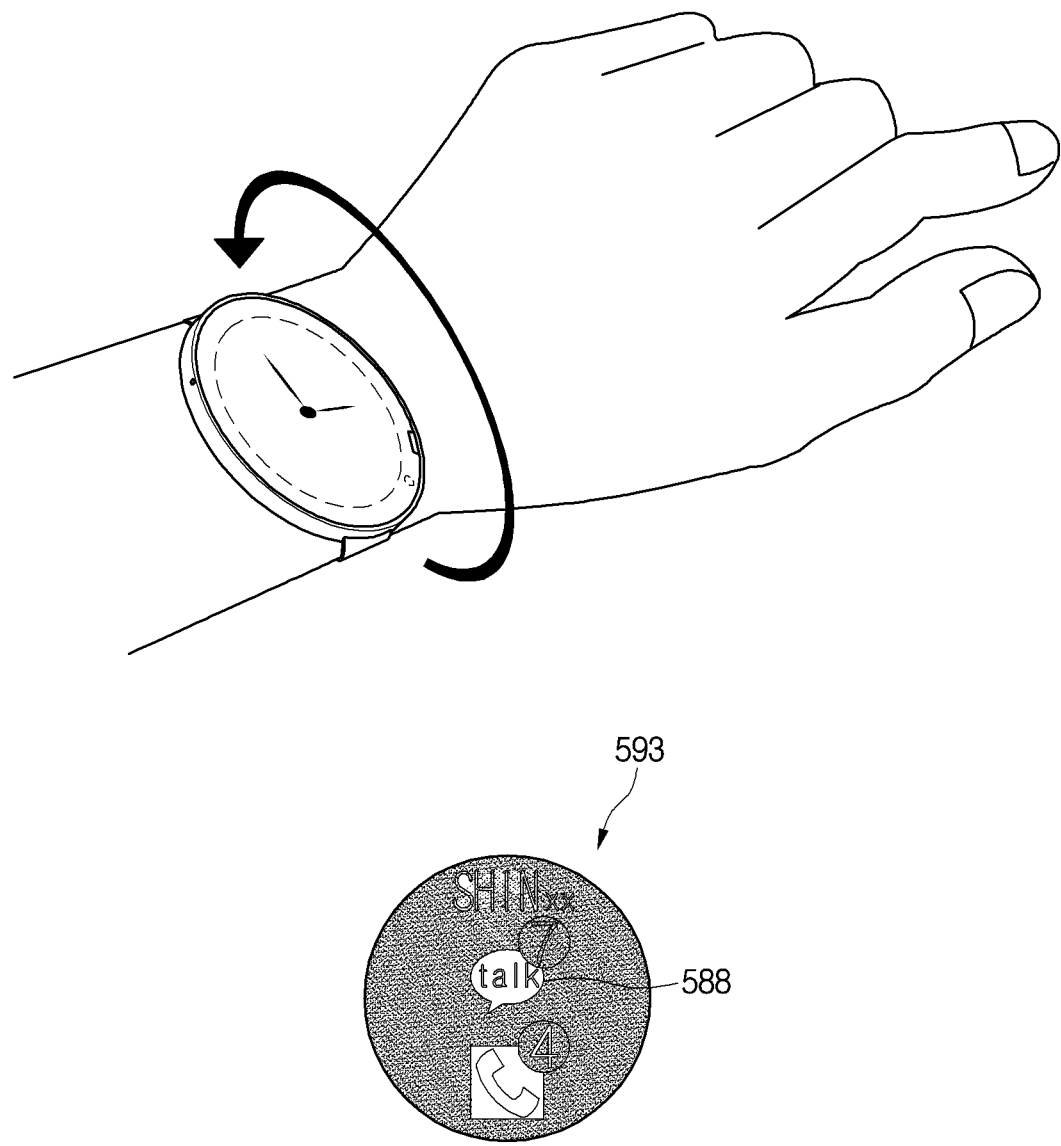
Figure 25C:
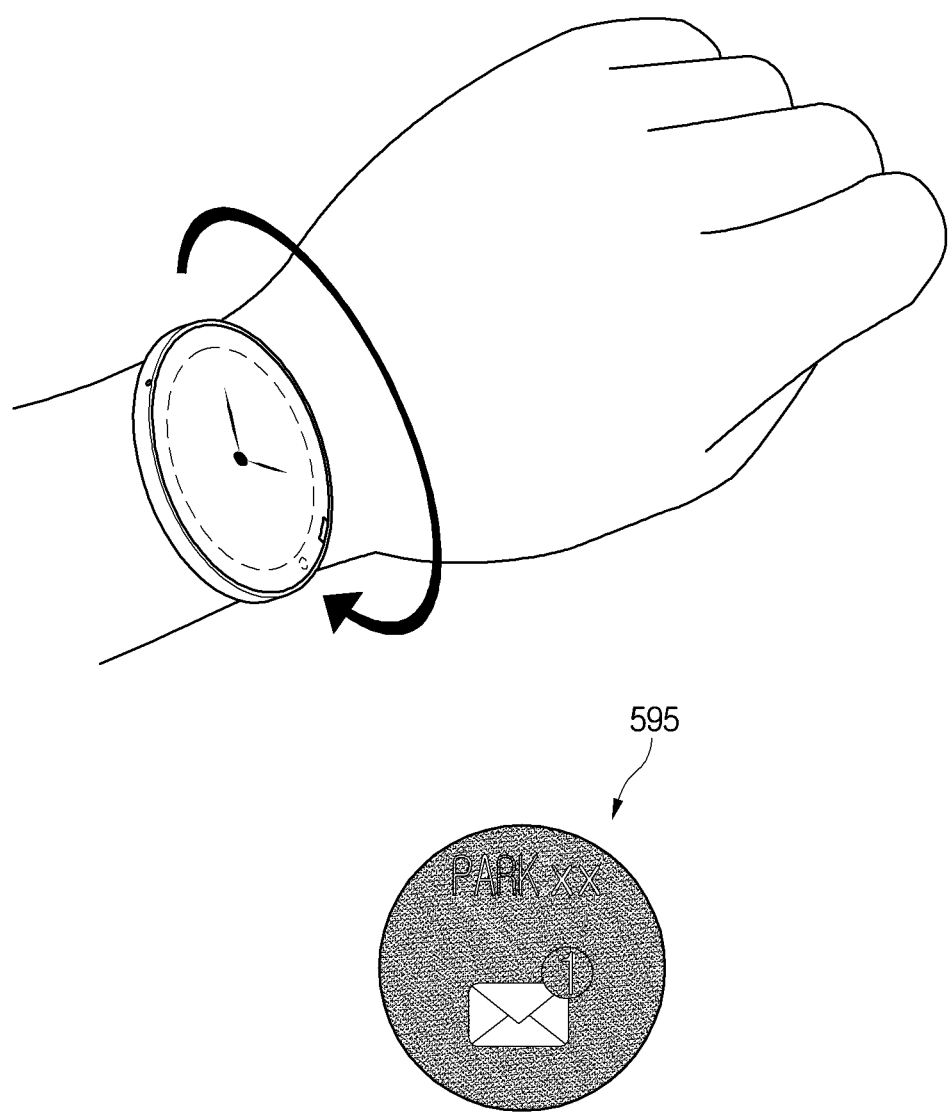

FIGS. 25*a* to 25*c* are still other screen shots showing a change from a standby screen having an analog watch shape to an ambient screen including missed notification information corresponding to corresponding speed dial numbers when speed dial numbers are previously set.

As shown in Table 1, speed dial numbers may be set for the other parties.

When as shown in FIG. 25*a*, an operation of shaking the wrist wearing a watch-type mobile terminal 100 in one direction or clockwise is input, a standby screen 300 (in FIG. 22) may be changed to an ambient screen 591 including missed notification information on "Hong gil dong" set to the speed dial number "1".

When as shown in FIG. 25*b*, an operation of shaking the wrist wearing the watch-type mobile terminal 100 in another direction or anticlockwise is input, the standby screen may be changed to an ambient screen 593 including missed notification information on "Kim XX" set to the next speed dial number "2".

When as shown in FIG. 25*c*, an operation of shaking the wrist wearing the watch-type mobile terminal 100 clockwise is subsequently input, the standby screen may be changed to an ambient screen 595 including missed notification information on "Lee XX" set to the next speed dial number "3".

In such a way, the standby screen may be changed to an ambient screen including missed notification information on the other party set to the last speed dial number.

As such, whenever shaking the wrist wearing the watch-type mobile terminal 100 clockwise or anticlockwise, it is possible to move to the next ambient screen.

The last ambient screen may be changed to the standby screen 300 when an operation of tapping the ambient screen twice is input from a user or a certain time elapses, but the inventive concept is not limited thereto.

Figure 26:
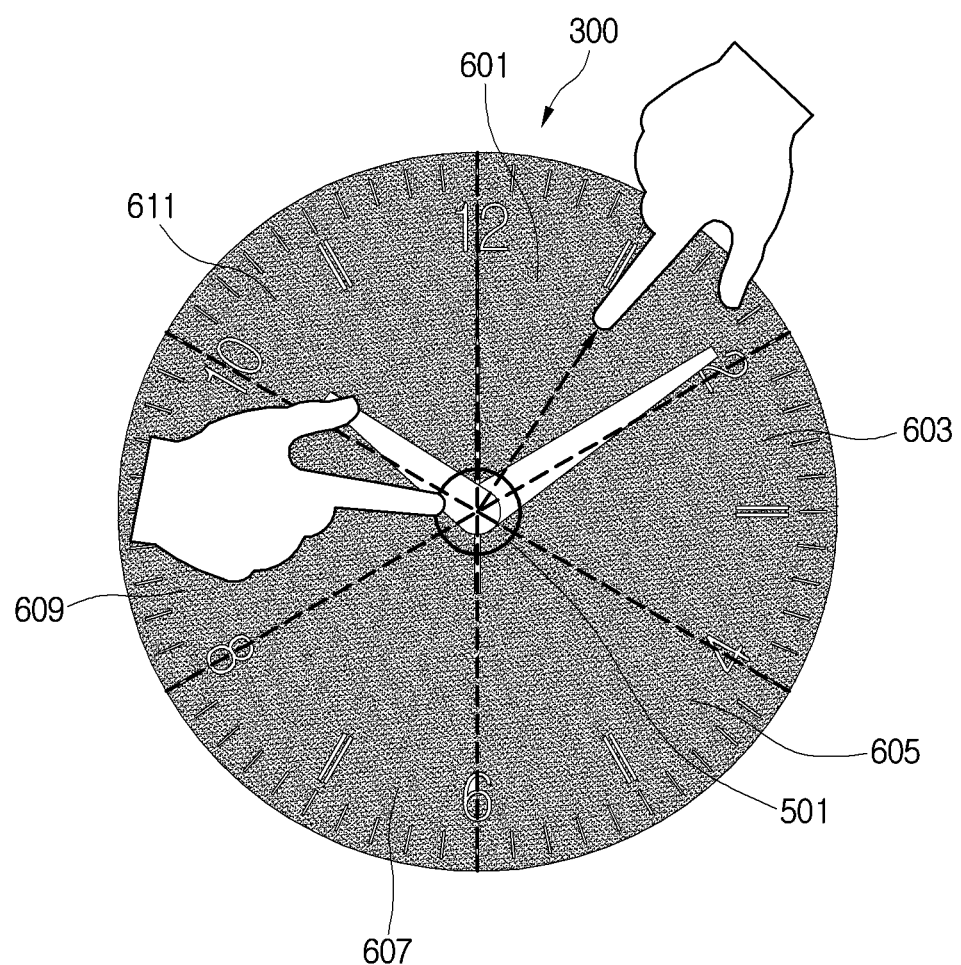
FIG. 26 is a screen shot showing a change from a standby screen having an analog watch shape to an ambient screen including related information corresponding to a corresponding priority when a priority is previously set.

FIG. 26 is a screen shot showing a change from a standby screen having an analog watch shape to an ambient screen including related information corresponding to a corresponding priority when a priority is previously set.

TABLE 2

| Priority | Related information |
| --- | --- |
| First priority | Notification |
| Second priority | Battery state |
| Third priority | Plan |
| Fourth priority | Weather |
| . . . | . . . |

As shown in FIG. 26, first to sixth regions 601, 603, 605, 607, 609 and 611 may be set on a standby screen 300.

The regions 601, 603, 605, 607, 609 and 611 may be respectively defined by a central region 501 and adjacent number regions on the standby screen 300.

For example, the first region 601 may be defined by the central region 501, a number region including the number "12", and a number region including the number "2", and a second region 603 may be defined by the central region 501, a number region including the number "2", and a number region including the number "4".

For example, a third region 605 may be defined by the central region 501, a number region including the number "4", and a number region including the number "6", and a fourth region 607 may be defined by the central region 501, a number region including the number "6", and a number region including the number "8".

For example, a fifth region 609 may be defined by the central region 501, a number region including the number "8", and a number region including the number "10", and the sixth region 611 may be defined by the central region 501, a number region including the number "10", and a number region including the number "12".

As such, adjacent number regions 503 may be number regions set at two-hour interval. As another example, the adjacent number regions 503 may also be number regions set at three- or four-hour interval.

The regions 601, 603, 605, 607, 609 and 611 defined on the standby screen 300 may be set to correspond to priorities represented in Table 1.

For example, the first priority is set to correspond to the first region 601, the second priority may be set to correspond to the second region 603, the third priority may be set to correspond to the third region 605, and the fourth priority may be set to correspond to the fourth region 607. If there are other priorities, these priorities may also be set to correspond to the fifth region 609 and the sixth region 611.

In this state, when an operation of tapping the central region 501 of the standby screen 300 twice and a hold & touch operation are input, then the hold & touch operation is maintained and a dragging operation to a specific region is input, the standby screen 300 may be changed to the ambient screen and related information corresponding to a priority set for a corresponding specific region on the ambient screen may be displayed.

The central region 501 of the standby screen 300 may be defined as a region at which an hour hand 301 and a minute hand 303 meet.

For example, when a dragging operation to the third region 605 is input while the hold & touch operation is maintained, the standby screen 300 may be changed to the ambient screen including plan information.

A user may easily check pieces of related information set with a priority through simple manipulation.

FIGS. 27a to 27f show in detail an ambient-screen change method in FIG. 26.

Figure 27A:
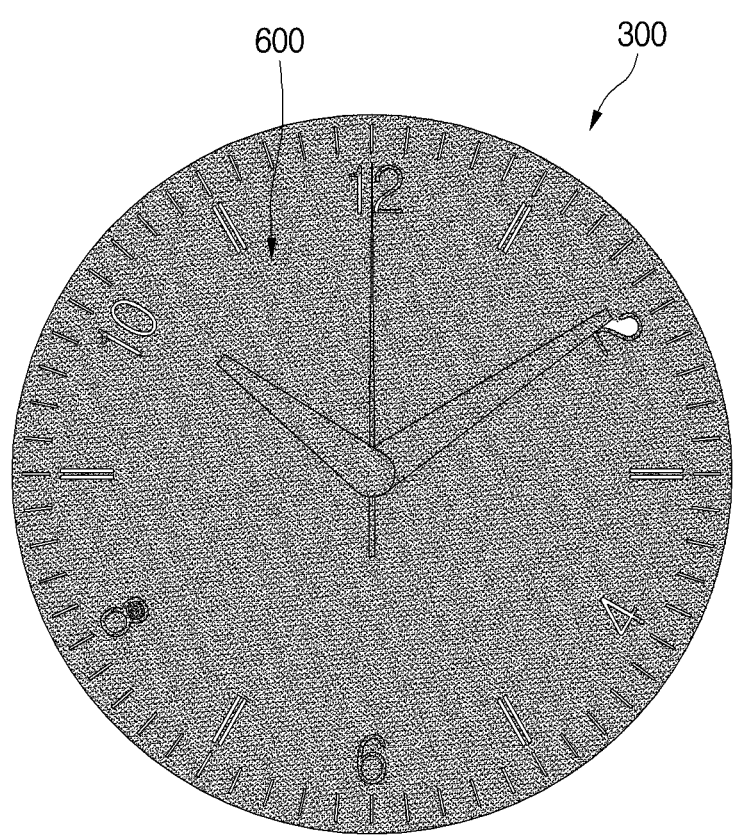
FIGS. 27a to 27f show in detail an ambient-screen change method in FIG. 26.

As shown in FIG. 27a, a plurality of regions 601, 603, 605, 607, 609 and 611 may be defined on a standby screen 300 to correspond to priorities.

Figure 27B:
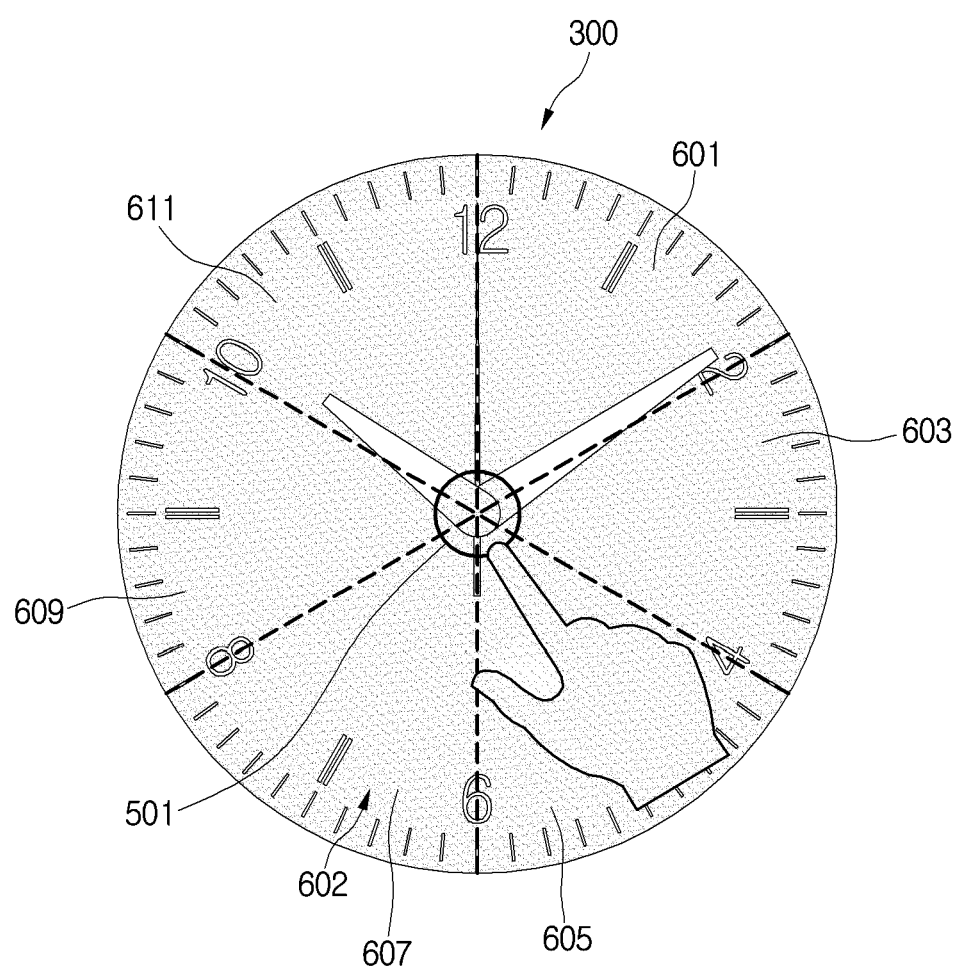

As shown in FIG. 27b, when an operation of tapping a central region 501 twice on the standby screen 300 and a hold & touch operation are input, a first background region 600 on the standby screen 300 may be changed to a second background region 602. The second background region 602 may be expressed with higher graylevel than the first background region 601. For example, when the first background region 600 is expressed with black graylevel (0th graylevel), the second background region 602 may be expressed with higher graylevel than black graylevel, e.g., fifth graylevel to twentieth graylevel, but the inventive concept is not limited thereto.

Figure 27C:
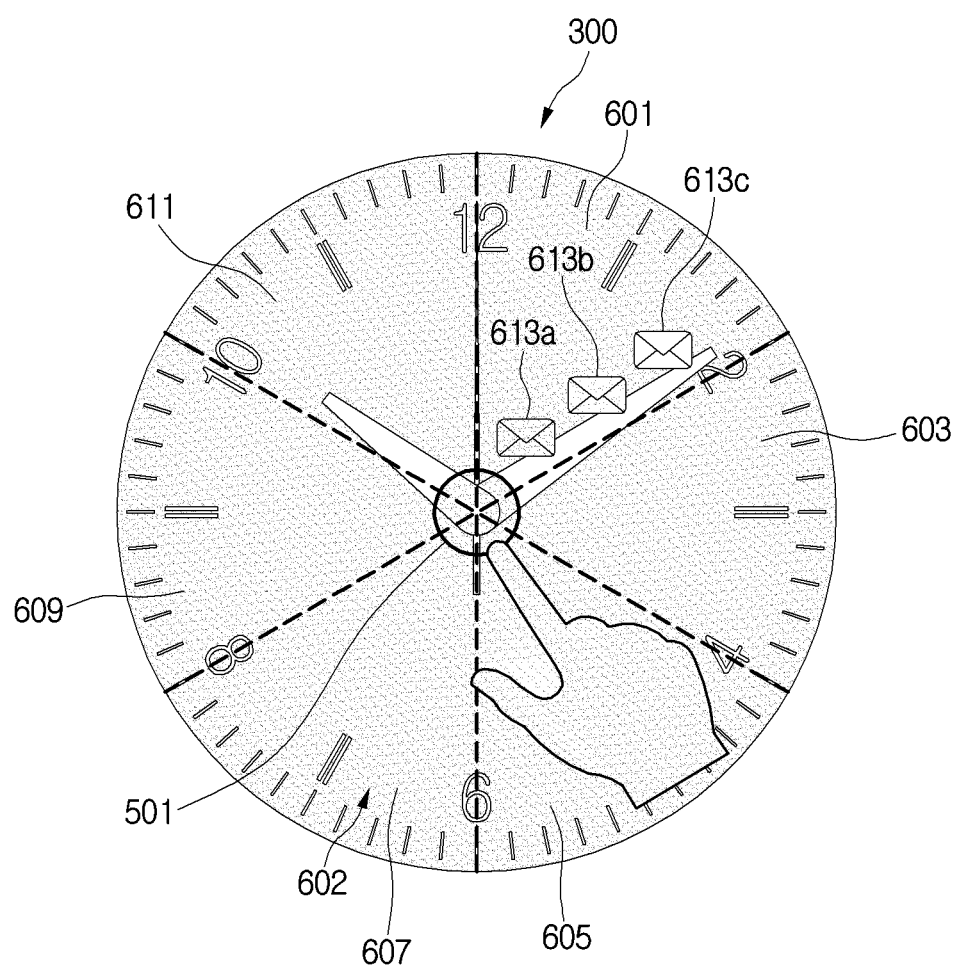

When the first background region 600 is changed to the second background region 602, the hold and touch operation is maintained and e.g., a dragging operation to the first region 601 is input, items 613a to 613c representing missed notification information may be displayed to slide in a dragging direction as shown in FIG. 27c.

The graylevel of the items 613a to 613c representing missed notification information moving in the dragging direction may gradually increase. For example, a second item 613b secondly displayed may be expressed with higher graylevel than a first item 613a firstly displayed, and a third item 613c thirdly displayed or the last item may be expressed with higher graylevel than the second item 613b secondly displayed.

The first item 613a firstly displayed may have the same graylevel as the first background region 600 or the second background region 602 but the inventive concept is not limited thereto.

The third item 613c thirdly displayed may have white graylevel (255th graylevel) or graylevel close thereto, e.g., 230th graylevel to 255th graylevel, but the inventive concept is not limited thereto.

Figure 27D:
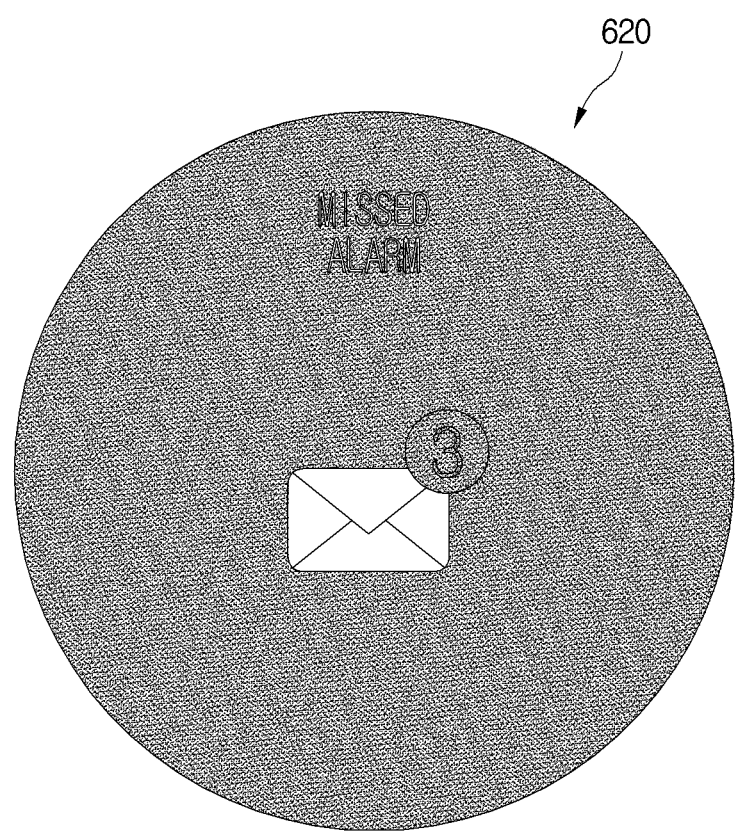

Subsequently, a standby screen 300 may be changed to an ambient screen 620 and missed notification information corresponding to the first priority corresponding to the first region 601 of the standby screen 300 may be displayed on the ambient screen 620, as shown in FIG. 27d.

Figure 27E:
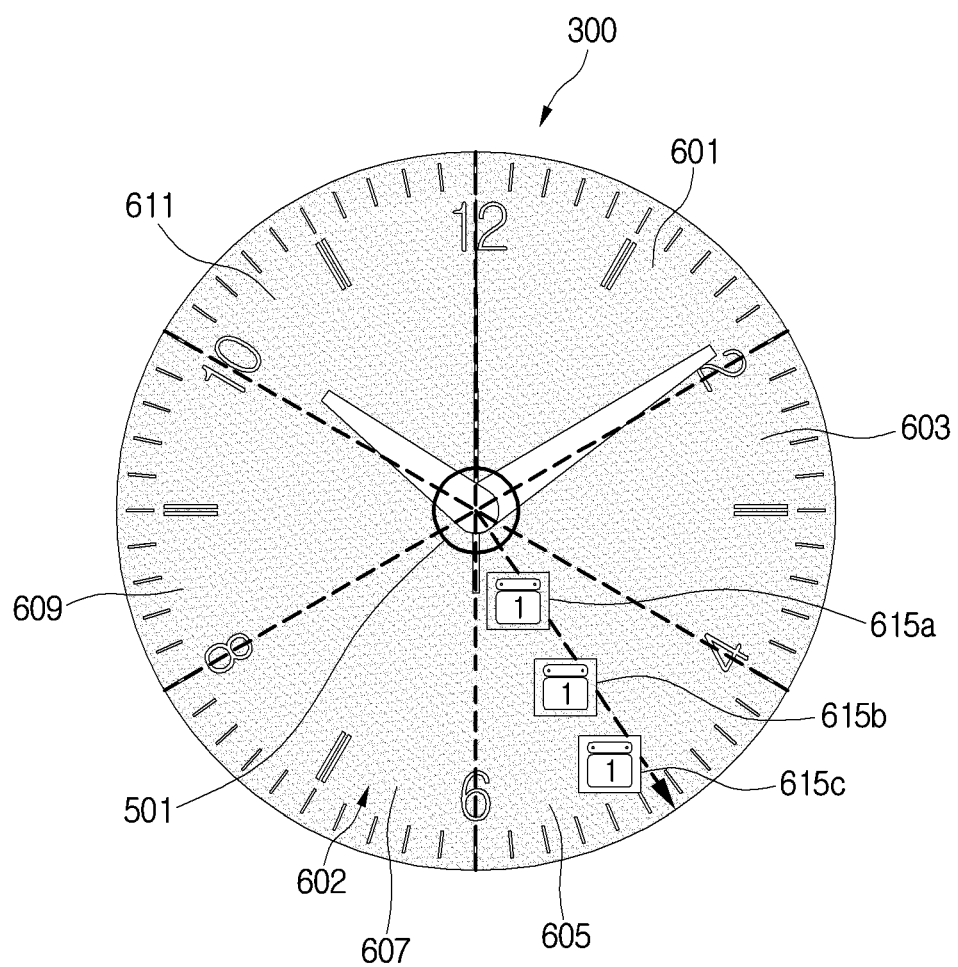

When as shown in FIG. 27b, the first background region 600 of the standby screen 300 is changed to the second background region 602, a hold and touch operation is maintained and e.g., a dragging operation to the third region 605 is input, items 615a to 615c representing plan information may be displayed to slide in a dragging direction as shown in FIG. 27e.

The graylevel of the items 615a to 615c representing missed notification information moving in the dragging direction may gradually increase.

A first item 615a firstly displayed may have the same graylevel as the first background region 600 or the second background region 602 but the inventive concept is not limited thereto.

A third item 615c thirdly displayed may have white graylevel (255th graylevel) or graylevel close thereto, e.g., 230th graylevel to 255th graylevel, but the inventive concept is not limited thereto.

Figure 27F:
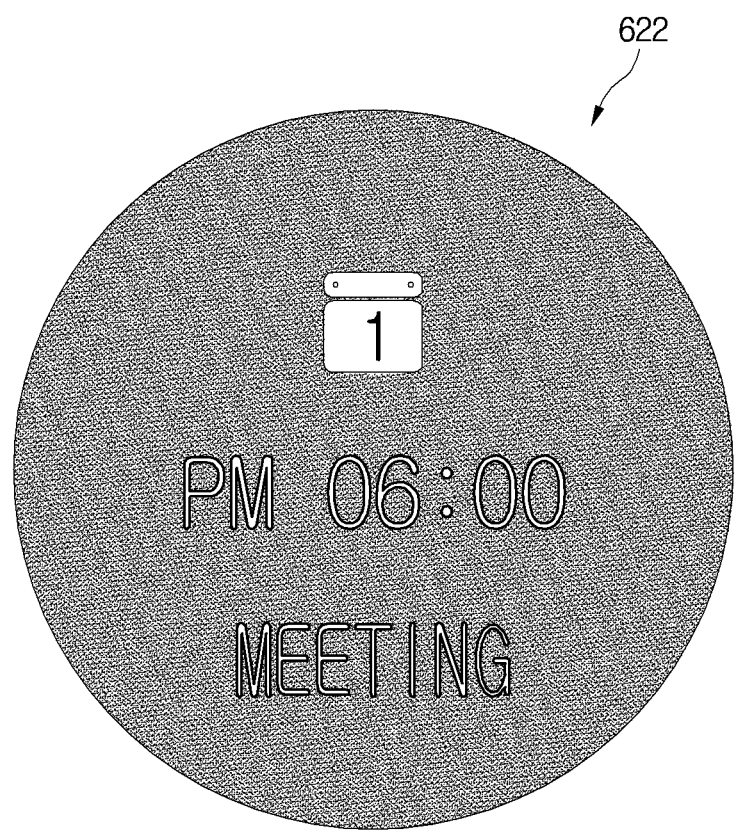

Subsequently, the standby screen 300 may be changed to an ambient screen 622 and plan information corresponding to the third priority corresponding to the third region 605 of the standby screen 300 may be displayed on the ambient screen 622, as shown in FIG. 27f.

FIGS. 28a to 28d are screen shots showing a change from a standby screen having an analog watch shape to an ambient screen including related information by using numbers representing time on the standby screen.

Figure 28A:
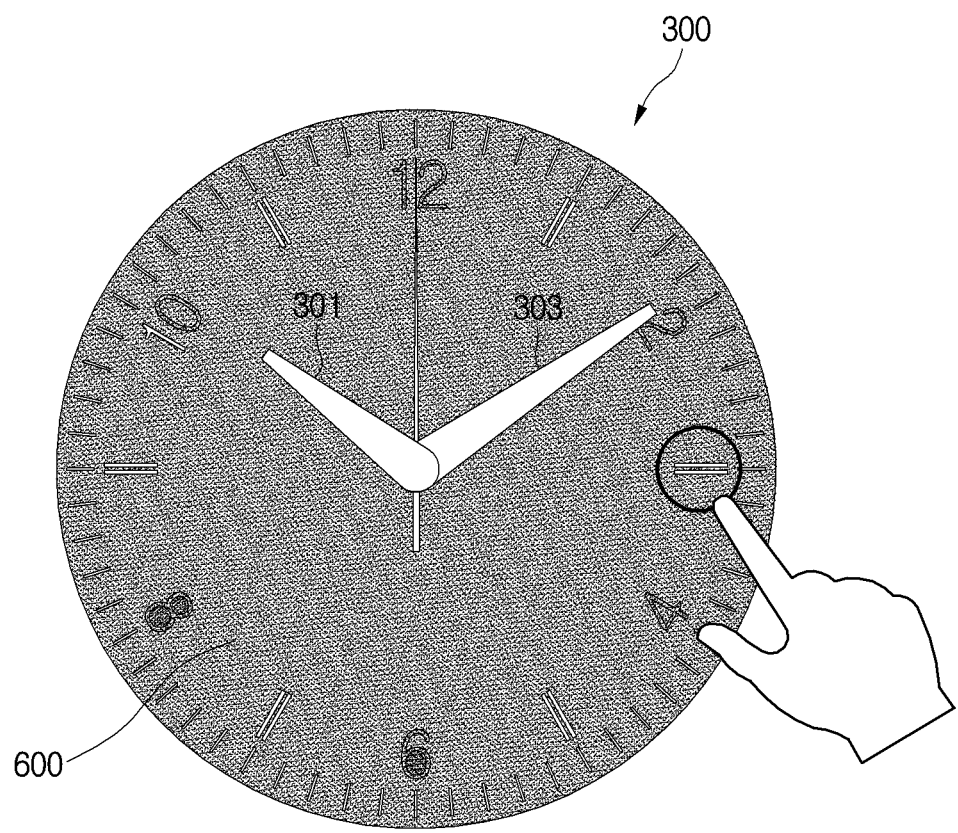
FIGS. 28a to 28d are screen shots showing a change from a standby screen having an analog watch shape to an ambient screen including related information by using the numbers representing time on the standby screen.
Figure 28B:
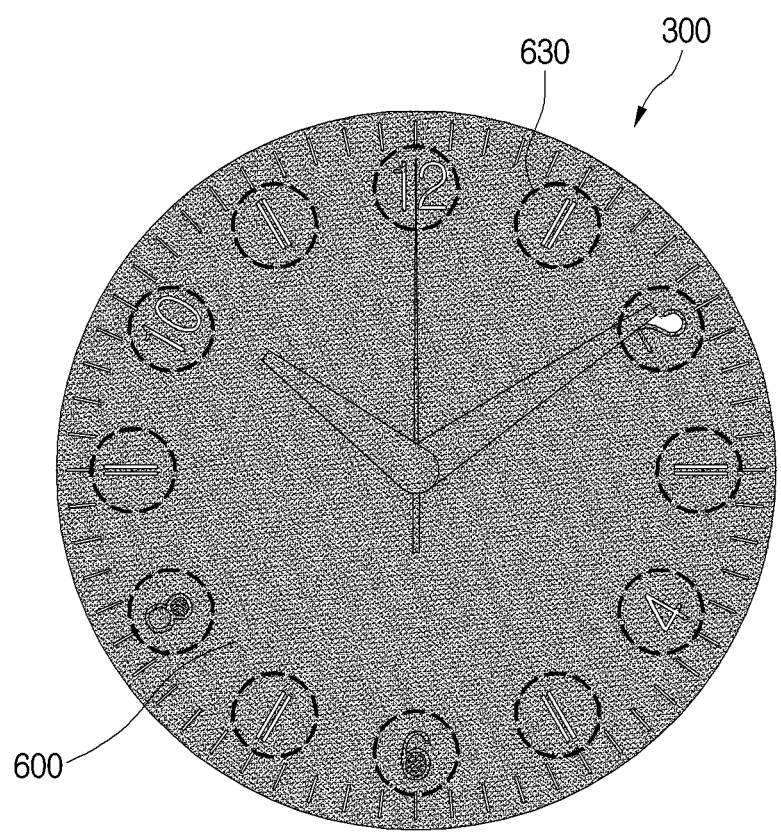

When as shown in FIG. 28a, a long tough operation on a number on a standby screen 300 corresponding to a specific month is input in order to check a plan corresponding to a specific month and date, a circular line 630 including each number displayed on the perimeter of the standby screen 300 may be displayed as shown in FIG. 28b.

As such, when a long touch operation on the number of the standby screen 300 is input, a control unit 180 may check a specific month corresponding to a corresponding number.

For example, when a long touch on the number "3" corresponding to March on the standby screen 300 is input, the standby screen 300 may display twelve circular lines 630 including the numbers 1 to 12.

The circular line 630 may have a different color from an object 301 or 303 or the background region 600 or have a dotted or solid line.

Figure 28C:
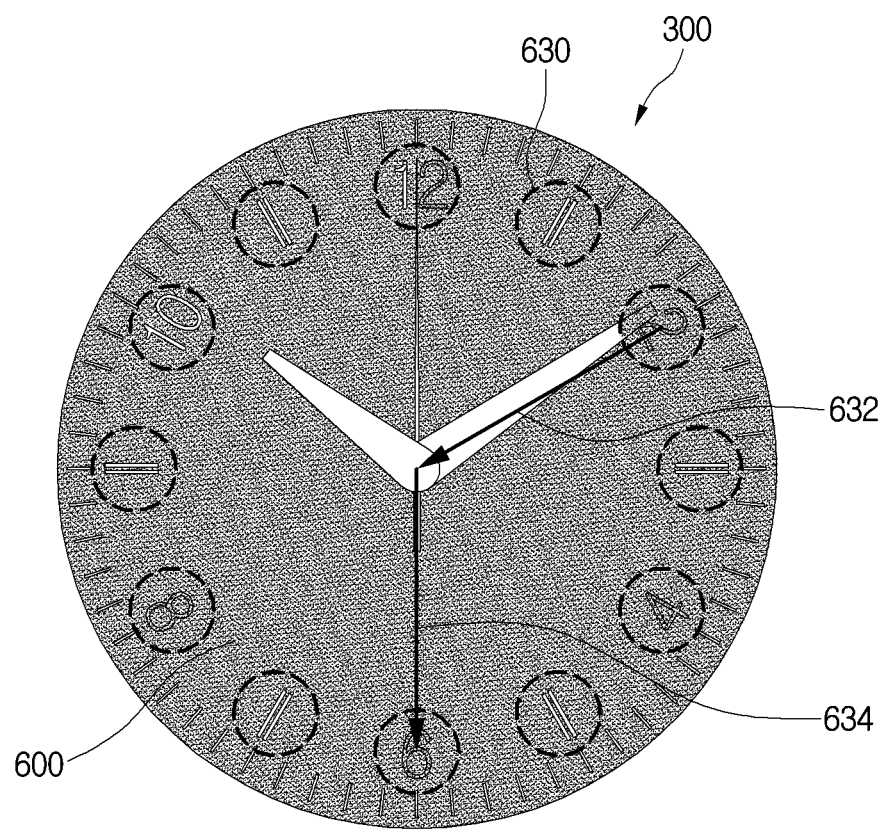
Figure 28D:

Subsequently, when as shown in FIG. 28c, a first dragging operation 632 from a first circular line including a first number corresponding to a specific date to a central region 501 of the standby screen 300 is input and then a second dragging operation 634 from the central region 501 of the standby screen 300 to a second circular line including a second number is input, the standby screen 300 may be changed to an ambient screen 636 and plan information corresponding to a specific month and date may be displayed on the ambient screen 636, as shown in FIG. 28d.

The control unit 180 may sequentially synthesize the first circular line and the second circular line touched by the first and second dragging operations 632 and 634 to check a specific date.

For example, when the first number in the first circular line is "2" and the second number in the second circular line is "6", the numbers "2" and "6" are synthesized to be the date "26".

Although not shown, circular lines 630 including numbers displayed on the perimeter of the standby screen 300 may be displayed in order to recognize a specific year on the standby screen 300 having the analog watch shape, when a long touch operation is input to the central region 501 of the standby screen 300, for example. When continuous touch operations are input to specific numbers on the circular lines 630 including numbers displayed in this way, a corresponding year may be recognized.

For example, when touch operations are sequentially input to the numbers "2", "0", "1" and "4" among displayed numbers, the year 2014 may be recognized by the control unit 180.

Figure 29A:
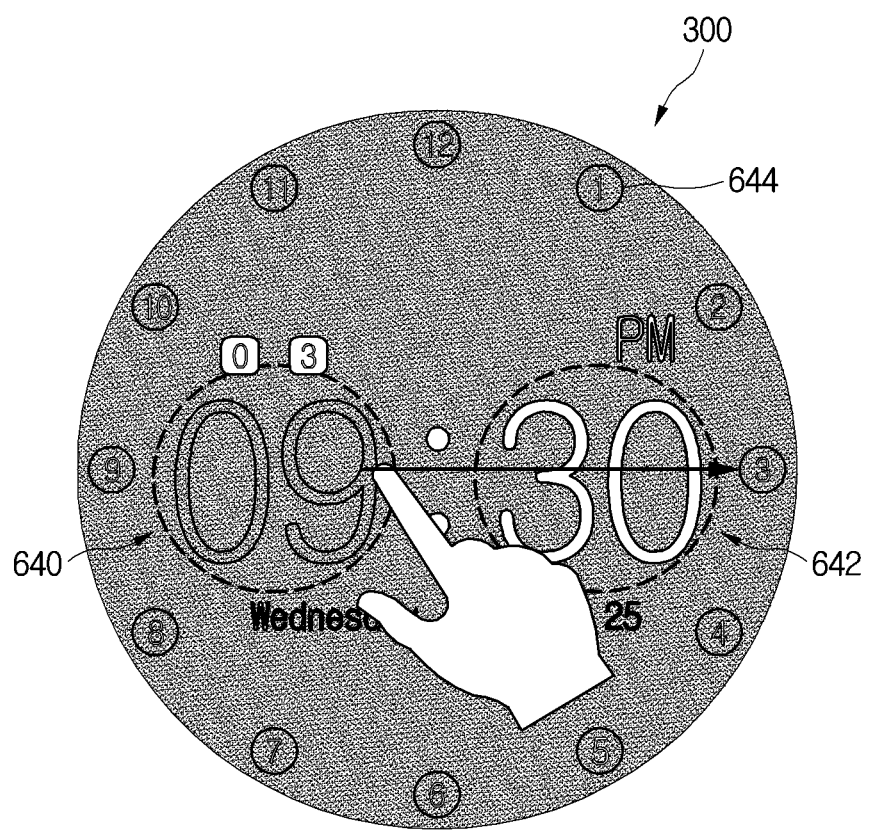
FIGS. 29a to 29c are other screen shots showing a change from a standby screen having a digital watch shape to an ambient screen including related information by using the numbers representing time on the standby screen.
Figure 29B:
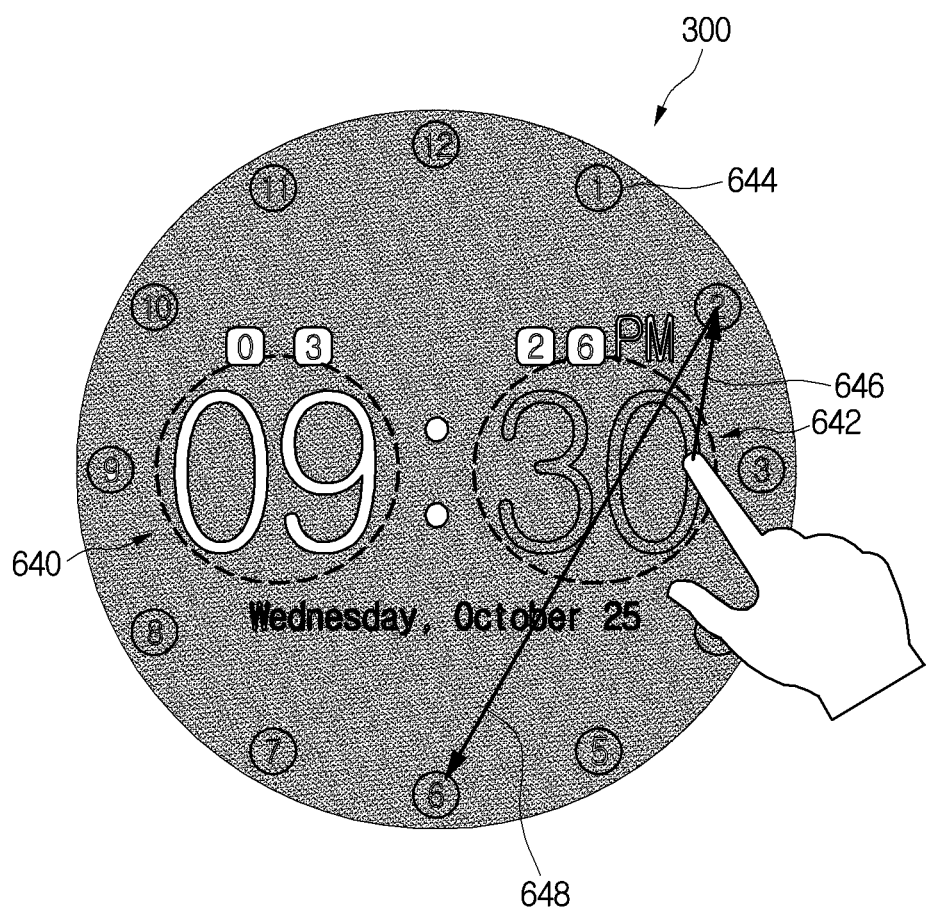
Figure 29C:
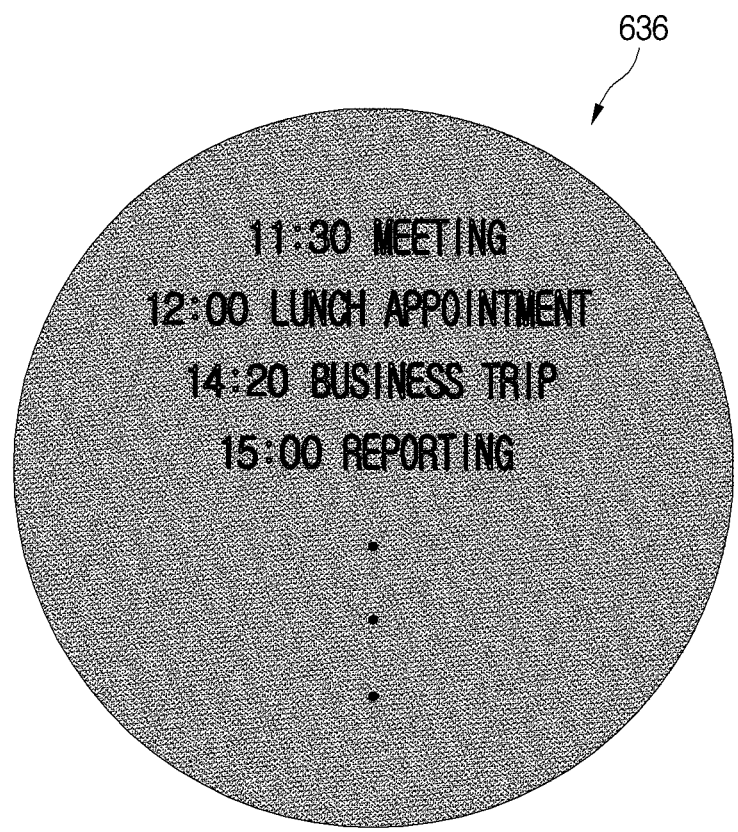

FIGS. 29a to 29c are other screen shots showing a change from a standby screen having a digital watch shape to an ambient screen including related information by using numbers representing time on the standby screen.

A standby screen 300 having a digital watch shape may include an hour region 640 representing a specific hour and a minute region 642 representing a specific minute.

For example, the hour "9" may be displayed on the hour region 640 and the minute "30" may be displayed on the minute region 642.

When a long touch operation is input to the hour region 640 of the standby screen 300 in order to check a plan corresponding to a specific month and date, a circular line 644 including each number displayed on the perimeter of the standby screen 300 may be displayed as shown in FIG. 29a.

Subsequently, when a dragging operation is input to a specific number with reference to the circular line 644 including each number while the long touch operation is maintained, a specific month corresponding to the specific number may be recognized.

For example, when a dragging operation is input to a first circular line including the number "3" while the long touch operation is maintained, the month "March" corresponding to the number "3" may be recognized.

The number "03" meaning the month March may be displayed near an hour region 640, but the inventive concept is not limited thereto.

The circular line being displayed may disappear after the input of the dragging operation, but the inventive concept is not limited thereto.

Subsequently, when a long touch operation is input to a minute region 642, the circular line 644 including each number displayed on the perimeter of the standby screen 300 may be displayed as shown in FIG. 29b.

Subsequently, when a first dragging operation 646 from the minute region 642 to a first circular line including a first number is input and then a second dragging operation 648 from the first circular line to a second circular line including a second number is input, the standby screen 300 may be changed to an ambient screen 636 and plan information corresponding to a specific month and date may be displayed on the ambient screen 636.

The control unit 180 may sequentially synthesize a number in the first circular line and a number in the second circular line touched by the first and second dragging operations 646 and 648 respectively to check a specific date.

For example, when a first number in the first circular line is "2" and a second number in the second circular line is "6", the numbers "2" and "6" are synthesized to be the date "26".

The number "26" meaning the date "26" may be displayed near the minute region 642, but the inventive concept is not limited thereto.

Although not shown, circular lines 644 including numbers displayed on the perimeter of the standby screen 300 may be displayed in order to recognize a specific year on the standby screen 300 having the digital watch shape, when a long touch operation is input to a specific portion of a background region 600 excluding the hour region 640 and the minute region 642 of the standby screen 300, for example. When continuous touch operations are input to specific numbers on the circular lines 644 including numbers displayed in this way, a corresponding year may be recognized.

FIGS. 30a to 30d are screen shots showing a change from a changed ambient screen in FIG. 28a to 28 or 29 to another ambient screen.

Figure 30A:
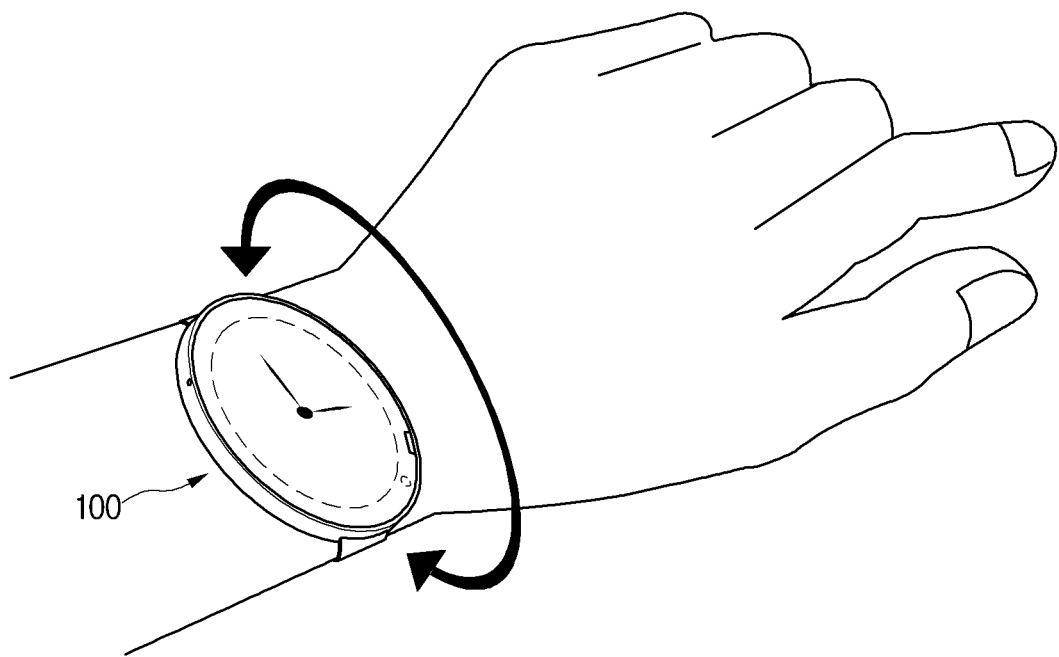
FIGS. 30a to 30d are screen shots showing a change from a changed ambient screen in FIGS. 28a to 28d or FIGS. 29a to 29c to another ambient screen.
Figure 30B:
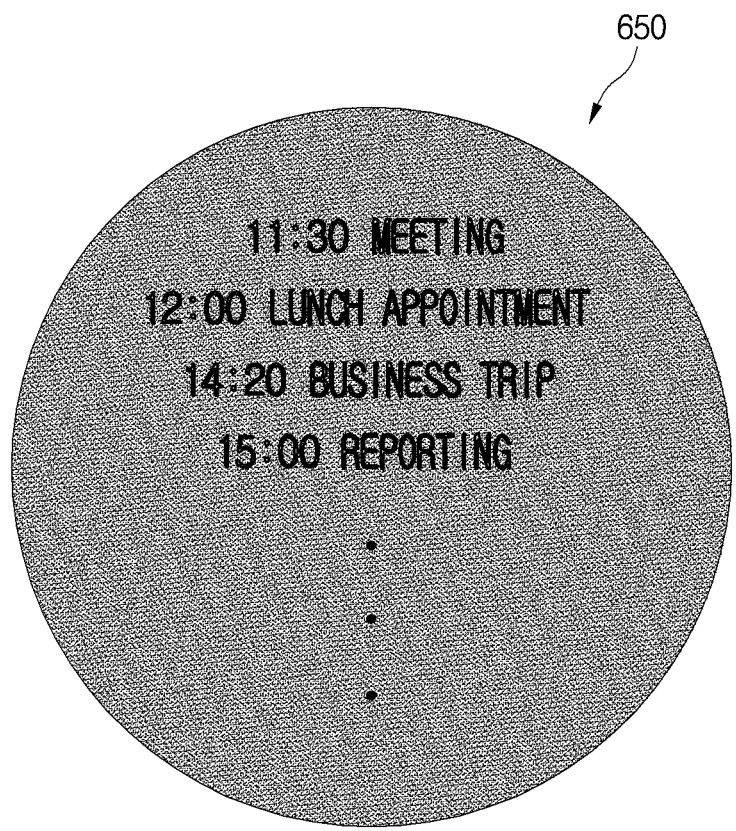

An ambient screen 650 in FIG. 30b may be an ambient screen 636 in FIGS. 28a to 28d or FIGS. 29a to 29c.

For the convenience of description, the ambient screen 636 in FIG. 30b is referred to as a first ambient screen.

Figure 30C:
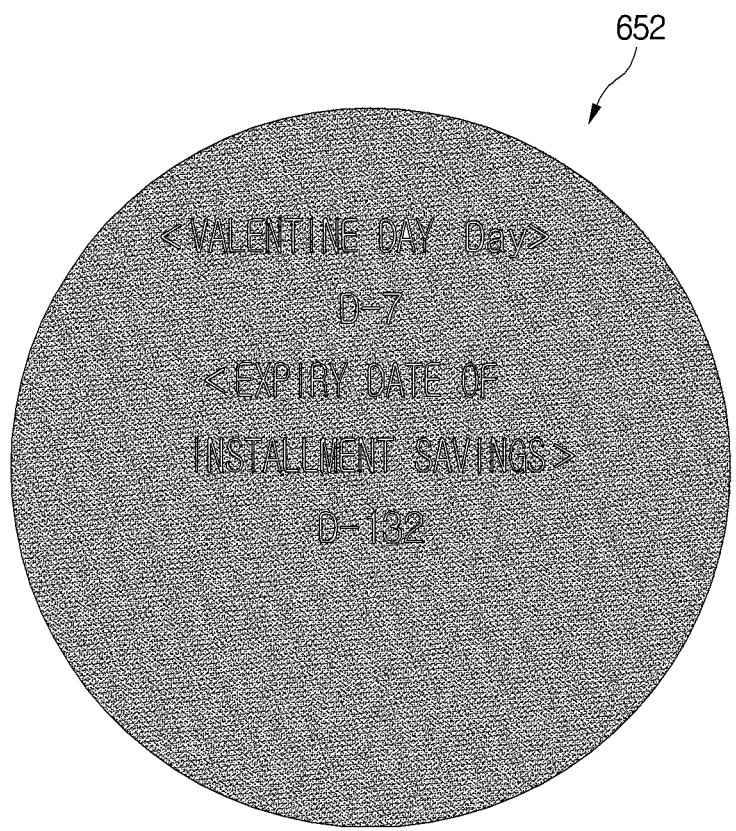

As such, when the first ambient screen 636 is displayed on a touch screen 151 of a watch-type mobile terminal 100 and as shown in FIG. 30a, an operation of shaking the wrist wearing the watch-type mobile terminal 100 in one direction, e.g., clockwise is input, the first ambient screen 636 may be changed to a second ambient screen 652 and notification information may be displayed on the second ambient screen 652 as shown in FIG. 30c.

Figure 30D:
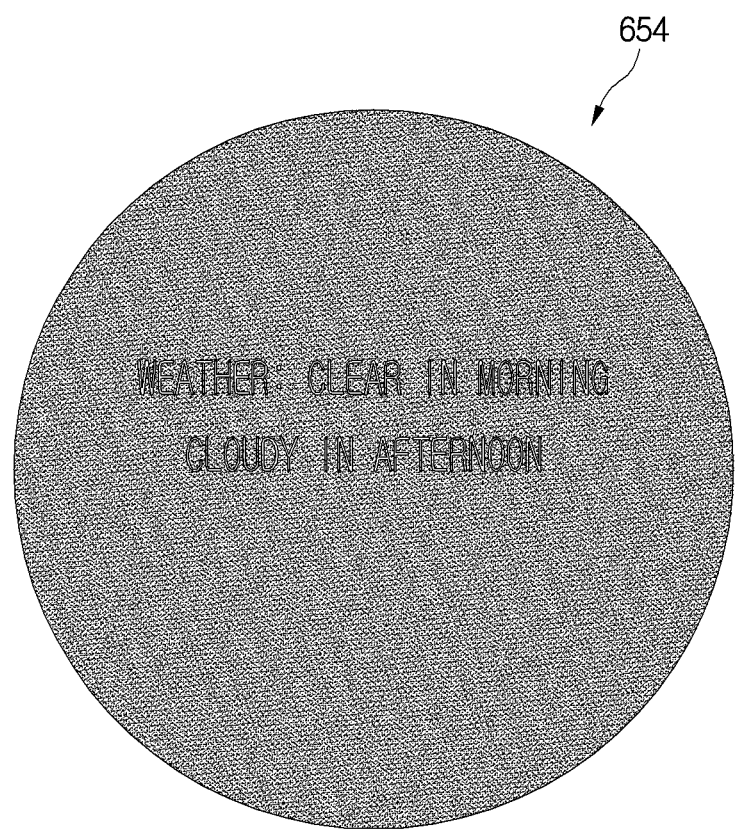

Subsequently, when as shown in FIG. 30a, an operation of shaking the wrist wearing the watch-type mobile terminal 100 in another direction, e.g., anticlockwise is input, the second ambient screen 652 may be changed to a third ambient screen 654 and weather information may be displayed on the third ambient screen 645 as shown in FIG. 30d.

As such, when a standby screen 300 is changed to the first ambient screen 636, the ambient screen may be changed to other ambient screens 652 and 654 whenever the wrist wearing the watch-type mobile terminal 100 is laterally shaken.

The turn of other ambient screens 652 and 654 to be changed may also be previously set.

Figure 31A:
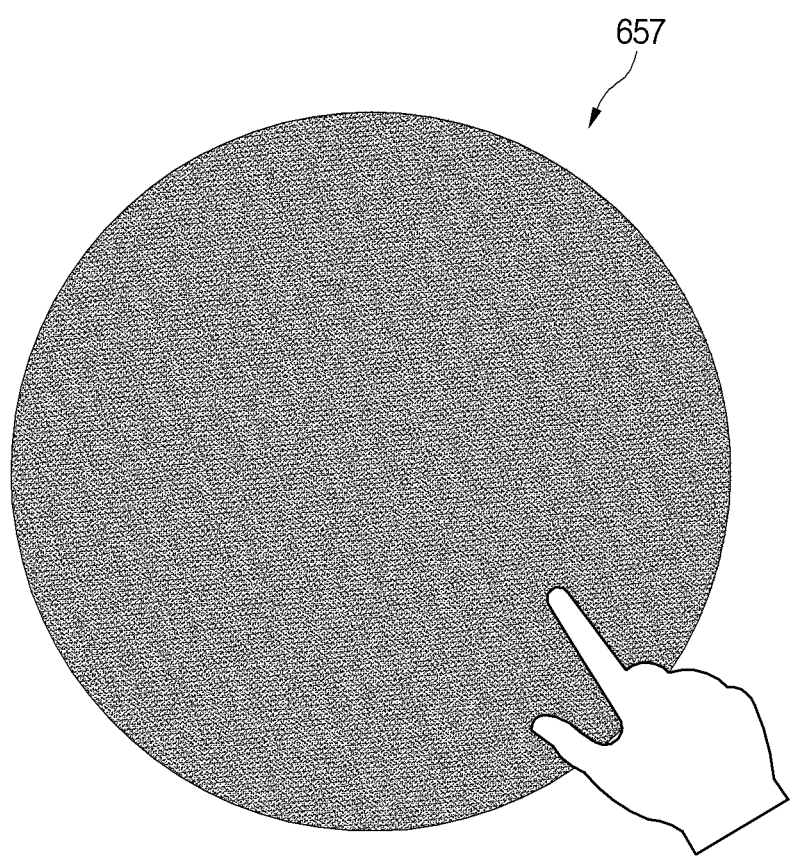
FIGS. 31a and 31b are screen shots sequentially displaying related information by using an ambient screen having black graylevel.
Figure 31B:
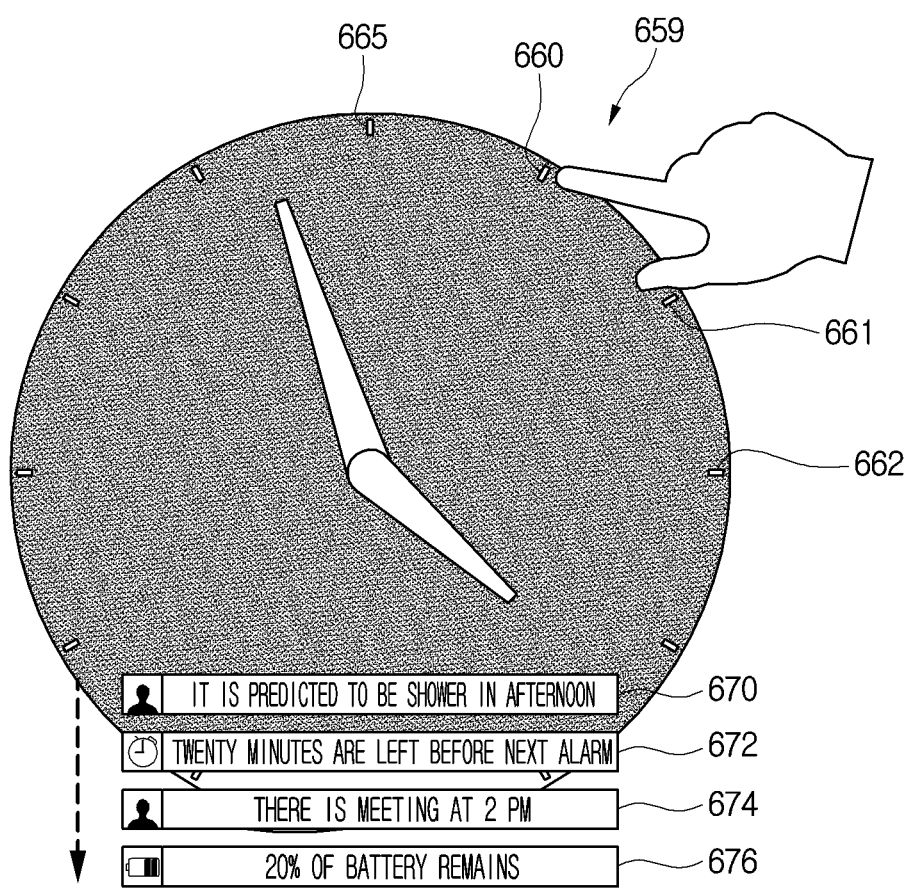

FIGS. 31a and 31b are screen shots sequentially displaying related information by using an ambient screen having black graylevel.

The related information is e.g., user's favorite information, which may be e.g., things to do today, weather, a battery state, text messages, an address book, and so on.

The information may be set to correspond to scales 660 to 665 disposed along the perimeter of an ambient screen 659 in FIG. 31b.

For the convenience of description, the ambient screen 659 is referred to as a second ambient screen.

For example, these scales 660 to 665 may be scales representing hours. In this case, twelve scales 660 to 665 representing 1 o'clock to 12 o'clock may be displayed on the ambient screen 659.

TABLE 3

| Scale | Favorite information |
| --- | --- |
| Scale 1 660 | Weather |
| Scale 2 661 | Notification |
| Scale 3 662 | Plan |
| ... | ... |
| Scale 12 665 | Battery state |

As such, each scale of the ambient screen 659 and favorite information may be set.

As shown in FIG. 31a, a first ambient screen 657 expressed with black graylevel may be displayed.

On the first ambient screen 657 expressed with black graylevel, power DDVDH from an OLED driver 362 as well as power VDDEL from a power supply unit 356 in FIGS. 7a and 7b are not supplied to a touch screen 151, so no identifiable information is displayed on the touch screen 151. Nevertheless, power is supplied to a touch sensor panel disposed on the touch screen 151, so it is possible to sense a touch operation.

When the first ambient screen 657 is displayed, a sleep mode may be maintained.

When an operation of tapping the first ambient screen 657 twice is input, the sleep mode is changed to an awake mode and thus the first ambient screen 657 may be changed to a second ambient mode 659 as shown in FIG. 31b. The awake mode may be classified into the normal mode and the low-power mode as described above, but the inventive concept is not limited thereto.

An hour hand, a minute hand and scales 660 to 665 representing hours may be displayed on the second ambient screen 659.

The second ambient screen 659 may be a screen having an analog watch shape.

When a touch operation is input to a first scale 660 among scales 660 to 665 being displayed, a first notification window 670 including favorite information corresponding to a corresponding scale 660 may be displayed on the second ambient screen 659.

When a touch operation is input to the next scale 661, a second notification window 672 including favorite information corresponding to a corresponding scale 661 may be displayed on the second ambient screen 659.

In this way, a plurality of notification windows 670 to 676 may be displayed on the second ambient screen.

The notification windows 670 to 676 may be arranged in one direction or the next notification windows 672 to 676 may be displayed instead of the previous notification windows 670 to 674 being displayed, but the inventive concept is not limited thereto.

When an operation of tapping corresponding notification windows 670 to 676 once is input, detailed information on corresponding notification windows 670 to 676 may be displayed though not shown, but the inventive concept is not limited.

When an operation of tapping corresponding notification windows 670 to 676 twice is input, corresponding notification windows 670 to 676 may disappear though not shown, but the inventive concept is not limited.

FIGS. 31a to 31b show that the notification windows 670 to 676 are displayed outside the second ambient screen 659, which is only caused in the process of enlarging the size of the notification windows 670 to 676 compared to the size of the second ambient screen 659, for easy reading. The notification windows 670 to 676 may be displayed on the second ambient screen 659 without departing from the second ambient screen 659.

Figure 32A:
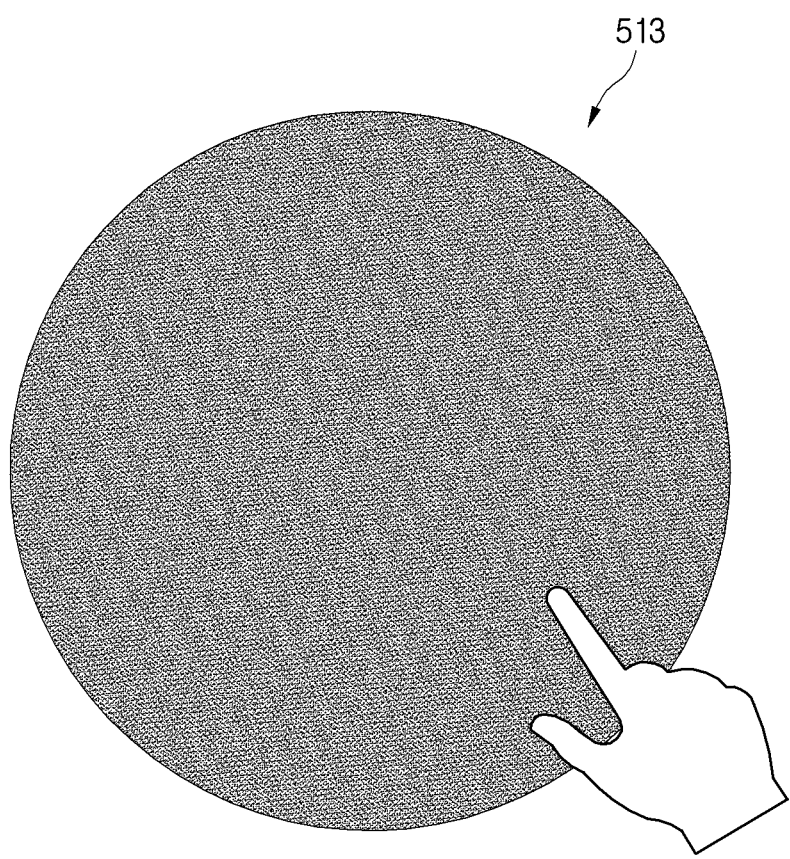
FIGS. 32a to 32c are other screen shots sequentially displaying related information by using an ambient screen having black graylevel.
Figure 32B:
Figure 32C:
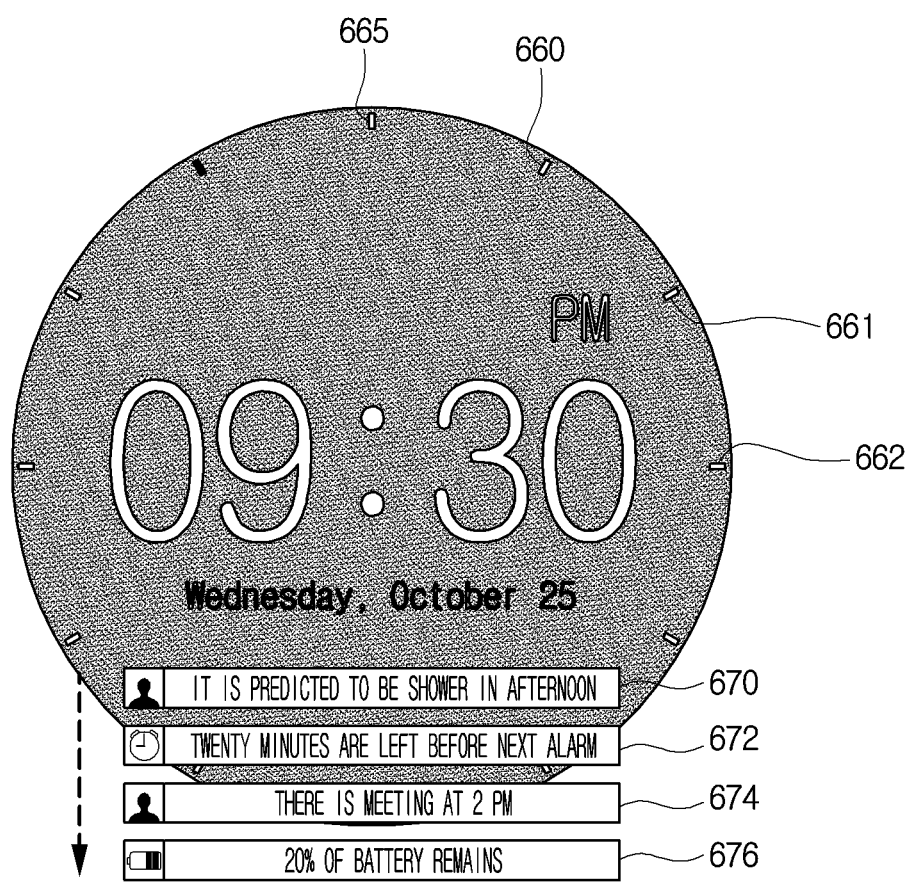

FIGS. 32a to 32c are other screen shots sequentially displaying related information by using an ambient screen having black graylevel.

As shown in FIG. 32a, a first ambient screen 513 having black graylevel may be displayed.

When the first ambient screen 513 is displayed, a sleep mode may be maintained.

When an operation of tapping the first ambient screen 513 twice is input, the sleep mode is changed to an awake mode and thus the first ambient screen 513 may be changed to a second ambient mode 667 as shown in FIG. 32b.

The second ambient screen 667 may also be a screen having a digital watch shape.

Thus, an hour and a minute are not represented by an hour hand and a minute hand but may be represented by numbers.

In this case, when an operation of tapping the second ambient screen 667 twice is input, scales 660 to 665 representing hours may be displayed along the perimeter of the second ambient screen 667.

The scales 660 to 665 may be set to correspond to favorite information in Table 3.

Whenever touch operations are input to corresponding scales 660 to 665, notification windows 670 to 676 including favorite information may be displayed.

Figure 33A:
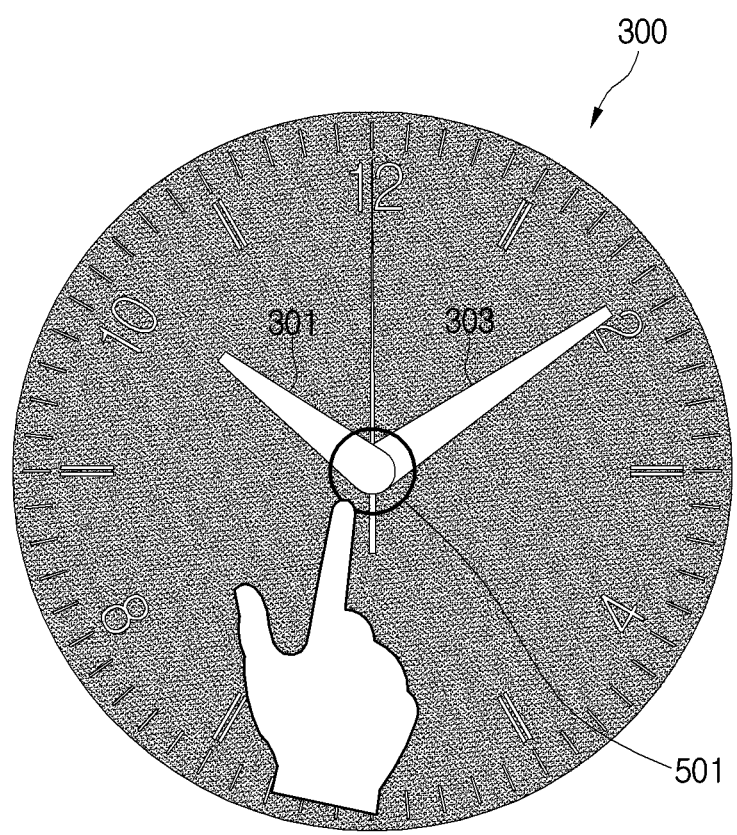
FIGS. 33a and 33b are screen shots showing a change from a standby screen to an ambient screen on which a quick call may be made.
Figure 33B:
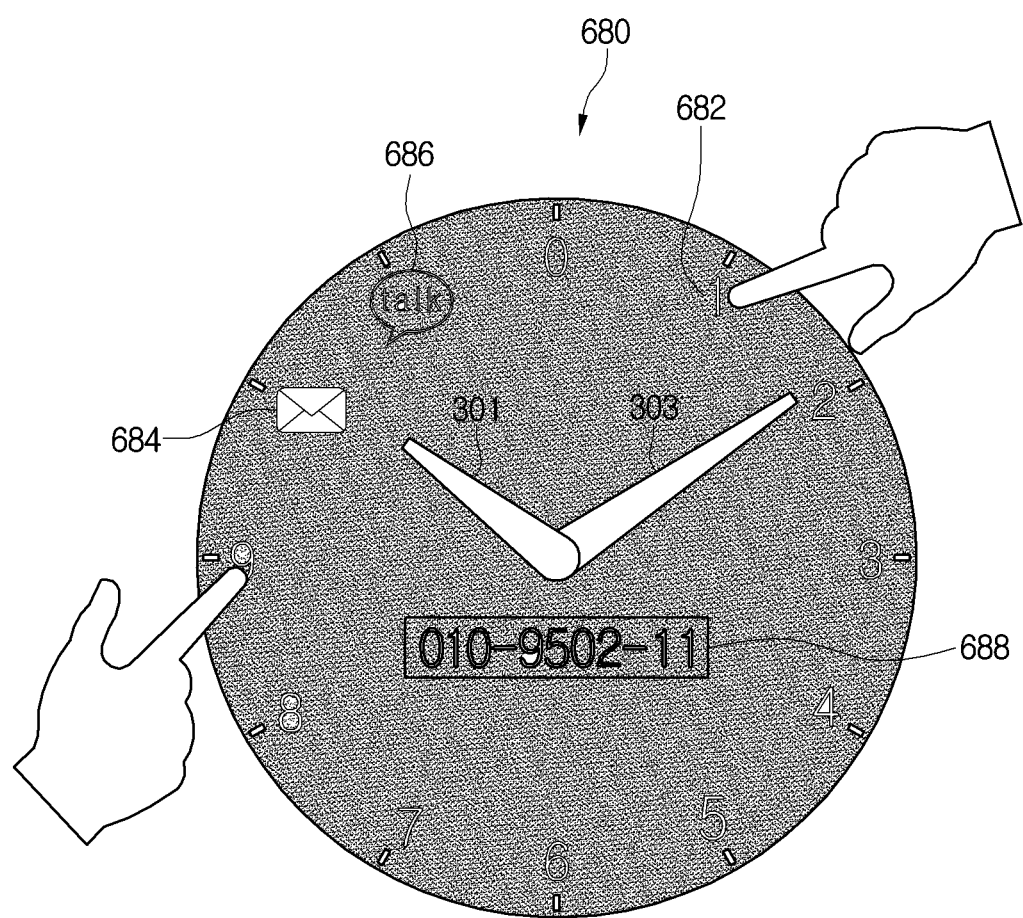

FIGS. 33a and 33b are screen shots showing a change from a standby screen to an ambient screen on which a quick call may be made.

As shown in FIG. 33a, a standby screen 300 may have an analog watch shape having an hour hand 301 and a minute hand 303.

The embodiment may not be limited to the standby screen 300 having such an analog watch shape but may also be equally applied to a standby screen having a digital watch shape.

A region at which the hour hand 301 and the minute hand 303 on the standby screen meet may be defined as a central region 501.

When a long touch operation is input to the central region 501 of the standby screen 300 or an operation of tapping the central region twice is input, the standby screen 300 may be changed to an ambient screen 680 and phone related information may be displayed on the ambient screen 680 as shown in FIG. 33b.

The phone related information may include number items 682 including "0" to "9", an text message item 684, and a social network message item 686, but the inventive concept is not limited thereto.

Each of items 682 to 686 may be performed by a touch operation.

These number items 682, the text message item 684, and the social network message item 686 may be disposed along the perimeter of the ambient screen 680. For example, remaining numbers excluding the number "0", i.e., the numbers "1" to "9" may correspond to numbers representing hours on a watch. The number "0" may correspond to the number "12" representing 12 o'clock on the watch.

In addition, input windows 688 may be displayed on the ambient screen 680. Numbers input by a user touch may be input to the input window 688.

For example, when touch operations on the numbers "0", "1", "0", "9", "5", "0", "2", "1", and "1" are sequentially input from a user, "010-9502-11" may be input to the input window 688.

As an example, when an operation of tapping the input window 688 twice is input from the user, a call signal may be transmitted to the other party having a phone number input to the input window 688.

As another example, when a long touch operation is input to the input window 688 from the user, a call signal may be transmitted to the other party having a phone number input to the input window 688.

As an example, an operation of tapping the text message item 684 twice or a long touch operation are input, the text message item 684 may be performed to display a text message window. When the other party's phone number and text messages are input to a corresponding text message window, the text messages may be transmitted to the other party.

As another example, in a case where the phone number of the other party to which text messages are transmitted is previously set and then the text message window is displayed with the phone number, the text message window may be displayed in a state in which the phone number of the other party has been input to the text message window.

As an example, an operation of tapping the social network message item 686 twice or a long touch operation are input, the social network message item 686 may be performed to display a social network message window. Before the social network message window is displayed, the phone number of the other party previously set may be set with the social network message window. Thus, it is possible to talk with the other party previously set through the social network message window, in real time.

FIGS. 34a to 34d are screen shots showing how to unlock a locked screen on an ambient screen having an analog watch shape.

Figure 34A:
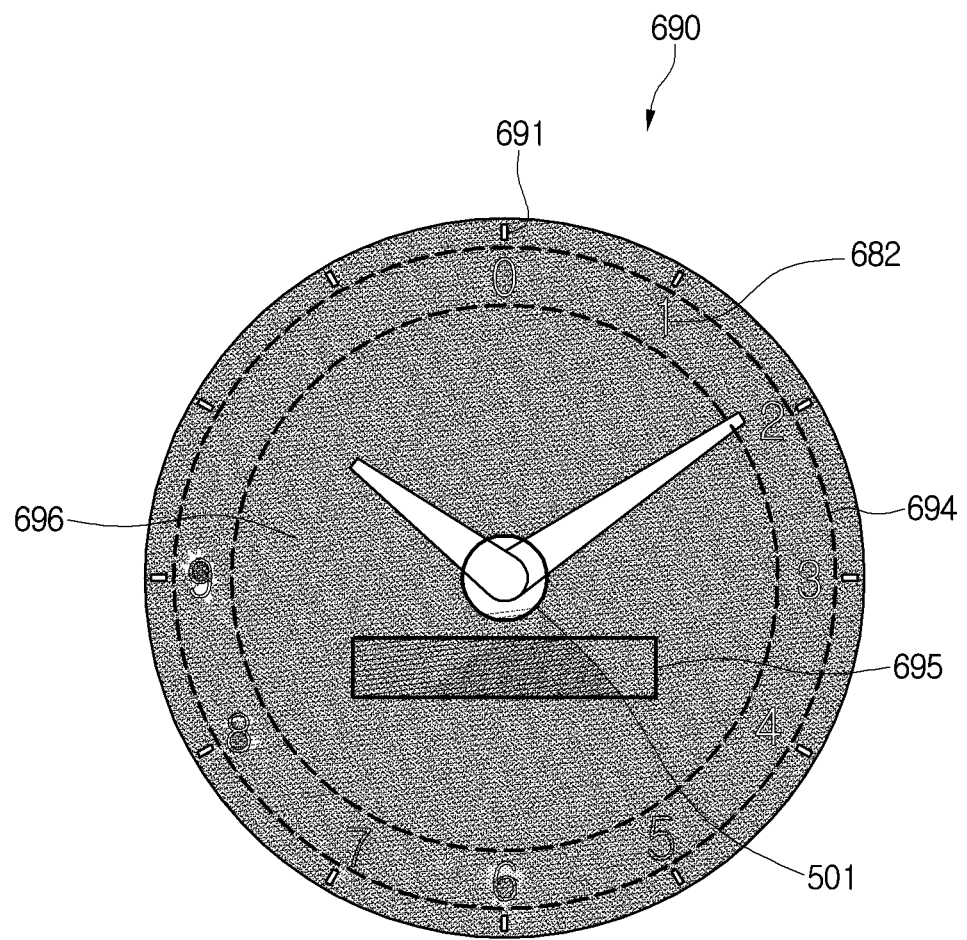
FIGS. 34a to 34d are screen shots showing how to unlock a locked screen on an ambient screen having an analog watch shape.

As shown in FIG. 34a, an analog watch shape may be displayed on an ambient screen 690.

The analog watch shape may include an hour hand, a minute hand, and scales 691 disposed along the perimeter of the ambient screen 690.

Scales 691 may represent hours. That is, scales 691 may represent the numbers 1 to 12.

There may be numbers 682 near the scales 691. The numbers 682 may represent hours.

When an operation of tapping a portion of the ambient screen 690 twice or a long touch operation is input, the number "12" is changed to the number "0" and the numbers "10" and "11" disappear.

Also, an edge region of the ambient screen 690 including the numbers "0" to "9" may be rotated clockwise or anticlockwise about the central region 501 at which an hour hand and a minute hand meet. On the contrary, a background region 696 and the scales 691 may be fixed.

Thus, edge region 694 may be rotated clockwise or anticlockwise about the fixed scales.

In addition, an input window 695 may be displayed on a portion of the background region 696. A hidden password, e.g., "*" may be input to the input window 695.

When an operation of touching the main point of the ambient screen 690 is input from a user and then a clockwise or anticlockwise rotation and sliding operation is input, the edge region 694 of the ambient region 690 may be rotated about the central region 501.

The rotation and sliding operation may last until a specific number matches a scale near the number "0". When the specific number matches the scale near the number "0", a match indication bar 693 may be displayed. A user may be easily aware through the match indication bar 693 that the specific number has been recognized by a control unit 180 for decryption.

As an example, when a touch operation and a rotation and sliding operation are input to the ambient region 690, particularly, two points of the edge region 694, the edge region 694 may be rotated about the central region 501.

For example, a touch operation and a rotation and sliding operation may be input to two points of the edge region 694 of the ambient screen 690 in order to match the number "3" with the scale near the number "0". Since the number "3" is located on the right side of the number "0", the rotation and sliding operation may be performed anticlockwise.

Figure 34B:
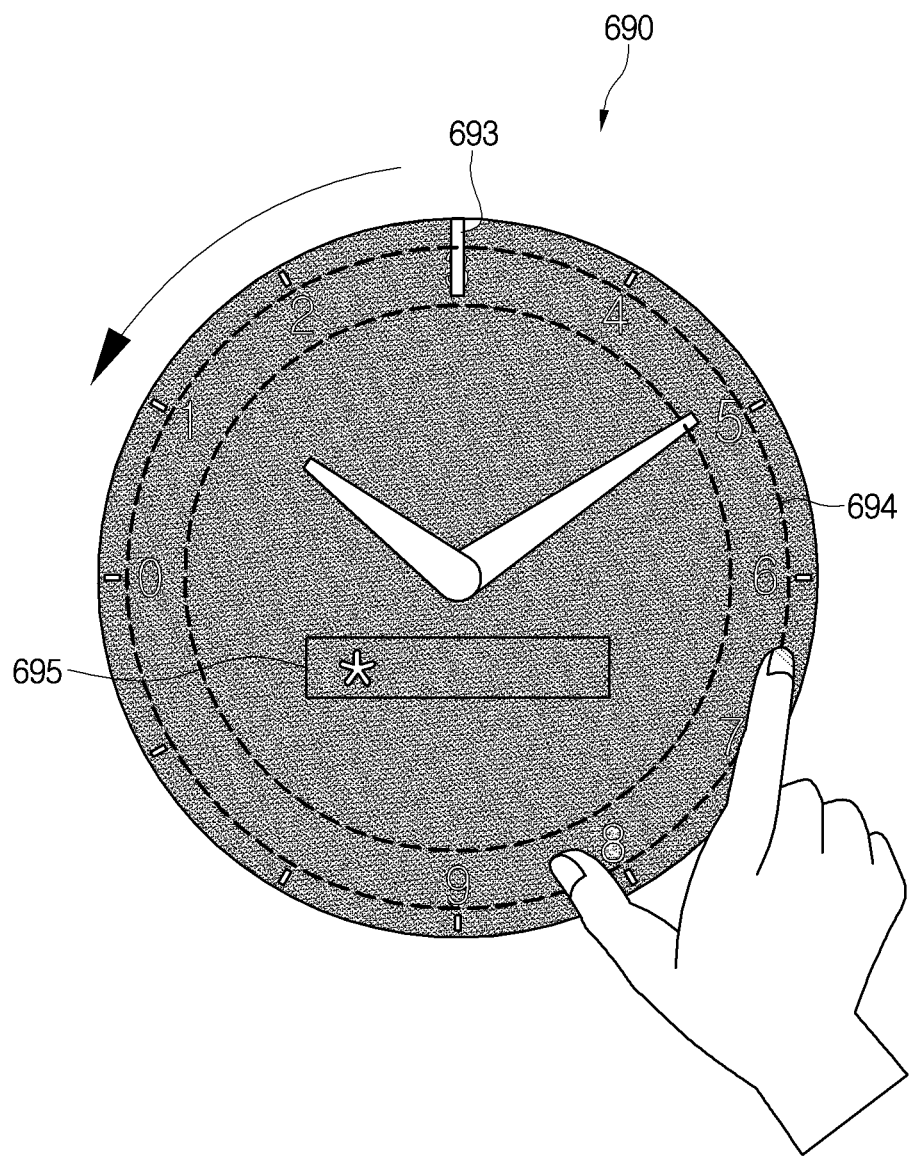

Thus, the scale near the number "0" may match and pass the number "1", then match and pass the number "2", and then match the number "3", as shown in FIG. 34b. When the number "3" matches the scale near the number "0", the match indication bar 693 at least having a larger size than the scale may be displayed. Through such a match indication bar 693, the rotation and sliding operation from a user may stop when the number "3" matches the scale near the number "0".

When the rotation and sliding operation stops, a hidden password (*) for the number "3" may be input to the input window 695.

For example, a touch operation and a rotation and sliding operation may be input to two points of the edge region 694 of the ambient screen 690 in order to match the number "8" with the scale near the number "0". Since the number "8" is located on the left side of the number "0", the rotation and sliding operation may be performed clockwise.

Figure 34C:
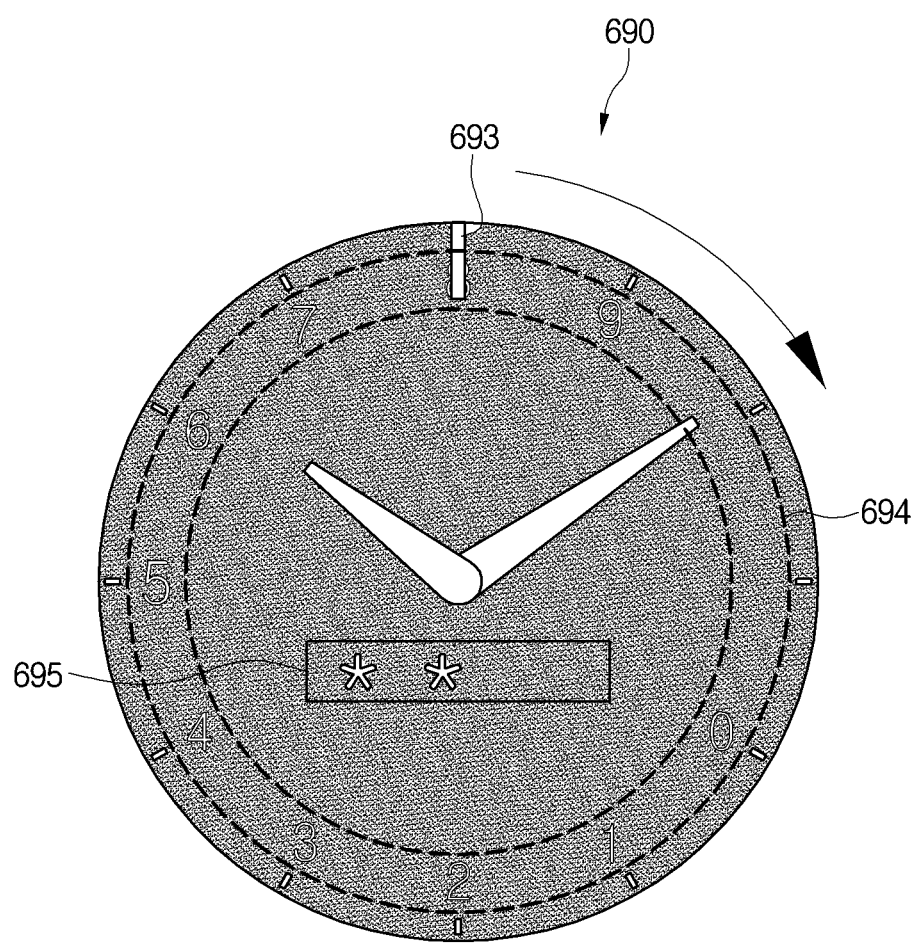

Thus, the scale near the number "0" may match and pass the number "9", and then match the number "8", as shown in FIG. 34c. When the number "8" matches the scale near the number "0", the match indication bar 693 at least having a larger size than the scale may be displayed. Through such a match indication bar 693, the rotation and sliding operation from a user may stop when the number "8" matches the scale near the number "0".

When the rotation and sliding operation stops, a hidden password (*) for the number "8" may be input to the input window 695.

Figure 34D:
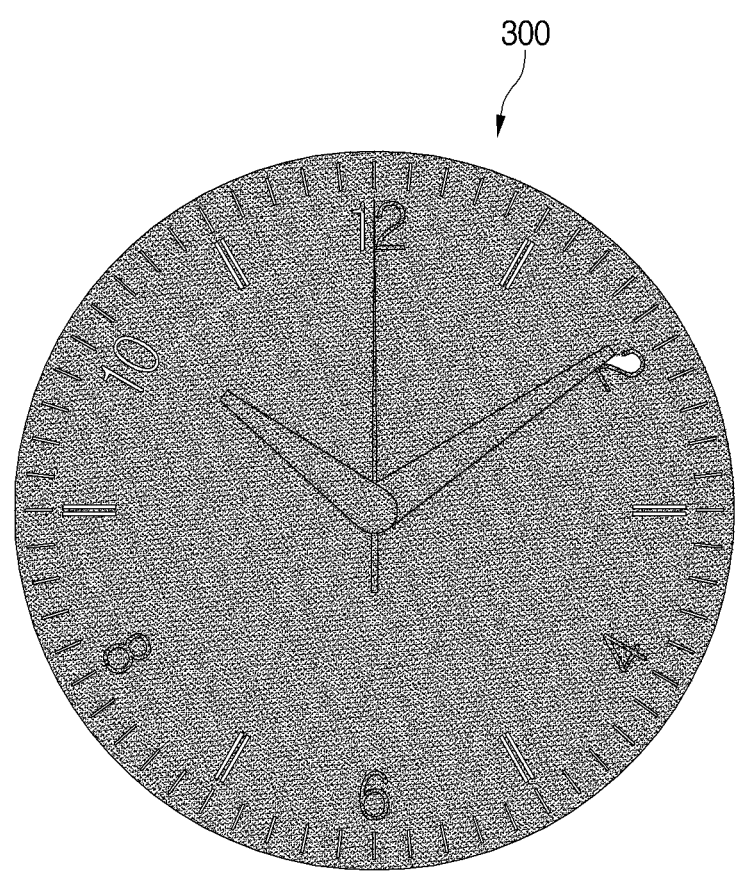

When a password having predetermined digits, e.g., four digits is input to the input window 695 in this way, the ambient screen 690 may be unlocked and changed to a standby screen 300, as shown in FIG. 34d. The standby screen 300 may include, but not be limited to, an analog watch shape, a digital watch shape or a home screen (wallpaper) including a plurality of executable items.

Figure 35A:
FIGS. 35a to 35c are other screen shots showing how to unlock a locked screen on an ambient screen having a digital watch shape.
Figure 35B:
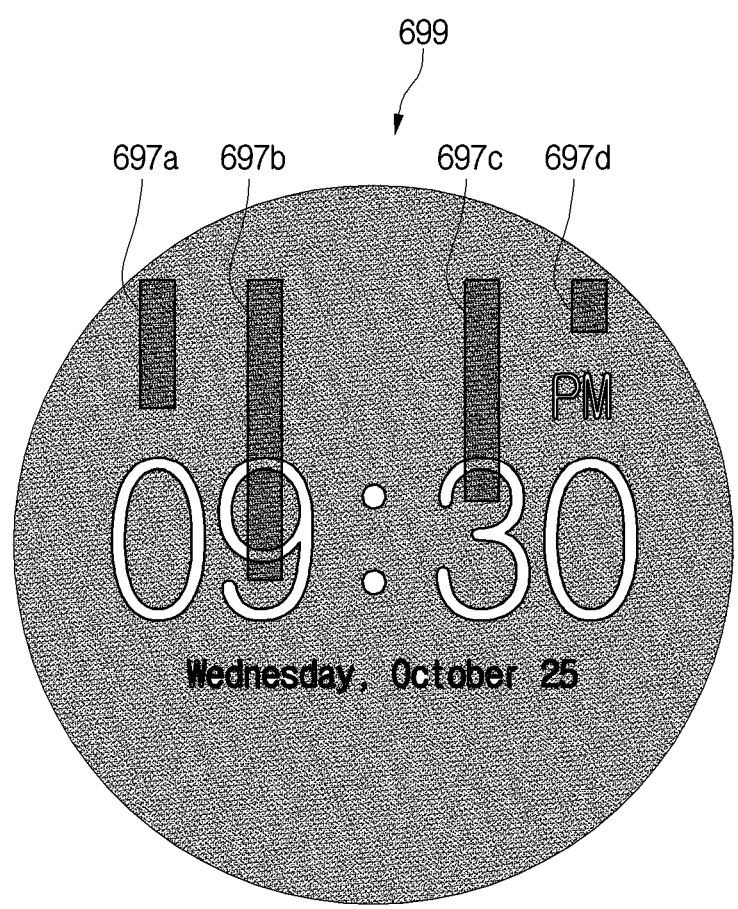
Figure 35C:
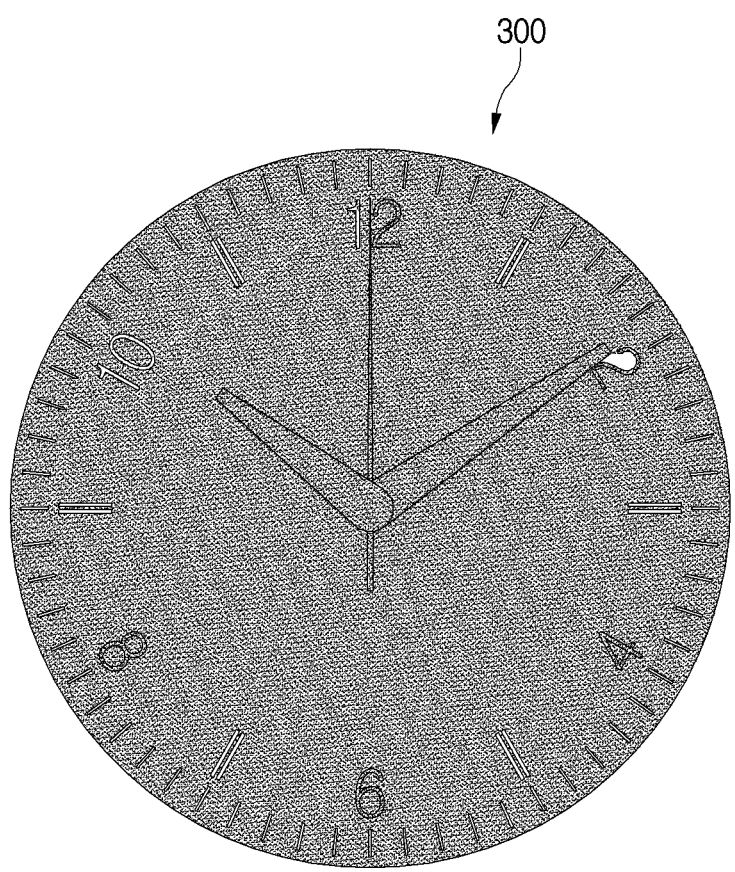

FIGS. 35a to 35c are other screen shots showing how to unlock a locked screen on an ambient screen having a digital watch shape.

As shown in FIG. 35a, a digital watch shape may be displayed on an ambient screen 699. The digital watch shape expresses both hour and minute with numbers.

When an operation of tapping a background screen 696 of the ambient screen 699 twice or a long touch operation are input, a touch screen 151 may be activated so that an operation for displaying number bars 697a to 697d, e.g., sliding and drop operations may be input, as shown in FIG. 35b.

When a sliding operation is input from a user in one direction, e.g., in a downward direction, a number may increase from "0" to "1" and so on according to the movement level of the sliding operation.

In this case, when a corresponding password number is "3", the number bar 697a corresponding to the numbers "5" and "1" may be displayed if a drop operation is input when the downward sliding operation becomes the number "3".

Likewise, the number bars 697b to 697d corresponding to the numbers "8", "5" and "1" may be displayed adjacent to the number bar corresponding to the number "3" according to the sliding and drop operations.

According to the size of each number of a password, the lengths of the number bars 697a to 697d are different from each other. For example, the lengths of the number bars 697a to 697d may increase with an increase in number, but the inventive concept is not limited thereto.

As shown in FIGS. 34a to 35c, when the ambient screen 699 is in a locked state, it is unlocked by the clockwise or anticlockwise rotation of the numbers of the ambient screen 699 to match a specific scale, and when the screen is unlocked, the ambient screen 699 may be changed to a standby screen 300.

FIGS. 36a to 39b show methods of changing a standby screen to an ambient screen by using a pinch-in touch operation.

Before describing the methods in FIGS. 36a to 39b, the pinch-in touch operation used herein is described with reference to FIG. 40.

Figure 40:
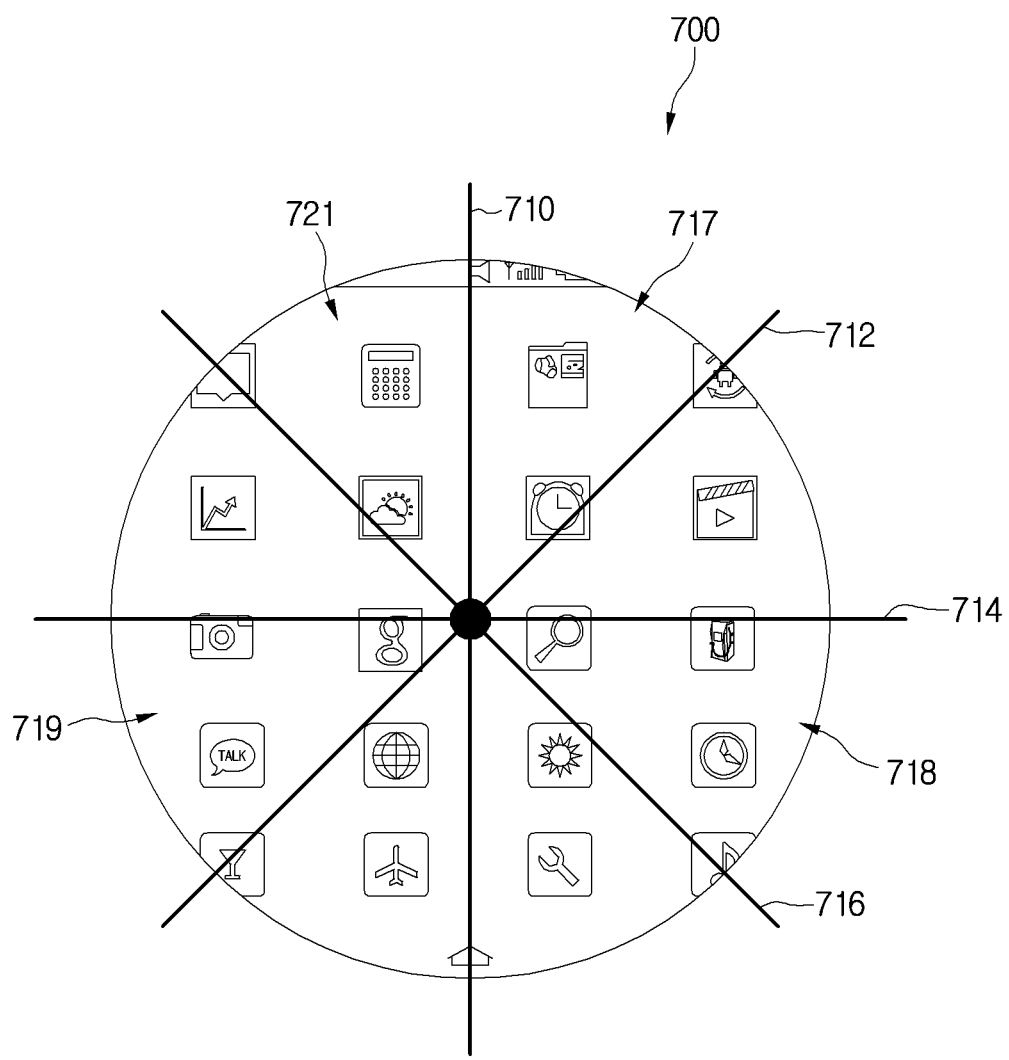
FIG. 40 is a screen shot showing different directions for performing a pinch-in touch operation on a standby screen.

As shown in FIG. 40, a standby screen 700 may be set so that the pinch-in touch operation is recognized in many directions. For example, a setting may be implemented on the standby screen 700 to enable a pinch-in touch operation in a vertical direction 710, a pinch-in touch operation in a horizontal direction 714, a pinch-in touch operation in a first diagonal direction 712, and a pinch-in touch operation in a second diagonal direction 716.

The first diagonal direction 712 may be a direction crossing a first region 717 and a third region 719. The first region 717 may be a region between 12 o'clock and 3 o'clock on an analog watch, and the third region 719 may be a region between 6 o'clock and 9 o'clock on the analog watch.

The second diagonal direction 716 may be a direction crossing a second region 718 and a fourth region 721. The second region 718 may be a region between 3 o'clock and 6 o'clock on an analog watch, and the fourth region 721 may be a region between 9 o'clock and 12 o'clock on the analog watch.

The definitions of the first to fourth regions 717 to 721 are not fixed and may be changed by a designer.

Figure 36A:
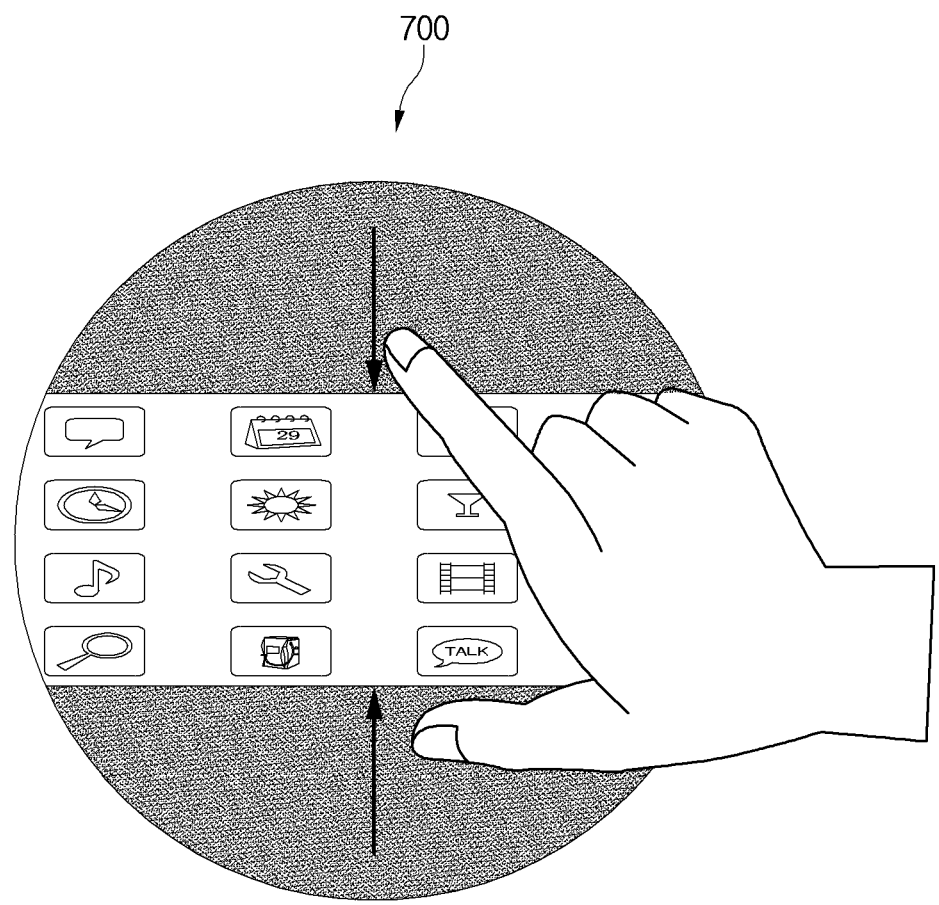
FIGS. 36a and 36b are first screen shots showing a change from a standby screen to an ambient screen by using a pinch-in touch operation.
Figure 36B:
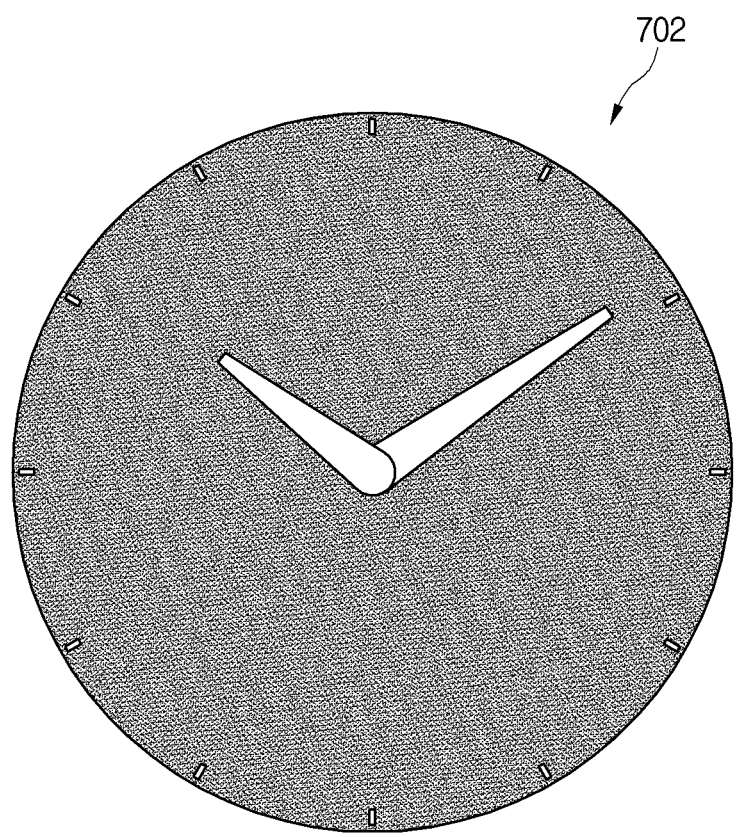

FIGS. 36a and 36b are first screen shots showing a change from a standby screen to an ambient screen using a pinch-in touch operation.

When as shown in FIG. 36a, a pinch-in touch operation is input in a vertical direction on a standby screen 700, the standby screen 700 may be changed to an ambient screen 702 including specific information as shown in FIG. 36b. The specific information may include e.g., an analog watch shape.

The pinch-in touch operation in the vertical direction 714 means that two points of the standby screen 700 at which fingers are in contact with the standby screen perform a pinch-in touch operation in a vertical direction.

Figure 37A:
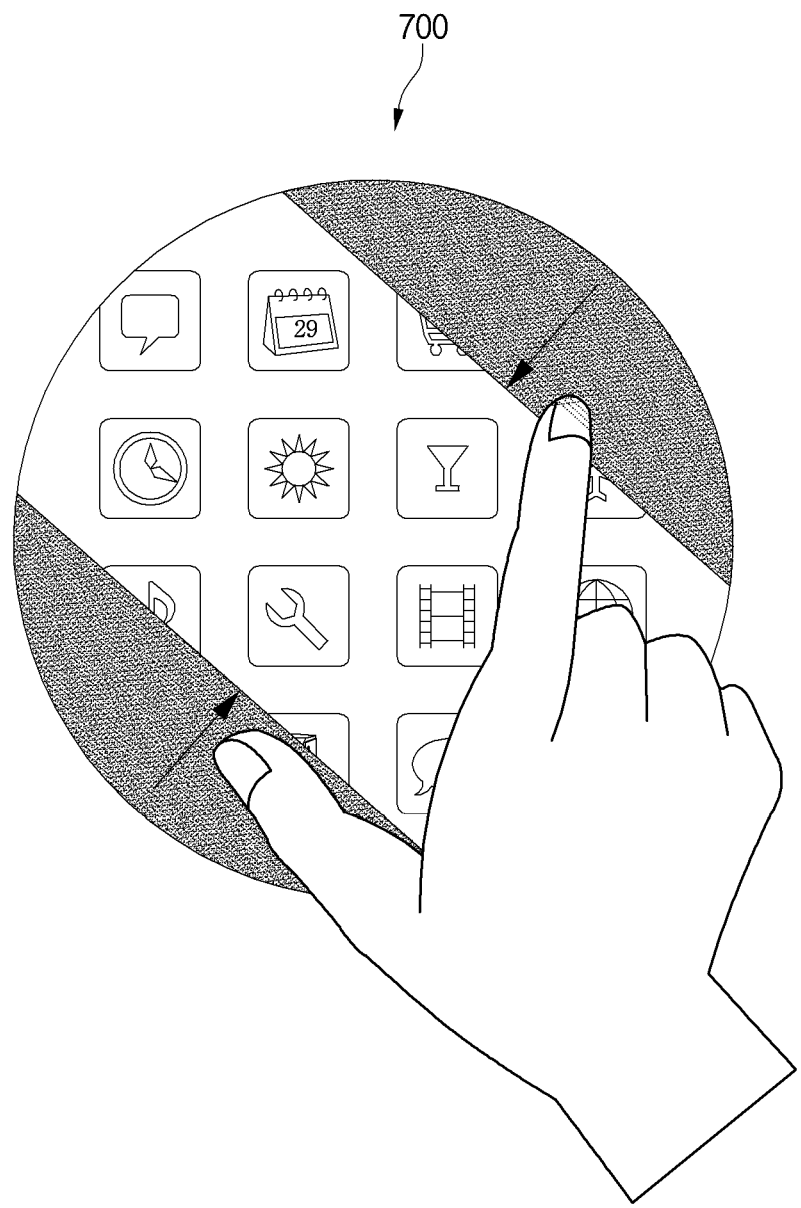
FIGS. 37a and 37b are second screen shots showing a change from a standby screen to an ambient screen by using a pinch-in touch operation.
Figure 37B:
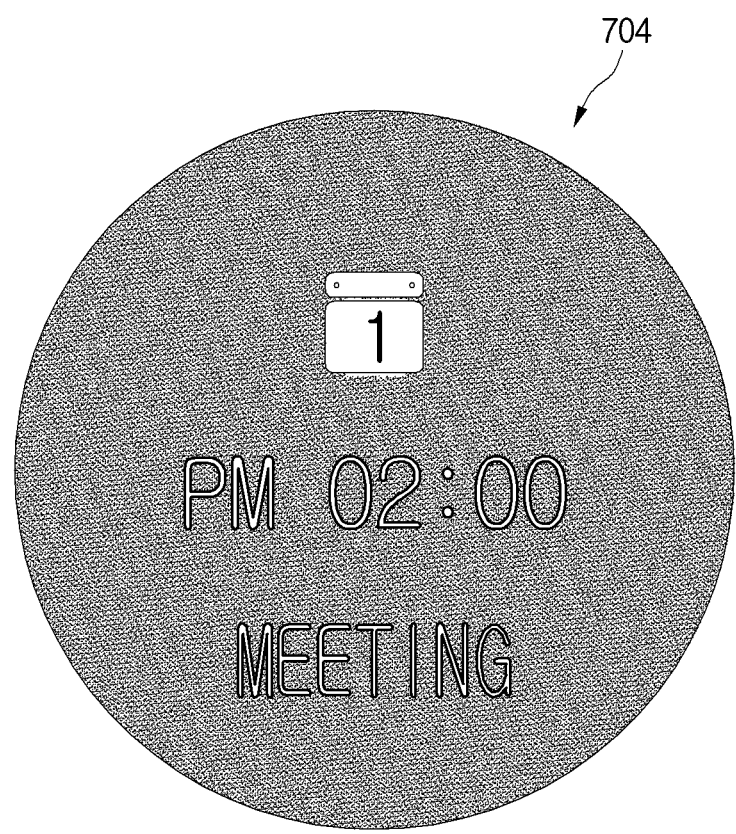

FIGS. 37a and 37b are second screen shots showing a change from a standby screen to an ambient screen using a pinch-in touch operation.

When as shown in FIG. 37a, a pinch-in touch operation is input in a first diagonal direction on a standby screen 700, the standby screen 700 may be changed to an ambient screen 704 including specific information as shown in FIG. 37b. The specific information may include e.g., plan information.

The pinch-in touch operation in the first diagonal direction 712 means that two points of the standby screen 700 at which fingers are in contact with the standby screen perform a pinch-in touch operation in a first diagonal direction.

The first diagonal direction 712 may be a direction crossing a first direction 717 between 12 o'clock and 3 o'clock on an analog watch and a third region 719 between 6 o'clock and 9 o'clock, as described above.

Figure 38A:
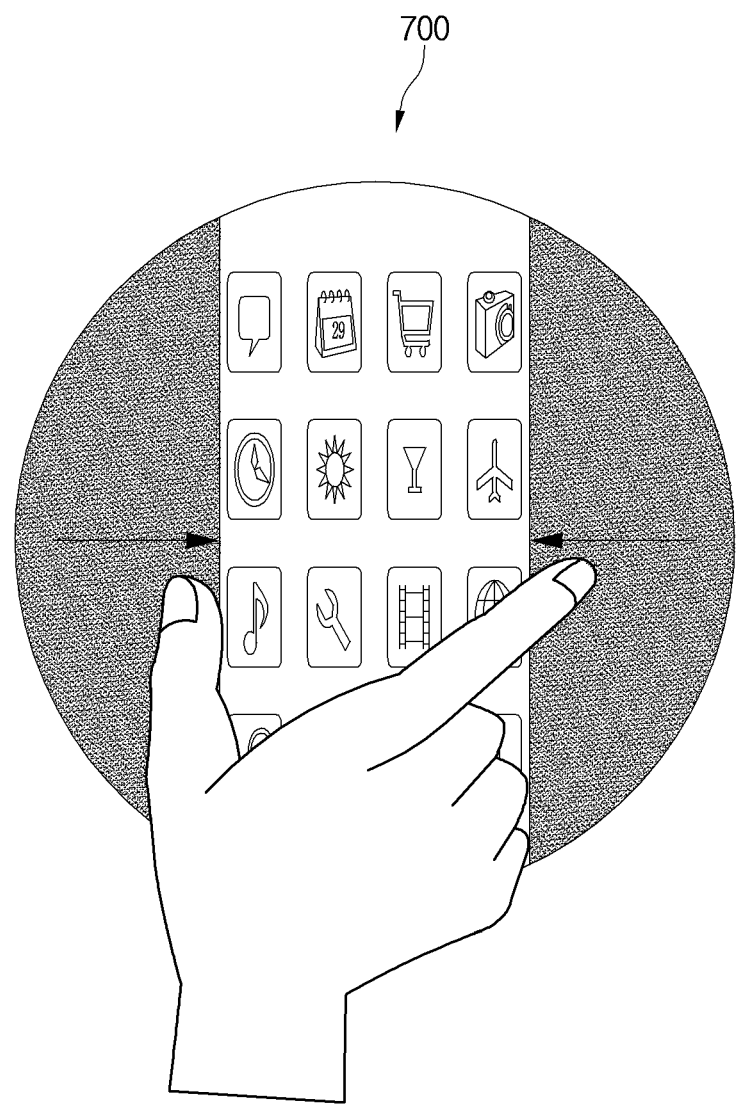
FIGS. 38a and 38b are third screen shots showing a change from a standby screen to an ambient screen by using a pinch-in touch operation.
Figure 38B:
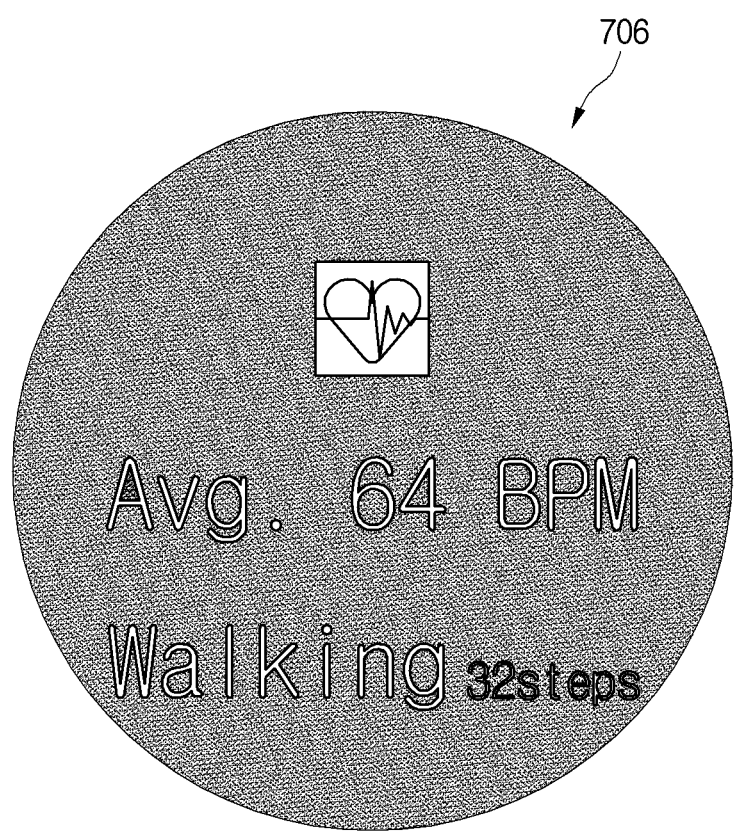

FIGS. 38a and 38b are third screen shots showing a change from a standby screen to an ambient screen using a pinch-in touch operation.

When as shown in FIG. 38a, a pinch-in touch operation is input in a horizontal direction 714 on a standby screen 700, the standby screen 700 may be changed to an ambient screen 706 including specific information as shown in FIG. 38b. The specific information may include e.g., health information.

The pinch-in touch operation in the vertical direction 714 means that two points of the standby screen 700 at which fingers are in contact with the standby screen perform a pinch-in touch operation in a horizontal direction.

Figure 39A:
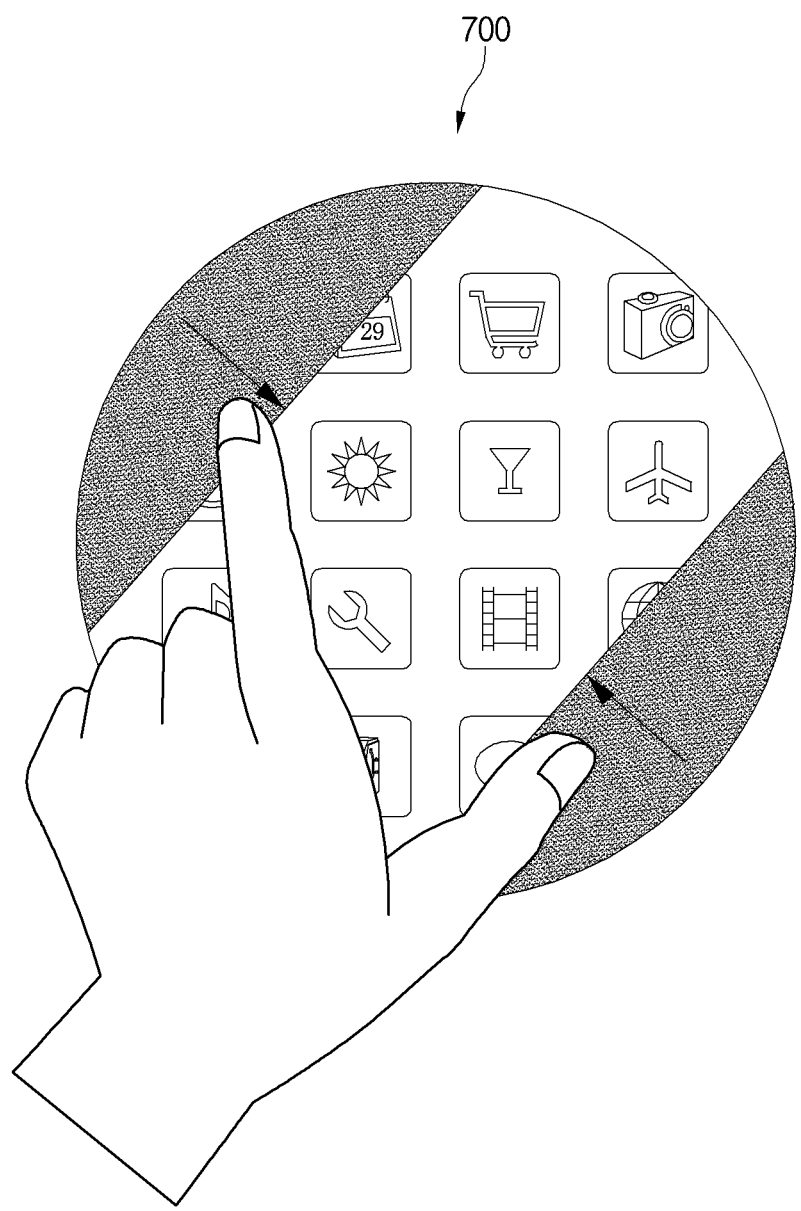
FIGS. 39a and 39b are fourth screen shots showing a change from a standby screen to an ambient screen by using a pinch-in touch operation.
Figure 39B:
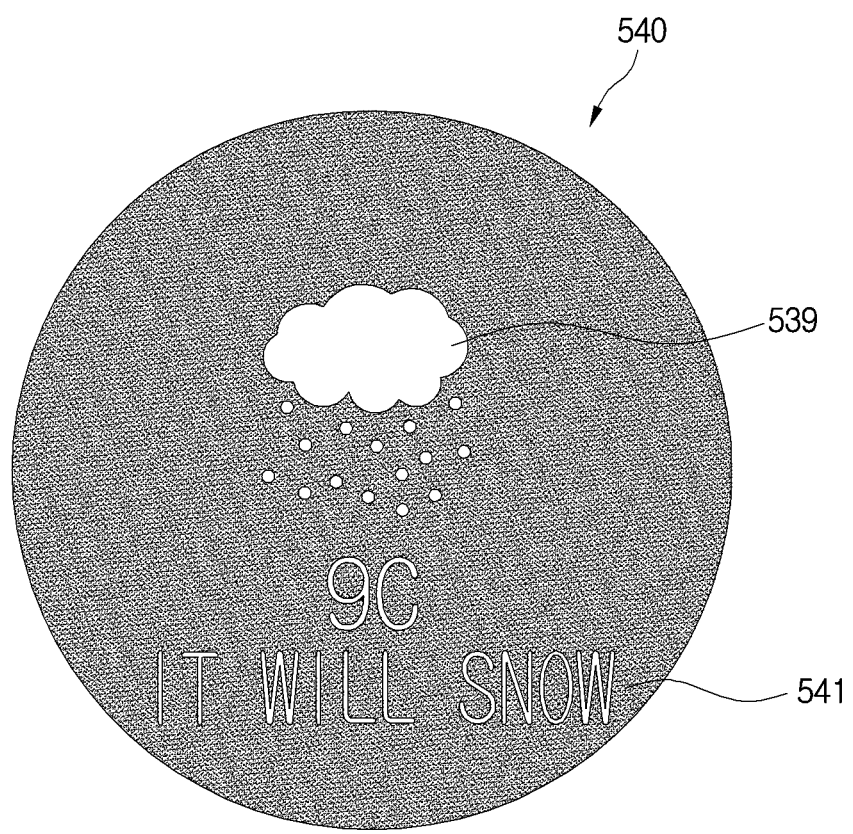

FIGS. 39a and 39b are fourth screen shots showing a change from a standby screen to an ambient screen using a pinch-in touch operation.

When as shown in FIG. 39a, a pinch-in touch operation is input in a second diagonal direction 716 on a standby screen 700, the standby screen 700 may be changed to an ambient screen 708 including specific information as shown in FIG. 39b. The specific information may include e.g., weather information.

The pinch-in touch operation in the second diagonal direction 716 means that two points of the standby screen 700 at which fingers are in contact with the standby screen perform a pinch-in touch operation in a second diagonal direction.

The second diagonal direction may be a direction crossing a second region between 3 o'clock and 6 o'clock on an analog watch and a fourth region between 9 o'clock and 12 o'clock, as described above.

Although the standby screen 700 in FIGS. 36a to 39b is shown as a home screen, it may also be a screen having an analog watch shape or showing other information in addition to the home screen.

FIGS. 41a to 42c show that different functions are implemented by using at least one divided region on a standby screen.

FIGS. 41a to 41f are screen shots showing a change from an ambient screen to another screen using divided regions.

Figure 41A:
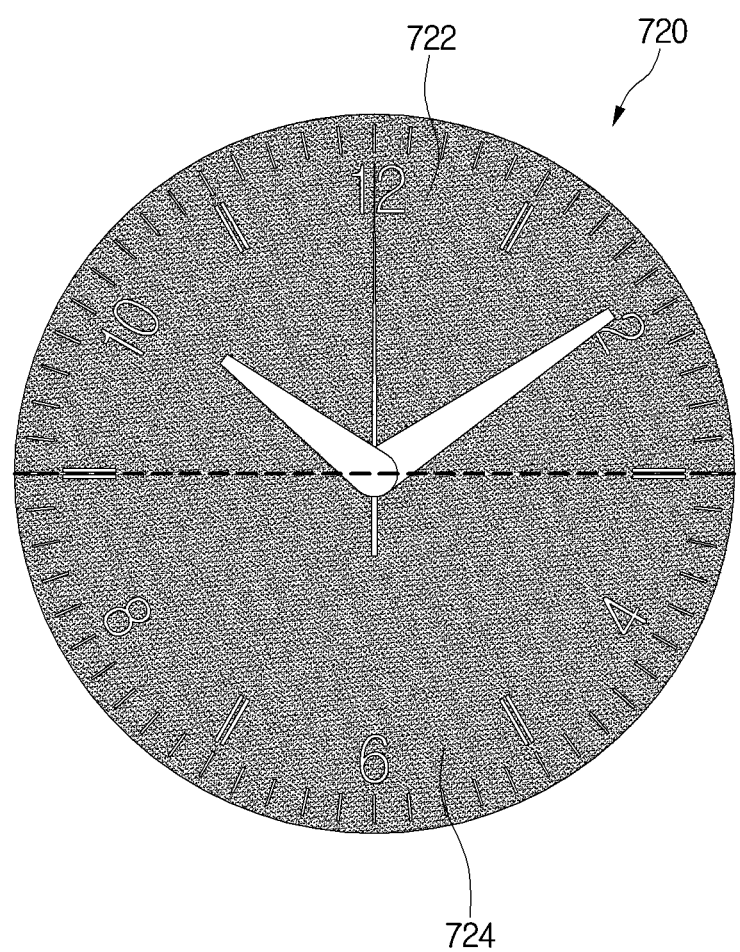
FIGS. 41a to 41f are screen shots showing a change from an ambient screen to another screen by using divided regions.

As shown in FIG. 41a, an ambient screen 720 (hereinafter, referred to as a first ambient screen) having an analog watch shape may include a first region 722 and a second region 724 that may sense touches. The first region 722 may be defined on the upper portion of the first ambient screen 720 and the second region 724 may be defined on the lower part of the first ambient screen 720, i.e., under the first region 722.

In this case, a first function may be performed by a touch operation on the first region 722 and a second function may be performed by a touch operation on the second region 724.

Figure 41B:
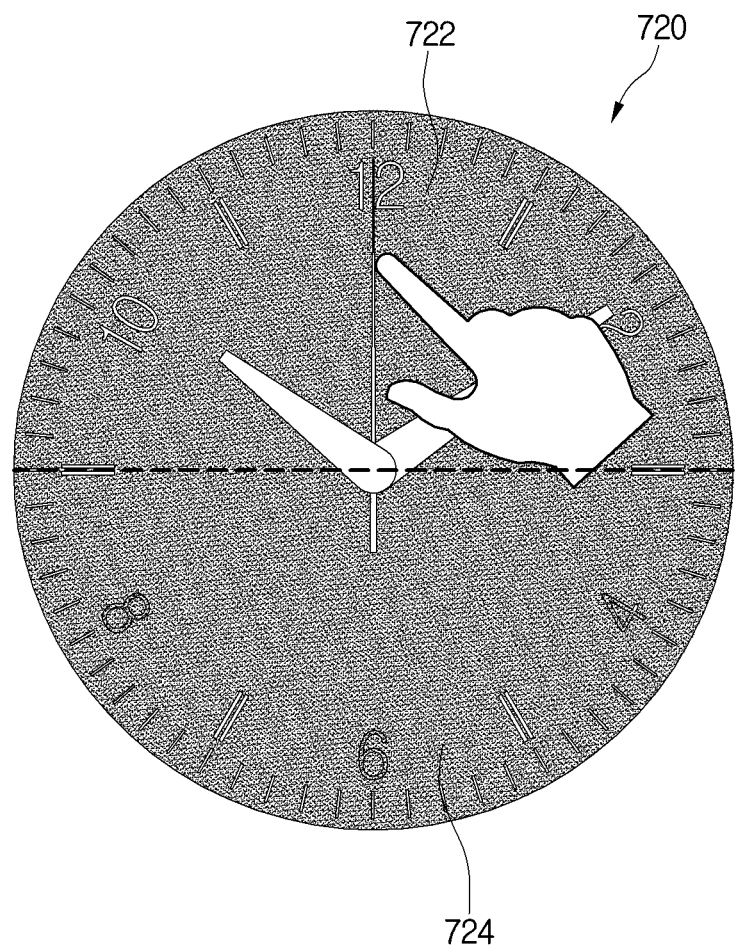

For example, when as shown in FIG. 41b, an operation of tapping the first region 722 of the first ambient screen 720 twice or a long touch operation are input, the first ambient screen may be sequentially changed to a plurality of ambient screens 726 to 732 representing different kinds of pieces of notification information as shown in FIGS. 41c to 41f.

Figure 41C:
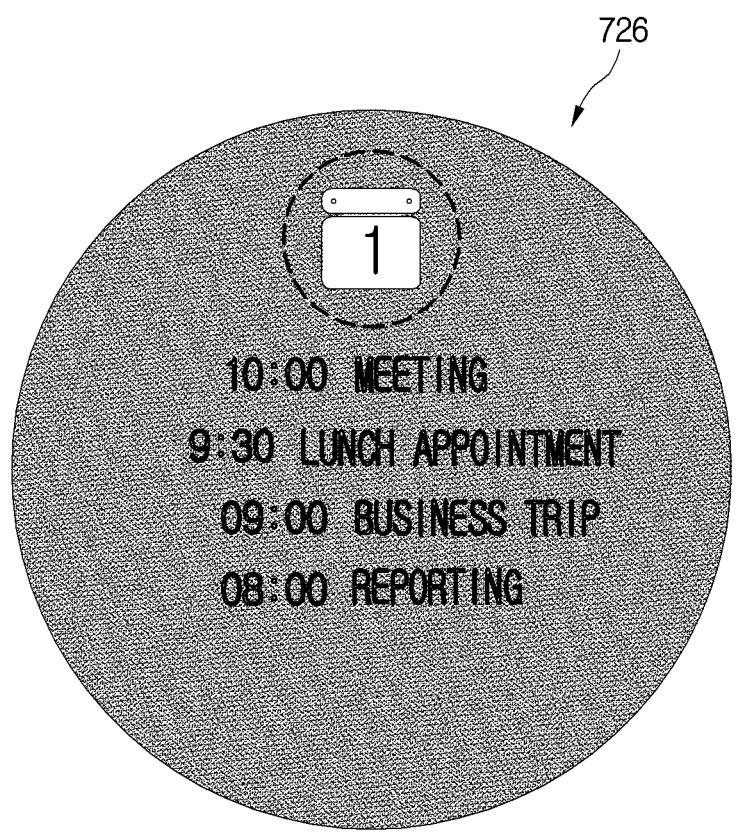

For example, when an operation of tapping the first region 722 of the ambient screen twice or a long touch operation is input, the second ambient screen 726 including plan information may be displayed as shown in FIG. 41c.

Figure 41D:
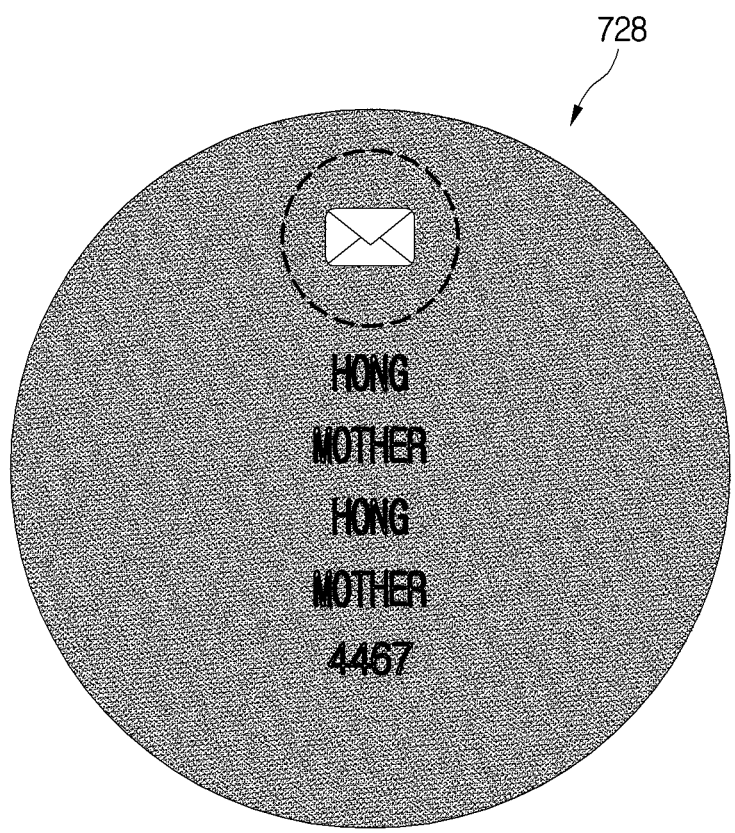

After a first time elapses, the third ambient screen 728 including text notification information may be displayed as shown in FIG. 41d.

Figure 41E:
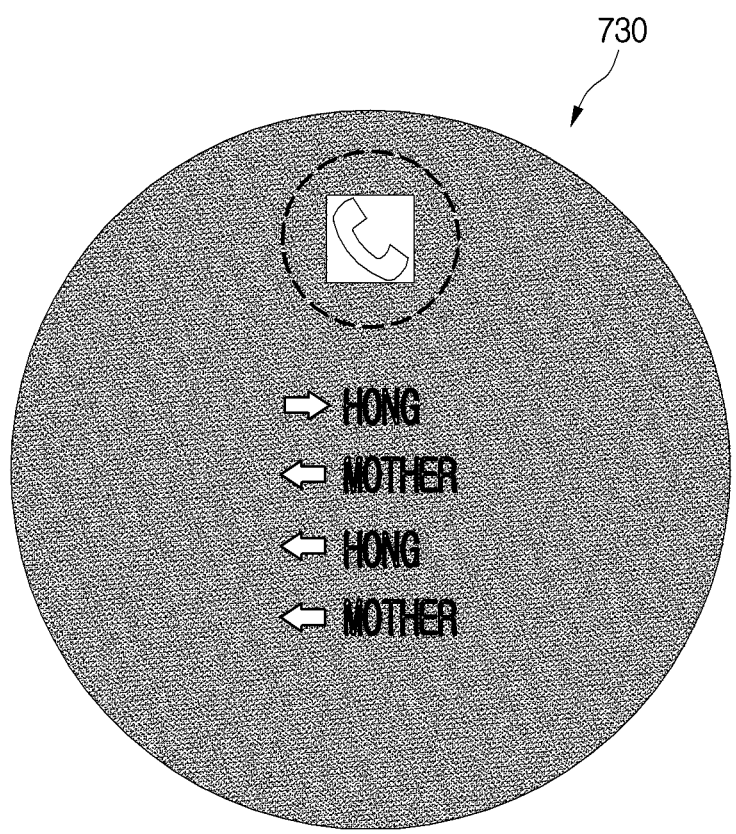

After a second time elapses, the fourth ambient screen 730 including call history information may be displayed as shown in FIG. 41e.

Figure 41F:
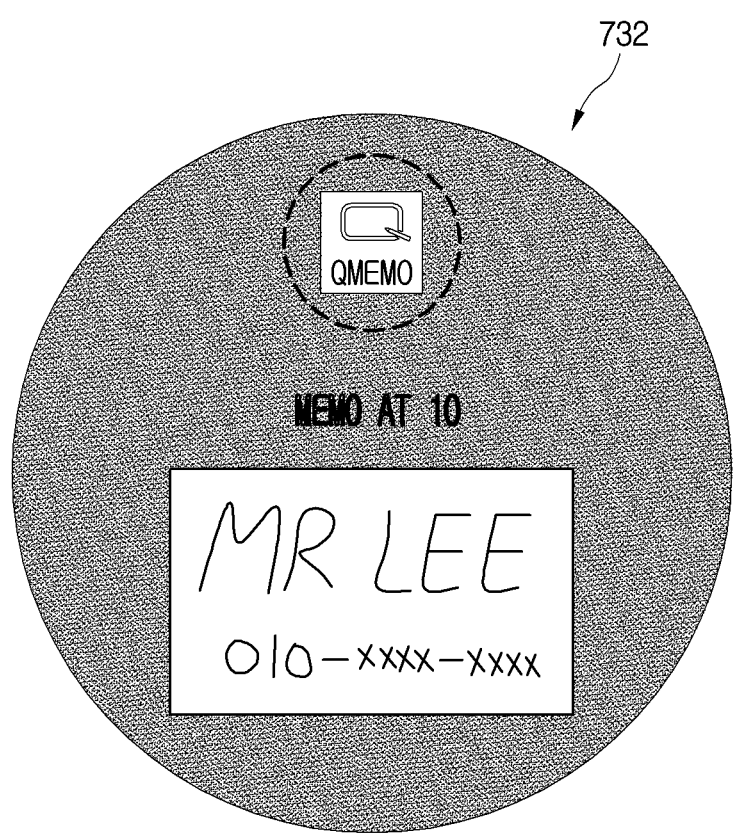

After a third time elapses, the fifth ambient screen 732 including quick memo information may be displayed as shown in FIG. 41f.

The quick memo may have a function of enabling a user to quickly enter a memo window and display handwritten letters as they are, but the inventive concept is not limited thereto.

The first to third time may be the same each other, but the inventive concept is not limited thereto. For example, each of the first to third time may be one second, but the inventive concept is not limited thereto.

If an operation of tapping the second ambient screen 726 twice or a long touch operation is input before a change to the third ambient screen 728, there is no change to the third ambient screen 728 because the second ambient screen 726 is maintained in a hold state.

If the operation of tapping the second ambient screen 726 twice or the long touch operation is again input, there may be a change to the third ambient screen 728. Subsequently, after the third time elapses, the third ambient screen 728 may be changed to the fourth ambient screen 730.

After the fifth ambient screen 732 is finally displayed, it may continue to be displayed irrespective of time or be changed to the ambient screen 720 having an analog watch shape in FIG. 41a or a standby screen 700 after time at least longer than the first to third time elapses, but the inventive concept is not limited thereto.

Figure 42A:
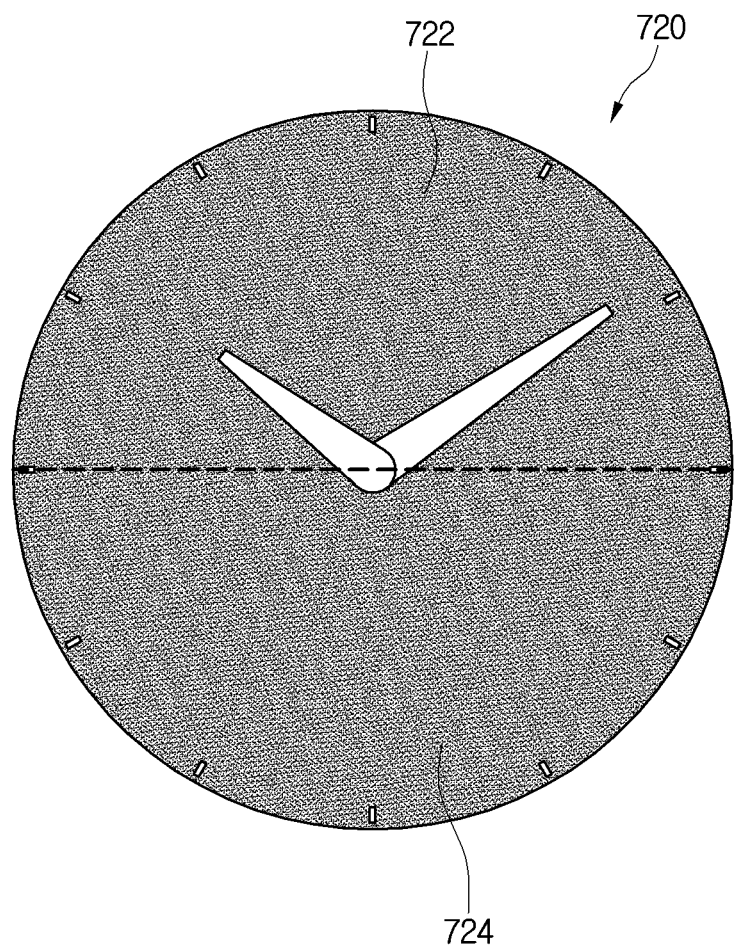
FIGS. 42a to 42c are other screen shots showing a change from an ambient screen to another screen by using divided regions.
Figure 42B:
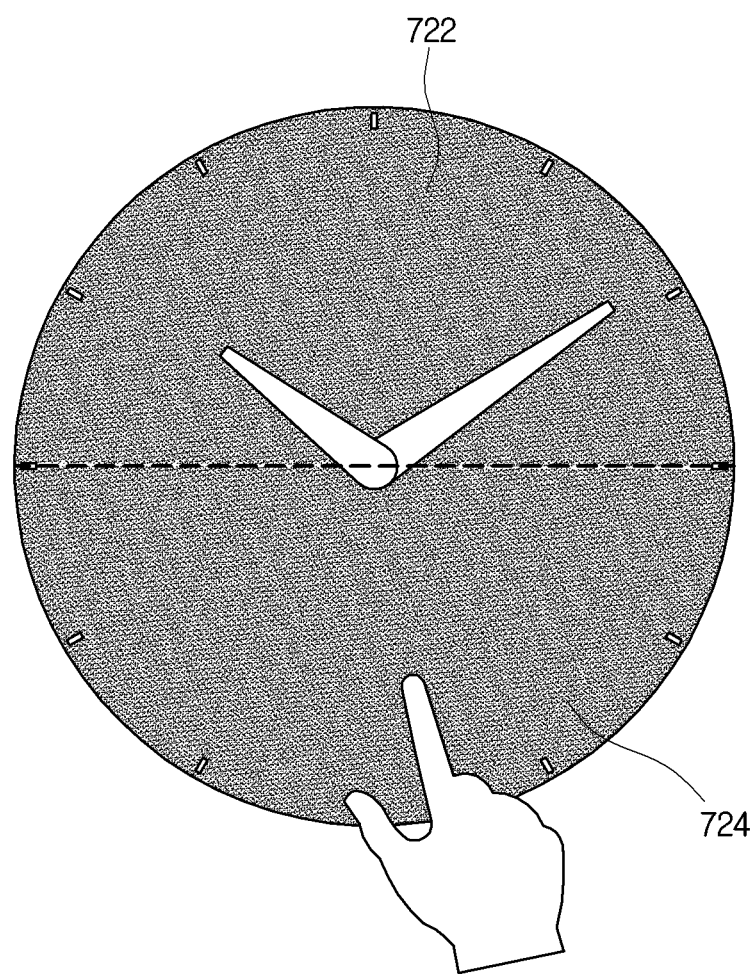
Figure 42C:
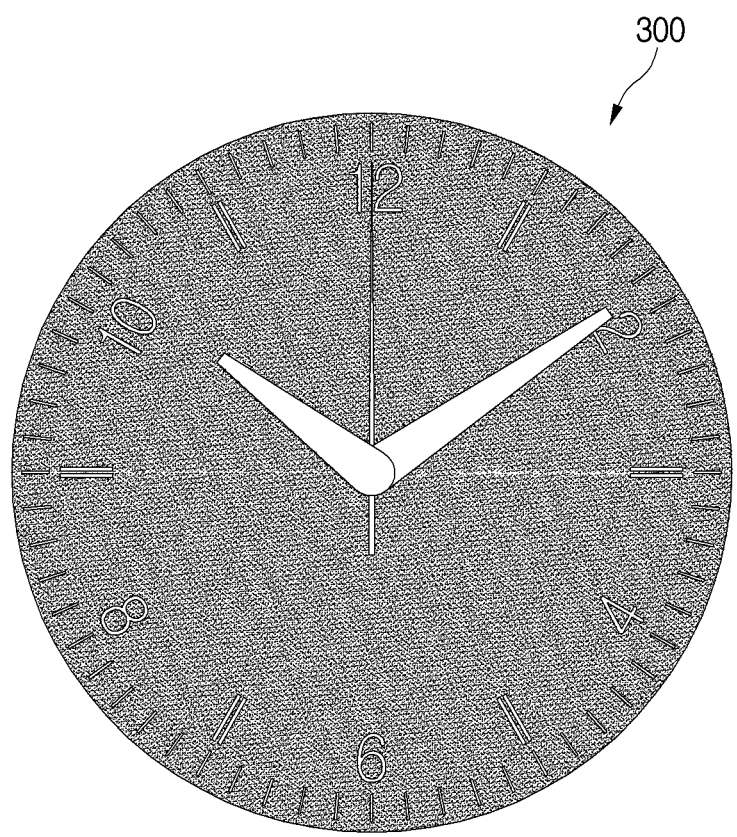

FIGS. 42a to 42c are other screen shots showing a change from an ambient screen to another screen by using divided regions.

FIG. 42a is the same as FIG. 41a. As shown in FIG. 42a, a first region 722 and a second region 724 may be defined on an ambient screen 720.

When as shown in FIG. 42b, an operation of tapping the second region 724 of the ambient screen twice or a long touch operation is input, the ambient screen 720 may be changed to a standby screen 300 as shown in FIG. 42c. Although FIG. 42c shows that the standby screen 300 has an analog watch shape, other information excluding the analog watch shape may also be displayed on the standby screen 300.

Figure 43:
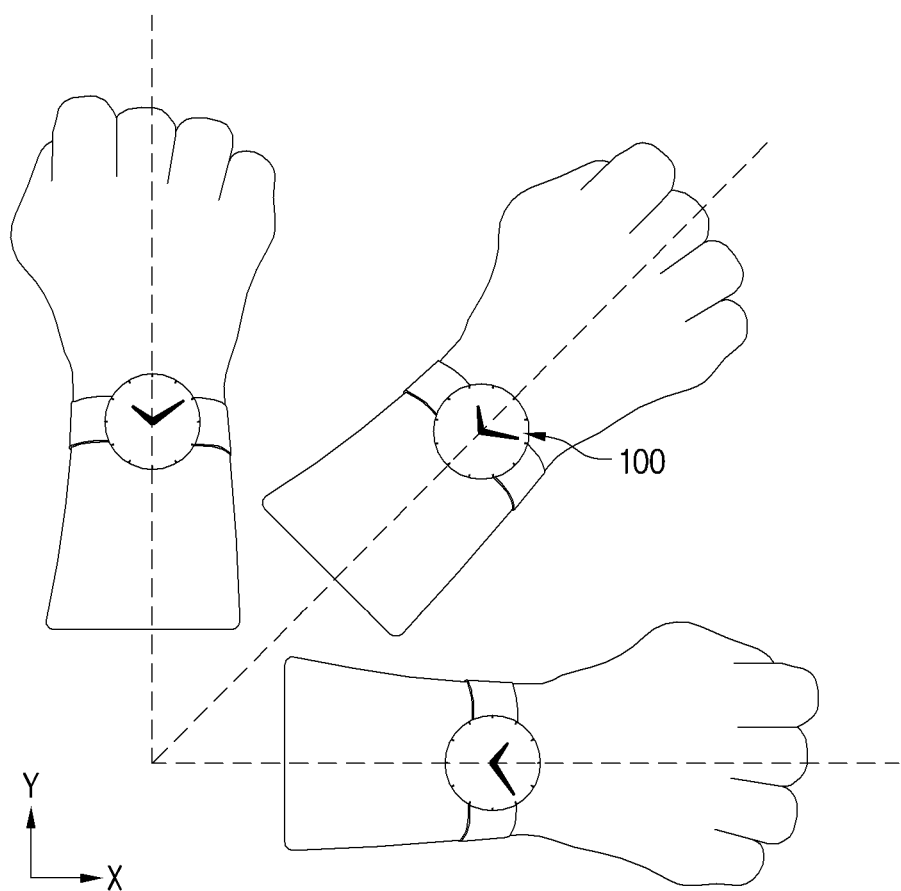
FIG. 43 is a screen shot on which an hour hand and a minute hand indicate constant directions irrespective of the rotation angle of an arm on a screen having an analog watch shape.

FIG. 43 is a screen shot on which an hour hand and a minute hand indicate constant directions irrespective of the rotation angle of an arm on a screen having an analog watch shape.

In order for the hour hand and the minute hand to indicate constant directions irrespective of a rotation angle at which an arm rotates horizontally, a compass sensor may be installed in a watch-type mobile terminal 100.

In a case where as shown in FIG. 43, e.g., the length direction of a user arm is located in the x-axis direction, when the hour hand and minute hand of a watch on a screen having a watch shape, e.g., a standby screen or an ambient screen indicate 10:10 based on the fact that the y-axis is 12 o'clock virtually, the watch on the screen may indicate 10:10 based on the fact that the y-axis is 12 o'clock virtually even when the length direction of the user arm is located in a diagonal direction or in the y-axis direction.

As such, since the hour and minute hands always indicate the same direction irrespective of the length direction of the user arm, it may be easier for a user to check time.

Figure 44A:
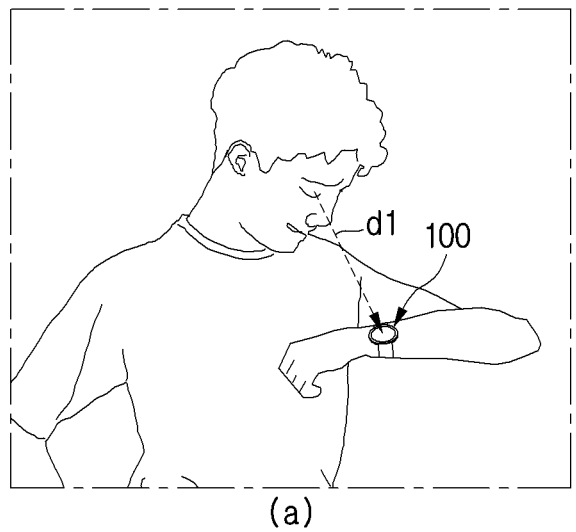
FIGS. 44a and 44b are screen shots showing how the size of information represented on a screen varies depending on the distance between a wrist wearing a watch-type mobile terminal and user's eyes.
Figure 44A:
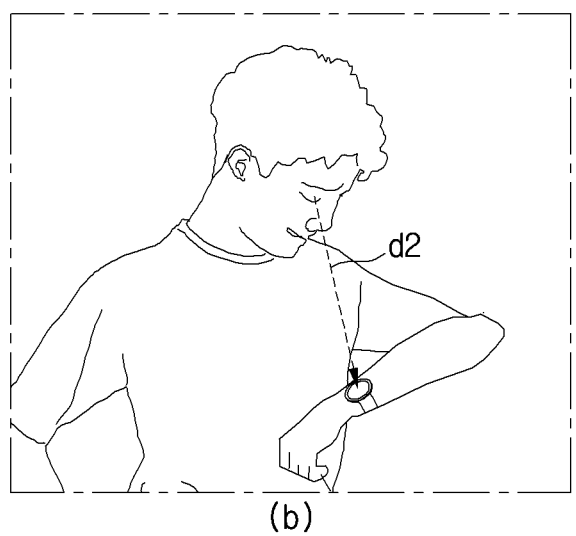
Figure 44B:
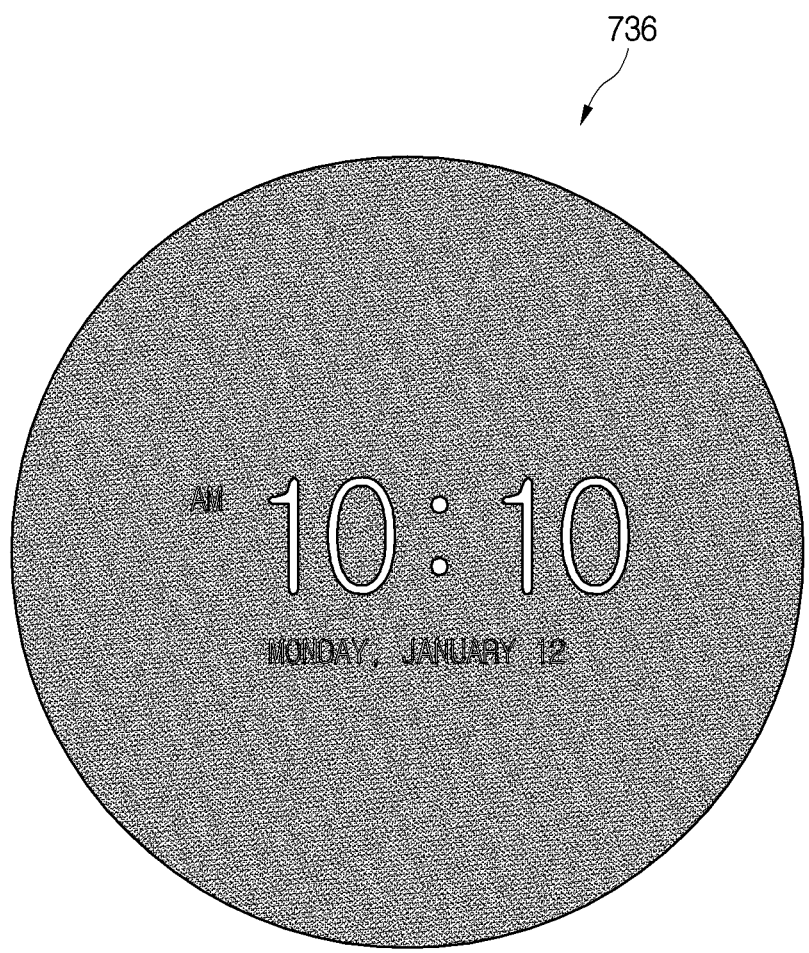

FIGS. 44a and 44b are screen shots showing how the size of information represented on a screen varies depending on the distance between a wrist wearing a watch-type mobile terminal and user's eyes.

A motion sensor may be installed in a watch0type mobile terminal 100 so that the size of information represented on the screen varies depending on the distance from the position of an arm to user's eyes.

For example, when as shown in FIG. 44a(a), the watch-type mobile terminal 100 is located at a location having the distance d1 from the user's eyes, information having a1 size may be included on a screen displayed on a touch screen 151 of the watch-type mobile terminal 100, e.g., an ambient screen, as shown in FIG. 44b.

On the other hand, when as shown in FIG. 44a(b), the watch-type mobile terminal 100 is located at a location having the distance d2 from the user's eyes, information having a2 size may be included on an ambient screen displayed on the touch screen 151.

In this example, the following expressions may be defined:

$d1 < d2$, and $a1 < a2$.

In short, as the watch-type mobile terminal 100 is away from the user's eyes, the size of information on the touch screen 151 may gradually increase.

The relationship between an increase in distance and an increase in size may also be a linearly proportional relationship or non-linearly proportional relationship. Since their relationship may be optimized by a designer, the inventive concept is not limited thereto.

FIGS. 45a to 45f are screen shots showing the pixel shift of information depending on the situation on a screen.

The inventive concept may solve pixel degradation. That is, an LCD device 317 (in FIG. 5) or OLED device 319 (in FIG. 6) may be used as a touch screen 151 of a watch-type mobile terminal 100, as described earlier.

Each pixel of the LCD device 317 or the OLED device 319 includes a plurality of transistors and power or data should be supplied to the touch screen 151 through a corresponding transistor in order to display information having white graylevel on the touch screen 151. A corresponding transistor should always be turned on so that the information having white graylevel continues to be displayed on the touch screen 151, and to this end, high-level power should always be applied to the gate of the transistor. Due to a long-time application of the high-level power, the corresponding transistor suffers from stress, which may lead to degradation that shifts the threshold voltage of the corresponding transistor.

Figure 45A:
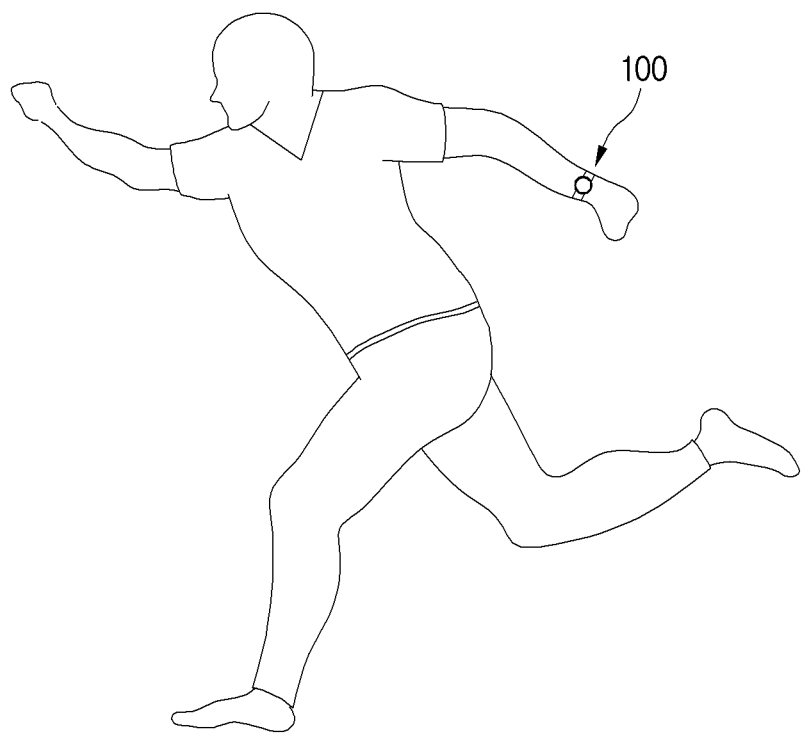
FIGS. 45a to 45g are screen shots showing the pixel shift of information depending on the situation on a screen.
Figure 45B:
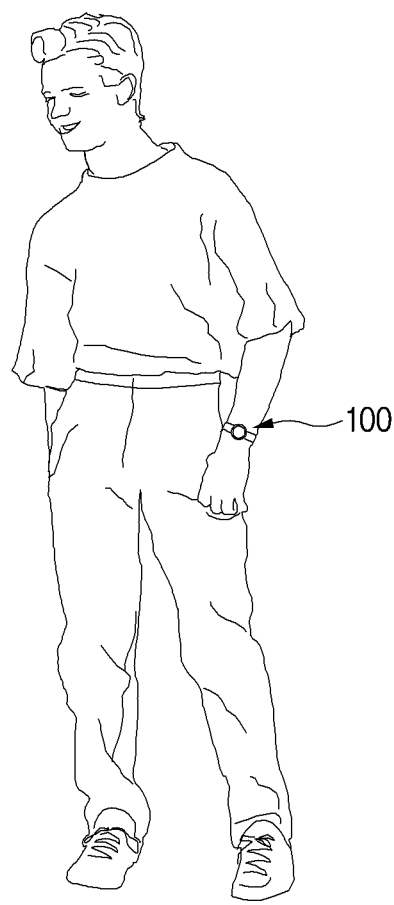
Figure 45C:
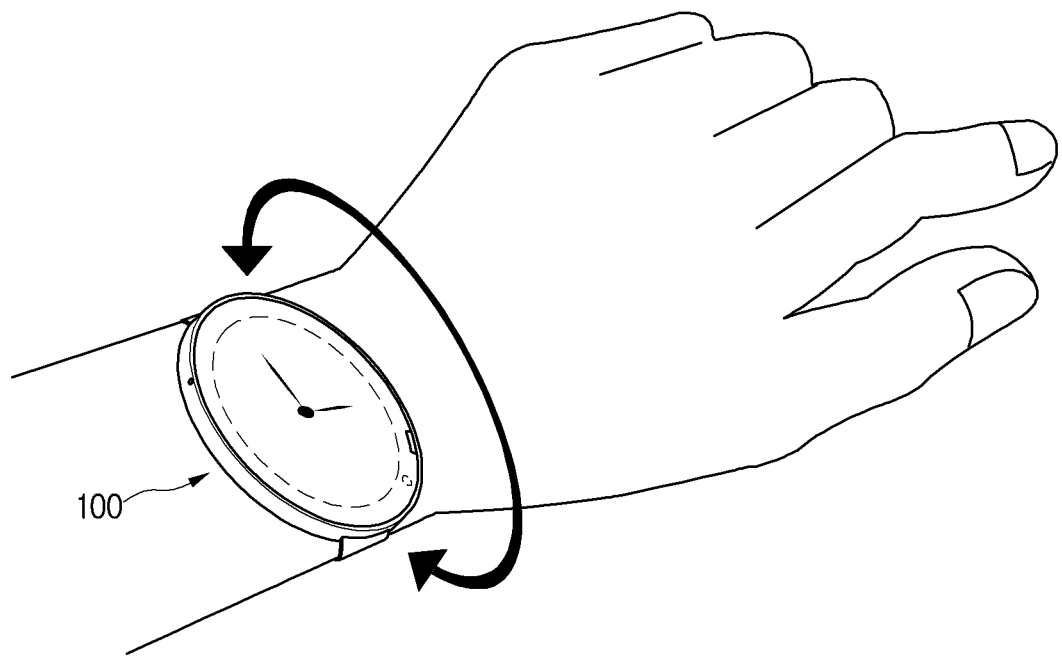
Figure 45D:
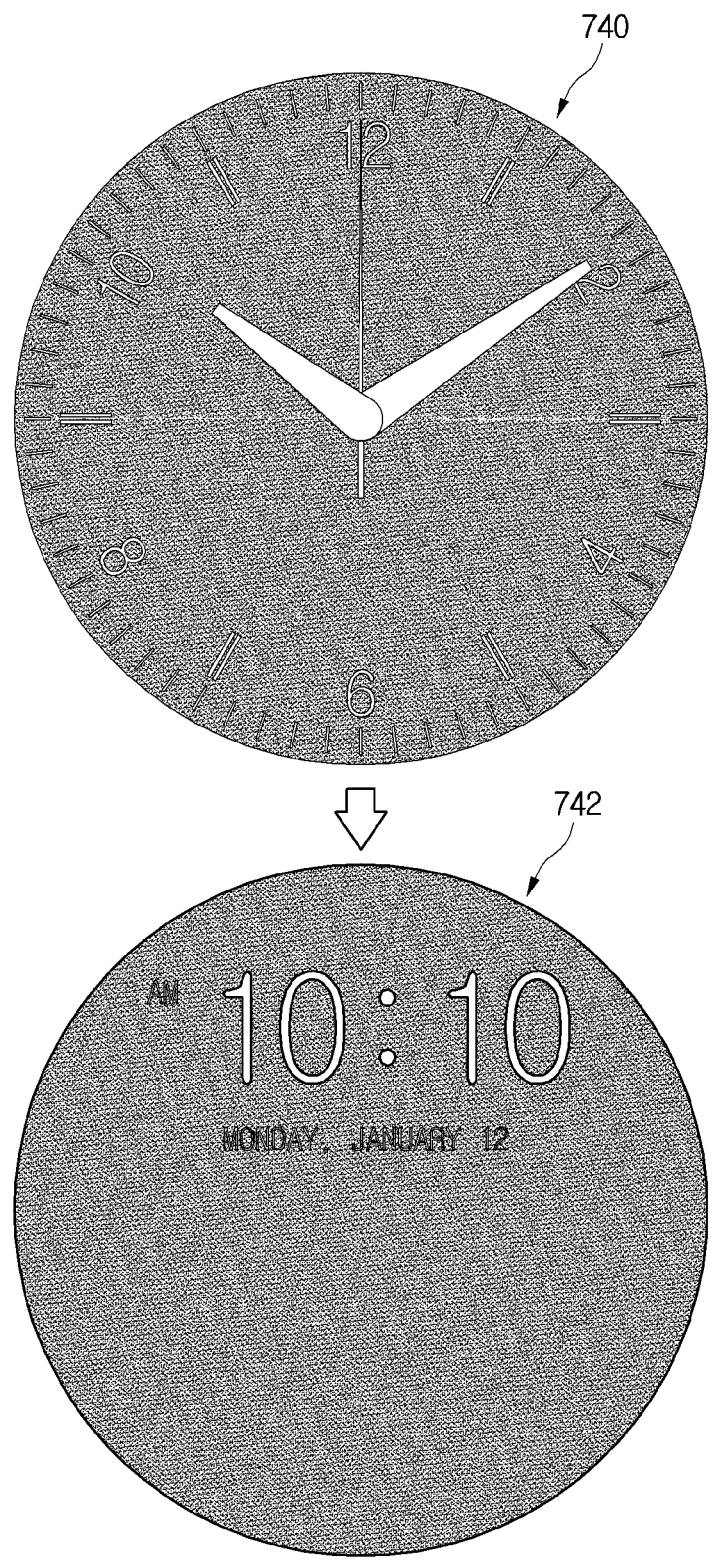
Figure 45E:
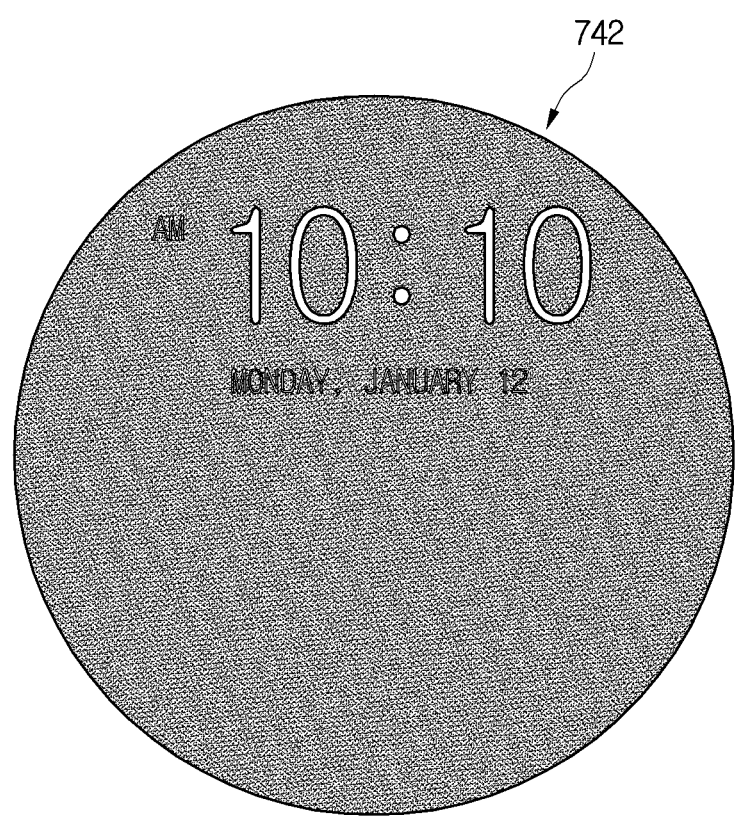
Figure 45F:
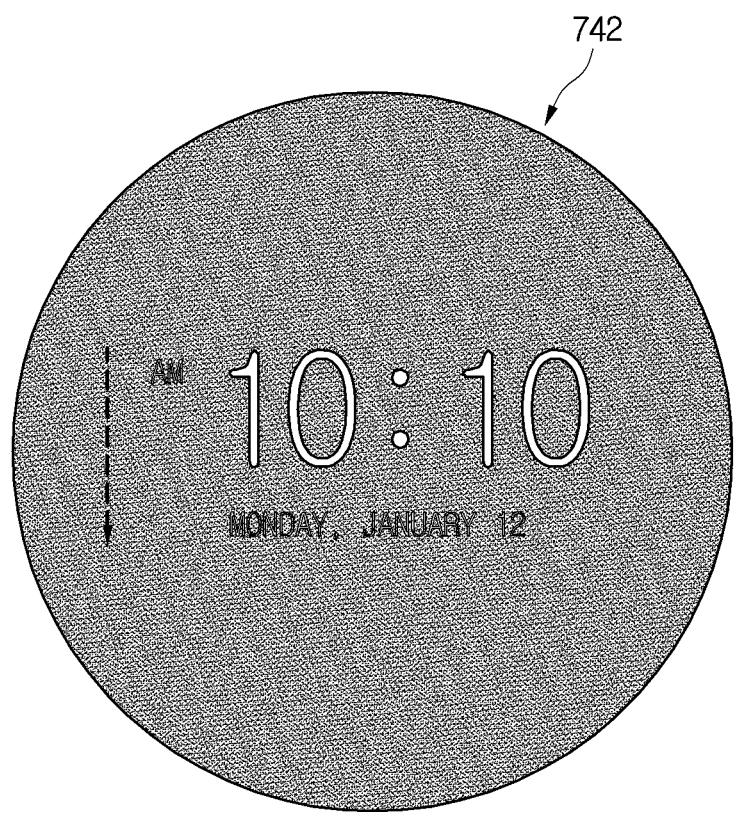
Figure 45G:
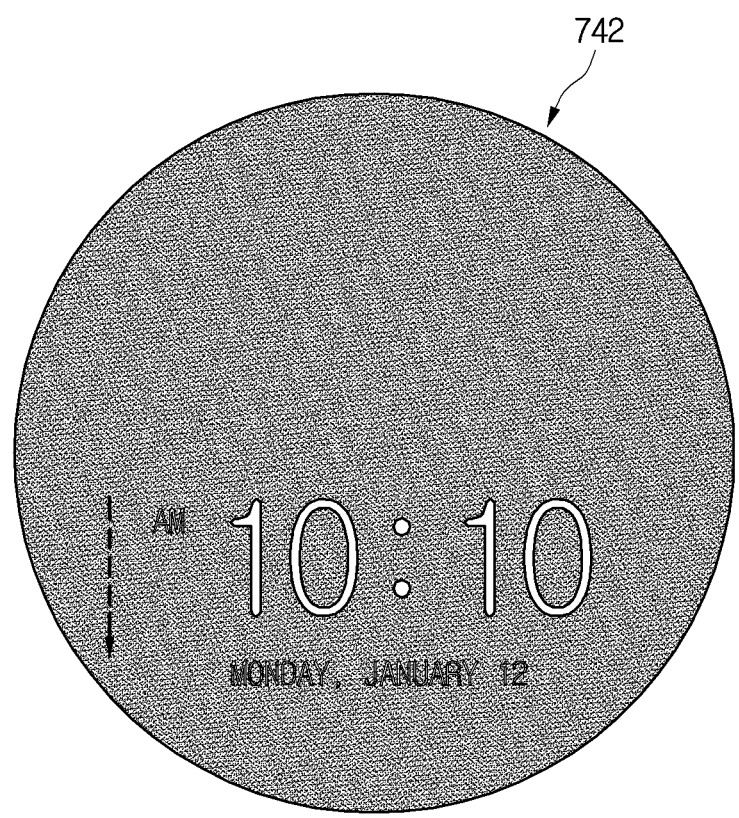

In order to solve the degradation, information may be pixel-shifted in one direction as shown in FIGS. 45e to 45g.

That is, when a user's running operation is sensed by a motion sensor installed in a watch-type mobile terminal 100 as shown in FIG. 45a, the position of an arm is sensed by the motion sensor installed in the watch-type mobile terminal 100 as shown in FIG. 45b, a user wrist is shaken clockwise or anticlockwise as shown in FIG. 45c, or there is a change from a standby screen to an ambient screen as shown in FIG. 45d, digital watch information may be shifted in one direction, e.g., in a downward direction as shown in FIGS. 45e to 45g.

FIG. 45b shows when a user hand faces downwards, thus the watch axis of the watch-type mobile terminal worn on the user wrist faces downwards and there is no motion.

In particular, watch information may be located on the upper portion of the ambient screen as shown in FIG. 45e.

The watch information may be shifted to the central portion of the ambient screen as shown in FIG. 45f.

The watch information may be located on the lower portion of the ambient screen as shown in FIG. 45g.

After the watch information is located on the lower portion of the ambient screen as shown in FIG. 45g, the watch information may be repetitively shifted to the upper portion, central portion and lower portion of the ambient screen, though not shown.

As such, since the watch information is repetitively shifted downwards, power supplied in order to display the watch information does not continue to be supplied only to a specific pixel but is sequentially supplied to other pixels in a downward direction on the ambient screen, so it is possible to prevent the touch screen 151 from becoming degraded.

FIGS. 45a to 45g show pixel shift on an ambient screen having a digital watch shape.

Figure 46:
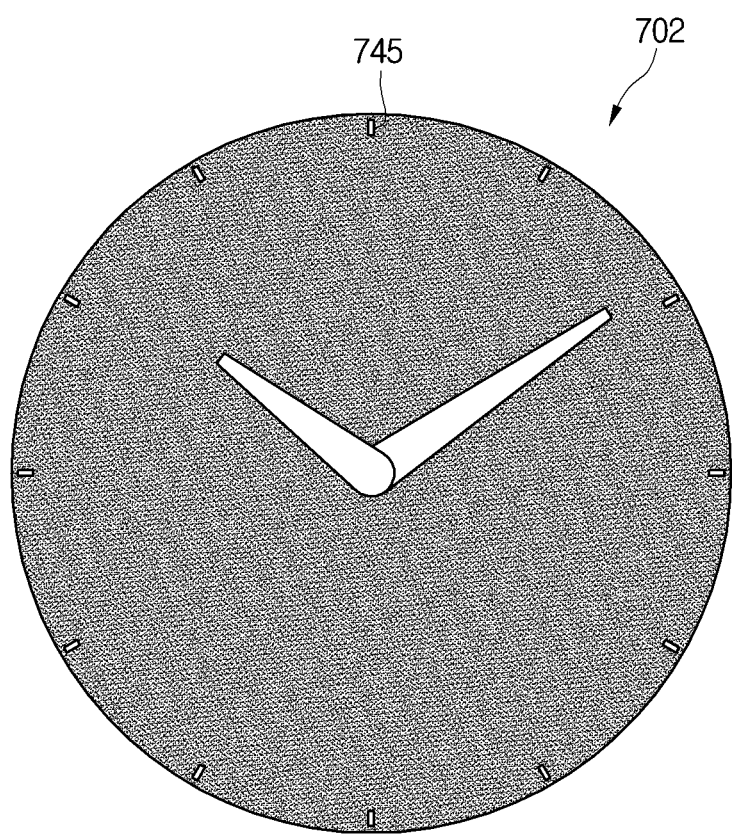
FIG. 46 is a screen shot showing pixel shift on an ambient screen having an analog watch shape.

The pixel shift according to an embodiment may also be implemented on an ambient screen having an analog watch shape in FIG. 46.

FIG. 46 is a screen shot showing pixel shift on an ambient screen having an analog watch shape.

As shown in FIG. 46, an ambient screen 702 having an analog watch shape may be driven in a low-power mode.

Scales 745 representing time may be displayed along the perimeter of the ambient screen 702.

The scales may be pixel-shifted by any event or at regular time intervals irrespective of an event.

In this example, the event may mean when an user's running operation is sensed by a motion sensor installed in a watch-type mobile terminal 100 (in FIG. 45a), the position of an arm is sensed by the motion sensor installed in the watch-type mobile terminal 100 (in FIG. 45b), a user wrist is shaken clockwise or anticlockwise (in FIG. 45c), or there is a change from a standby screen to an ambient screen (in FIG. 45d).

The scales 745 may be pixel-shifted, rotating clockwise or anticlockwise about the central region of the ambient screen 702.

The scales 745 may be pixel-shifted, moving leftwards, rightwards, upwards or downwards from the central region of the ambient screen 702.

The pixel shift described in FIGS. 45a to 46 may mean that shift is performed on a pixel basis.

The pixel shift described in FIGS. 45a to 46 means pixel shift disabling a user to recognize the pixel shift of a corresponding scale 745 and may be set in units of one or more pixels, e.g., in units of two pixels to 30 pixels.

An analog watch displayed on the standby screen of the inventive concept an analog watch displayed on the ambient screen are electronic images, not mechanical parts.

In this example, the electronic image may be an image implemented on a screen by any signal having color and brightness.

The inventive concept as described earlier may be implemented as a computer readable code in a medium having a program thereon. The computer readable medium includes all kinds of storage devices storing data that may be read by a computer system. Examples of a computer readable medium are a hard disk drive (HDD), a solid state disk (SSD), a silicon disk drive (SDD), a ROM, a RAM, a CD-ROM, a magnetic tape, a floppy disk, and an optical data storage device, and it is also implemented in the form of a carrier wave (e.g., data transmission through the Internet). Also, the computer may also include a control unit 180 of a terminal. Thus, the detailed description should not be construed as limitative in all aspects and should be considered exemplary. The scope of the inventive concept should be defined by the reasonable understanding of the following claims and all changes falling within the equivalent scope of the inventive concept are included in the scope of the inventive concept.

The effects of the watch-type mobile terminal of the inventive concept are as follows.

According to at least one of embodiments, since additional various information is displayed on an ambient screen displayed in low-power mode rather than a standby screen displayed in a normal mode, there is an advantage in that power consumption may further decrease.

According to at least one of embodiments, since various information useful for a user may be displayed on an ambient screen displayed in a low-power mode, there is an advantage in that it is possible to maximize user convenience.

According to at least one of embodiments, since types of objects displayed on an ambient screen may be minimized compared to an ambient screen, there is an advantage in that it is possible to decrease power consumption.

According to at least one of embodiments, since in a low-power mode, the ambient screen is displayed at a lower operating frequency and with lower luminance compared to the normal mode, there is an advantage in that power consumption may further decrease.

The additional scope of the applicability of the inventive concept is clear from the detailed descriptions. However, since various changes and modifications within the spirit and scope of the inventive concept may be clearly understood by a person skilled in the art, the detailed descriptions and particular embodiments, such as exemplary embodiments should be only understood as examples.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a touch screen; and
   a controller configured to:
      cause the touch screen to display a standby screen in a normal mode, wherein the standby screen includes an analog watch image having an hour hand image, a minute hand image, and numbers for indicating current time, wherein the hour hand image and the minute hand image are moved based on passage of time, and wherein the numbers are fixedly displayed regardless of the passage of time;
      receive a touch input applied to the analog watch image in the normal mode;
      cause the touch screen to change the standby screen to an ambient screen including a schedule list in response to the touch input, the ambient screen displayed in a low-power mode for decreasing power consumption; and
      cause the touch screen to change the ambient screen to the standby screen after a threshold time period elapses since the ambient screen is displayed.

2. The electronic device of claim 1, wherein when an item is selected from the schedule list, detailed schedule information corresponding to the item is displayed on the touch screen.

3. The electronic device of claim 2, wherein the schedule list or the detailed schedule information is switched to the analog watch image after the threshold time period elapses since the schedule list or detailed schedule information is displayed.

4. The electronic device of claim 1, wherein the touch input comprises a drag touch input starting from a central region of the analog watch image.

5. The electronic device of claim 4, wherein when the drag touch input is applied along the minute hand image from the central region of the analog watch image, a window for inputting a schedule is displayed.

6. The electronic device of claim 1, wherein the controller is further configured to execute a function related to a phone call in response to a second touch input received via at least one of the numbers in the low-power mode, and
- wherein when a specific number among the numbers is touched by the second touch input, missed call information related to a speed dial number corresponding to the specific number is displayed.

7. The electronic device of claim 6, wherein the missed call information is displayed around the specific number.

8. The electronic device of claim 6, wherein when a threshold time period elapses without receiving an additional touch input after the missed call information is displayed, different missed call information related to another speed dial number corresponding to a number next to the specific number is displayed.

9. The electronic device of claim 6, wherein the analog watch image comprises twelve number regions each corresponding to a respective number among the numbers, and each of the twelve number regions is matched to a corresponding one of different twelve speed dial numbers.

10. The electronic device of claim 1, wherein the touch input comprises tapping a central region on the standby screen.

11. The electronic device of claim 10, wherein tapping the central region of the standby screen comprises tapping the central region twice.

12. The electronic device of claim 11, wherein the touch input further comprises a dragging operation from the central region along the hour hand.

13. The electronic device of claim 1, wherein the analog watch image displayed on the standby screen is displayed differently in the normal mode and the low-power mode.

14. The electronic device of claim 13, wherein the analog watch image displayed in the low-power mode comprises a less number of components compared to a number of components included in the analog watch image displayed in the normal mode.

* * * * *